(12) United States Patent
Cales et al.

(10) Patent No.: US 9,830,699 B2
(45) Date of Patent: Nov. 28, 2017

(54) AUTOMATIC MEASUREMENT OF LESIONS ON MEDICAL IMAGES

(71) Applicants: UNIVERSITE D'ANGERS, Angers (FR); CENTRE HOSPITALIER UNIVERSITAIRE D'ANGERS, Angers (FR)

(72) Inventors: Paul Cales, Avrille (FR); Julien Chaigneau, Chemille (FR); Gilles Hunault, Angers (FR); Marie-Christine Rousselet, Angers (FR); Christophe Aube, Angers (FR)

(73) Assignees: UNIVERSITE D'ANGERS, Angers (FR); CENTRE HOSPITALIER UNIVERSITAIRE D'ANGERS, Angers (FR)

( * ) Notice: Subject to any disclaimer, the term of this patent is extended or adjusted under 35 U.S.C. 154(b) by 56 days.

(21) Appl. No.: 14/771,997

(22) PCT Filed: Feb. 28, 2014

(86) PCT No.: PCT/EP2014/054004
§ 371 (c)(1),
(2) Date: Sep. 1, 2015

(87) PCT Pub. No.: WO2014/131904
PCT Pub. Date: Sep. 4, 2014

(65) Prior Publication Data
US 2016/0012583 A1    Jan. 14, 2016

(30) Foreign Application Priority Data

Mar. 1, 2013  (EP) .................................. 13157488

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/11* (2017.01); *G06T 7/90* (2017.01);
(Continued)

(58) Field of Classification Search
USPC ....... 382/100, 103, 106, 128–134, 154, 162, 382/168, 173, 181, 190, 193, 199, 203,
(Continued)

(56) References Cited

U.S. PATENT DOCUMENTS

2006/0056691 A1* 3/2006 Vaz ........................ G06T 7/0012
                                                              382/173
2006/0110358 A1* 5/2006 Hsu ..................... A61K 31/4412
                                                              424/85.6
(Continued)

FOREIGN PATENT DOCUMENTS

EP    2 024 933 A1    2/2009
EP    2 120 208       11/2009
(Continued)

OTHER PUBLICATIONS

Rousselet et al. "Sources of variability in histological scoring of chronic viral hepatitis" Hepatology, 2005, 41 (2):257-264.
(Continued)

*Primary Examiner* — Seyed Azarian
(74) *Attorney, Agent, or Firm* — Young & Thompson

(57) ABSTRACT

The present invention relates to a method for assessing the presence and/or the severity of a lesion in an organ or tissue of a subject through automated analysis of at least one image of said organ or tissue, wherein said organ or tissue is preferably a liver organ or liver tissue, comprising the calculation of a score combining descriptors of said image, wherein said method comprises the steps of: a. measuring on said at least one image at least two descriptors of said at least one image; b. mathematically combining said at least two
(Continued)

descriptors in a score; and c. assessing the presence and/or the severity of a lesion in the organ or tissue based on the value of the score calculated at step (b).

16 Claims, 17 Drawing Sheets

(51) Int. Cl.
  *G06T 7/11* (2017.01)
  *G06T 7/90* (2017.01)
  *G01N 33/48* (2006.01)
(52) U.S. Cl.
  CPC .............. *G06T 2207/10056* (2013.01); *G06T 2207/30056* (2013.01); *G06T 2207/30096* (2013.01)
(58) Field of Classification Search
  USPC ....... 382/209, 219, 224, 232, 254, 274, 276, 382/291, 305, 312; 702/21; 435/6.11; 707/769; 424/464, 85.6
  See application file for complete search history.

(56) References Cited

U.S. PATENT DOCUMENTS

| | | | |
|---|---|---|---|
| 2008/0260820 A1* | 10/2008 | Borrelly | A61K 9/0019 424/463 |
| 2011/0207134 A1* | 8/2011 | Faham | C12Q 1/6886 435/6.11 |
| 2012/0010824 A1* | 1/2012 | Cales | G01N 33/57438 702/21 |
| 2012/0226709 A1* | 9/2012 | Bhargava | G06K 9/6228 707/769 |

FOREIGN PATENT DOCUMENTS

| | | |
|---|---|---|
| WO | 2006/020627 A1 | 2/2006 |
| WO | 2007/140814 A1 | 12/2007 |
| WO | 2010/058295 A2 | 5/2010 |
| WO | 2011/123068 A1 | 10/2011 |

OTHER PUBLICATIONS

Boursier et al. "Comparison of accuracy of fibrosis degree classifications by liver biopsy and non-invasive tests in chronic hepatitis C" BMC Gastroenterology, 2011, 11:132-145.
Moal et al. "Fractal dimension can distinguish models and pharmacologic changes in liver fibrosis in rats" Hepatology, 2002, 36(4):840-849.
Menard et al. "Possibilistic and probabilistic fuzzy clustering: unification within the framework of the non-extensive thermostatistics" Pattern recognition, 2002, 36:1325-1342.
Roullier et al. "Fuzzy algorithms to extract vacuoles of steatosis on liver histological color images" Conf Proc IEEE Eng Med Biol Soc, 2007:5575-5578.
Duda et al. "Use of the Hough transformation to detect lines and curves in pictures" Comm ACM, 1972, 15(1):11-15.
Harris et al. "A combined corner and edge detector" Proceedings of the 4th Alvey Vision Conference, 1988, 147-151.
Sanyal et al. "Endpoints and clinical trial design for nonalcoholic steatohepatitis" Hepatology, 2011, 54(1):344-353.
Kleiner et al. "Design and validation of a histological scoring system for nonalcoholic fatty liver disease" Hepatology, 2005, 41(6):1313-1321.
Maniprasad et al. "Automatic registration and segmentation of pancreatic images" Proc. Intl. Soc. Mag. Reson. Med., 2007,15:2727.
International Search Report, dated May 12, 2014, from corresponding PCT Application.

* cited by examiner

A
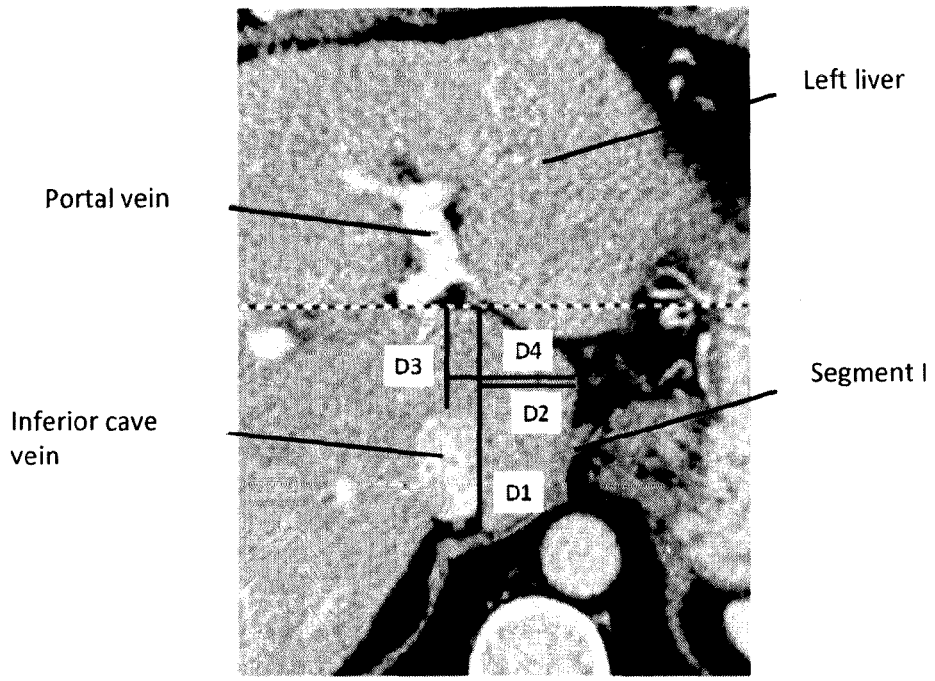
B
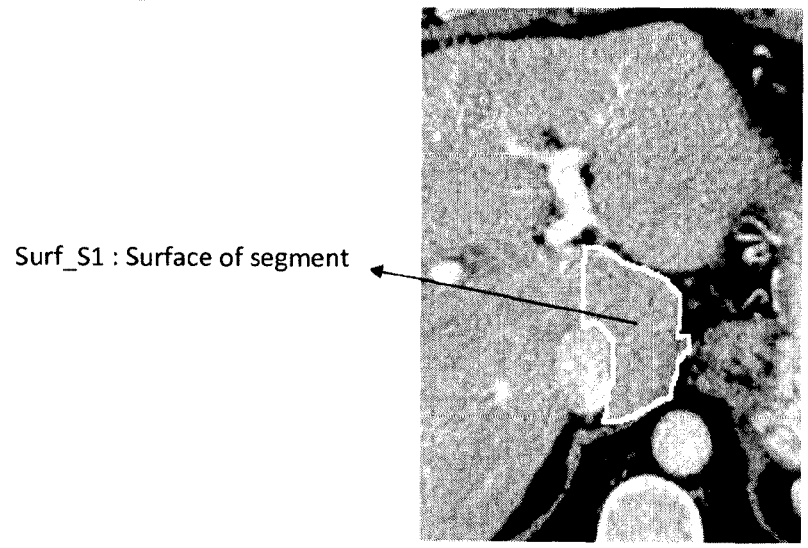
FIG. 19 A-B

C

AUTOMATIC MEASUREMENT OF LESIONS ON MEDICAL IMAGES

FIELD OF INVENTION

The present invention relates to the analysis of medical images. More specifically, the present invention relates to an automatic method for assessing the presence and/or the severity of lesions in an organ, based on the computerized analysis of a medical image of this organ.

BACKGROUND OF INVENTION

All chronic liver diseases (causes: viral, alcohol, metabolic steatosis . . . ) are characterized by the development of liver lesions and the development of liver fibrosis. This liver fibrosis induces liver architecture modifications which are the source of major complications responsible for increased mortality. Fibrosis is progressive and usually reversible.

Quantification of hepatic fibrosis is important to determine the severity of liver disease, its prognosis and treatment indication. The quantification reference of hepatic fibrosis is a microscopical examination by an expert liver pathologist of a liver specimen usually obtained by liver biopsy (LB). Liver fibrosis is staged according to LB in semi quantitative fibrosis score.

Metavir classification is one of the most used classifications. It classifies liver fibrosis in five stages from F0 to F4, F4 stage corresponding to the final stage of cirrhosis. Fibrosis is interpreted as clinically significant when stage F≥2.

Currently the conventional reading of LB has limits. Indeed, these semi-quantitative scoring systems of fibrosis are limited by poor inter- or intra-observer reproducibility between pathologists (Rousselet et al, Hepatology, 2005, 41(2):257-264). The most important issue regarding the classification system by pathologists is that it is subjective. The limit of the poor reproducibility can be partially circumvented with the LB reading by an expert. However, a recent study showed that single experts did not reach excellent reproducibility whereas an expert panel seems to be the best reading reference (Boursier et al, BMC Gastroenterol, 2011, 11:132).

Thus, the challenging issue in pathology is to work with expert centers, with the probable risk of saturation. In addition, there is a rarefaction or increasing unavailability of pathologists.

There is thus a need for an image analysis method which is automated and thus allows the effective assessment of the presence and/or the severity of a lesion in an organ, such as, for example, the presence of liver fibrosis, or the prognosis (score indicative of an increased risk of mortality or of liver mortality or of hepatic complications).

Medical images analysis methods are known in the prior art.

For example, the US patent application US 2012/226709 describes an automated method for identifying prostate tissue samples in a database that are closest to a test prostate sample, in order to aid pathologists in diagnosing prostate cancer.

Moreover, the International patent application WO 2006/020627 describes a method for automated diagnosis of a disease, specifically of cancer, based on morphometric data extracted from tissue images by a computer. Examples of morphometric data include fractal dimension data, wavelet data and color channel histogram data.

In the field of hepatology, several methods of fibrosis morphometric measurements to describe its quantitative characteristics have been described:among different patterns, the area of fibrosis is the main characteristic. Fractal dimension of fibrosis, the perimeter and the size of collagenous elements were also described. For example, the European patent EP 2 021 933 describes a computerized in vitro diagnostic method for liver diseases, comprising measuring in a liver biopsy image, inflammation parameters (such as, for example, area of inflammatory tissue or the percentage of biopsy sample surface occupied by the inflammatory tissue) or fibrosis parameters (such as, for example, fractal dimension or corrected area of the fibrotic tissue).

However, these published techniques give quantitative information but are not well correlated with the diagnostic reference system of pathologists, i.e. for example in the field of hepatology, the METAVIR fibrosis score with 5 classes (F0: no fibrosis; F1: portal fibrosis without septa; F2: portal fibrosis with rare septa; F3: numerous septa without cirrhosis; F4: cirrhosis) and the Ishak staging system with 7 classes based on portal and septal fibrosis and the degree of completeness for cirrhosis.

At the difference of the current image analysis methods of the prior art, the Inventors herein developed a diagnostic method able to determine the fibrosis course that is well correlated with the expert's classification. So, they developed an automated measurement of many new morphometric patterns which describe quantitatively the information needed by pathologists when they make the METAVIR fibrosis (F) staging. All these measures may thus be used as a complement to classical optical diagnosis as required by the local conditions of clinical practice. Moreover, the method of the invention comprises the mathematical combination of these data in a score, thus allowing determining the Metavir stage with an automated measure and calculation or allowing diagnosing clinically significant fibrosis (CSF, METAVIR F≥2) and cirrhosis (METAVIR F4), with excellent accuracy and reproducibility.

SUMMARY

The present invention thus relates to a method for assessing the presence and/or the severity of a lesion in an organ or tissue, or the prognosis, of a subject through automated analysis of at least one image of said organ or tissue, wherein said organ or tissue is preferably a liver organ or liver tissue, comprising the calculation of a score combining descriptors of said image, wherein said method comprises the steps of:
  a. measuring on said at least one image at least two, descriptors of said at least one image;
  b. mathematically combining said at least two descriptors in a score; and
  c. assessing the presence and/or the severity of a lesion in the organ or tissue, such as, for example, according to a known pathological classification or the prognosis, based on the value of the score calculated at step (b).

In one embodiment, said mathematical combination of step (b) does not consist in a division of two descriptors.

In one embodiment, said method is computerized.

In one embodiment of the invention, the at least one, preferably the at least two descriptors measured in step (a) are descriptors selected from those that can be observed with optical or electronic microscopy. Examples of descriptors that can be observed with optical or electronic microscopy include, but are not limited to (a) fractal dimension of the edges of the organ or fragment thereof, (b) linearity percentage of the edges, (c) nodularity of the curved and irregular edges of the organ (nodularity of the edges), (d) angularity, (e) length of the organ or fragment thereof, (f)

length of a biopsy, such as, for example, (g) length of a liver biopsy, (h) length of numeric specimen, (i) height of the organ, (j) perimeter of the organ or fragment thereof, (k) mean and (l) total native perimeter of the organ, (m) smoothed perimeter of the organ, (n) ratio between the native and smoothed perimeters, also referred as anfractuosity, (o) largest perimeter of the organ, (p) indentation of the organ, (q) area of the organ or fragment thereof, (r) granularity percentage, (s) fragmentation, (t) mean intensity of the image on the red component, (u) mean intensity of the image on the green component, (v) mean intensity of the image on the blue component, (w) area of fibrosis, (x) fractal dimension of fibrosis, (y) mean of percentage of fibrosis around areas (i.e. nodularity percentage), (z) number of nodules, (aa) number of nodules with more than 30% of fibrosis around, (ab) area of steatosis, (ac) relative area of steatosis, (ad) fractal dimension of steatosis, (ae) area of porto-septal fibrosis, (af) fractal dimension of porto-septal fibrosis, (ag) area of peri-sinusoidal fibrosis, (ah) fractal dimension of peri-sinusoidal fibrosis, (ai) area of lobular peri-sinusoidal fibrosis, (aj) ratio of peri-sinusoidal fibrosis among the whole fibrosis (i.e. ratio of peri-sinusoidal fibrosis area), (ak) luminosity of fibrosis staining in the red, (al) green and/or (am) blue components, (an) luminosity of the parenchyma staining in the red, (ao) green and/or (ap) blue components, (aq) luminosity contrast between fibrosis and parenchyma, (ar) luminosity contrast between fibrosis and the organ or fragment thereof, (as) area of stellar fibrosis among the total surface of the LB specimen (i.e. whole area of stellar fibrosis), (at) area of stellar fibrosis among the surface of porto-septal regions (i.e. portal area of stellar fibrosis), (au) area of stellar fibrosis among the surface of lobular regions (i.e. lobular area of stellar fibrosis), (av) number of porto-septal regions; (aw) mean area of stellar fibrosis, (ax) mean area of porto-septal regions, (ay) number of bridges, (az) ratio of bridges among the porto-septal areas (i.e. portal ratio of bridges), (ba) area of fibrosis in the bridges, (bb) bridges thickness, (bc) bridges perimeter, (bd) bridges surface (i.e. bridge area), (be) portal distance, and (cm) number of fragments.

In another embodiment of the invention, the at least one, preferably the at least two descriptors measured in step (a) are descriptors selected from those that can be observed with radiology. Examples of descriptors that can be observed with radiology include, but are not limited to (a) fractal dimension of the edges of the organ or fragment thereof, (b) linearity percentage of the edges, (c) nodularity of the curved and irregular edges of the organ (nodularity of the edges), (d) angularity, (e) length of the organ or fragment thereof, (f) length of a biopsy, such as, for example, (g) length of a liver biopsy, (h) length of numeric specimen, (i) height of the organ, (j) perimeter of the organ or fragment thereof, (k) mean and (l) total native perimeter of the organ, (m) smoothed perimeter of the organ, (n) ratio between the native and smoothed perimeters, also referred as anfractuosity, (o) largest perimeter of the organ, (p) indentation of the organ, (q) area of the organ or fragment thereof, (r) granularity percentage, (t) mean intensity of the image on the red component, (u) mean intensity of the image on the green component, (v) mean intensity of the image on the blue component, (ak) luminosity of fibrosis staining in the red, (al) green and/or (am) blue components, (an) luminosity of the parenchyma staining in the red, (ao) green and/or (ap) blue components, (bf) organ fat ratio, (bg) abdominal fat ratio, (bh) hypertrophy of liver segment I, (bi) surface of the segment I, (bj) width of the liver segment IV, (bk) ratio between segment I and segment IV dimensions, (bl) furrow thickness, (bm) surface of the furrow I, (bn) internal nodularity in the liver, (bo) diameter of the portal vein, (bp) heterogeneity of the density intensity, (bq) fractal organization of the organ, (br) mean total density of the image, (bs) standard deviation of total density of the image, (bt) coefficient of variation of total density of the image, (bu) median total density of the image, (bv) interquartile range of total density of the image, (bw) ratio between interquartile range of total density and median of total density of the image, (bx) mean density of a region of interest (ROI) on the image, (by) standard deviation of ROI density on the image, (bz) coefficient of variation of ROI density on the image, (ca) median ROI density on the image, (cb) interquartile range of ROI density on the image, (cc) ratio between interquartile range of ROI density and median of ROI density on the image, (cd) mean surface of the organ or fragment thereof, (ce) total surface of the organ or fragment thereof, total mean surface of the organ or fragment thereof, (cf) ratio between the organ perimeter and the organ surface, (cg) ratio between spleen surface and liver surface, (ch) ratio between spleen perimeter and liver perimeter, (ci) ratio between segment I surface and liver surface, (cj) Arantius furrow thickness, (ck) Arantius furrow surface, and (cl) portal furrow thickness. In one embodiment, the at least two descriptors measured at step (a) are selected from the list comprising (a) fractal dimension of the edges of the organ or fragment thereof, (b) linearity percentage of the edges, (c) nodularity of the curved and irregular edges of the organ (nodularity of the edges), (d) angularity, (e) length of the organ or fragment thereof, (f) length of a biopsy, such as, for example, (g) length of a liver biopsy, (h) length of numeric specimen, (i) height of the organ, (j) perimeter of the organ or fragment thereof, (k) mean and (l) total native perimeter of the organ, (m) smoothed perimeter of the organ, (n) ratio between the native and smoothed perimeters, also referred as anfractuosity, (o) largest perimeter of the organ, (p) indentation of the organ, (q) area of the organ or fragment thereof, (r) granularity percentage, (s) fragmentation, (t) mean intensity of the image on the red component, (u) mean intensity of the image on the green component, (v) mean intensity of the image on the blue component, (w) area of fibrosis, (x) fractal dimension of fibrosis, (y) mean of percentage of fibrosis around areas (i.e. nodularity percentage), (z) number of nodules, (aa) number of nodules with more than 30% of fibrosis around, (ab) area of steatosis, (ac) relative area of steatosis, (ad) fractal dimension of steatosis, (ae) area of porto-septal fibrosis, (af) fractal dimension of porto-septal fibrosis, (ag) area of peri-sinusoidal fibrosis, (ah) fractal dimension of peri-sinusoidal fibrosis, (ai) area of lobular peri-sinusoidal fibrosis, (aj) ratio of peri-sinusoidal fibrosis among the whole fibrosis (i.e. ratio of peri-sinusoidal fibrosis area), (ak) luminosity of fibrosis staining in the red, (al) green and/or (am) blue components, (an) luminosity of the parenchyma staining in the red, (ao) green and/or (ap) blue components, (aq) luminosity contrast between fibrosis and parenchyma, (ar) luminosity contrast between fibrosis and the organ or fragment thereof, (as) area of stellar fibrosis among the total surface of the LB specimen (i.e. whole area of stellar fibrosis), (at) area of stellar fibrosis among the surface of porto-septal regions (i.e. portal area of stellar fibrosis), (au) area of stellar fibrosis among the surface of lobular regions (i.e. lobular area of stellar fibrosis), (av) number of porto-septal regions; (aw) mean area of stellar fibrosis, (ax) mean area of porto-septal regions, (ay) number of bridges, (az) ratio of bridges among the porto-septal areas (i.e. portal ratio of bridges), (ba) area of fibrosis in the bridges, (bb) bridges thickness, (bc) bridges perimeter, (bd)

bridges surface (i.e. bridge area), (be) portal distance, (bf) organ fat ratio, (bg) abdominal fat ratio, (bh) hypertrophy of liver segment I, (bi) surface of the segment I, (bj) width of the liver segment IV, (bk) ratio between segment I and segment IV dimensions, (bl) furrow thickness, (bm) surface of the furrow I, (bn) internal nodularity in the liver, (bo) diameter of the portal vein, (bp) heterogeneity of the density intensity, (bq) fractal organization of the organ, (br) mean total density of the image, (bs) standard deviation of total density of the image, (bt) coefficient of variation of total density of the image, (bu) median total density of the image, (bv) interquartile range of total density of the image, (bw) ratio between interquartile range of total density and median of total density of the image, (bx) mean density of a region of interest (ROI) on the image, (by) standard deviation of ROI density on the image, (bz) coefficient of variation of ROI density on the image, (ca) median ROI density on the image, (cb) interquartile range of ROI density on the image, (cc) ratio between interquartile range of ROI density and median of ROI density on the image, (cd) mean surface of the organ or fragment thereof, (ce) total surface of the organ or fragment thereof, total mean surface of the organ or fragment thereof, (cf) ratio between the organ perimeter and the organ surface, (cg) ratio between spleen surface and liver surface, (ch) ratio between spleen perimeter and liver perimeter, (ci) ratio between segment I surface and liver surface, (cj) Arantius furrow thickness, (ck) Arantius furrow surface, (cl) portal furrow thickness and (cm) number of fragments.

In one embodiment, the at least one image is a histological section image, more preferably an image of a histological section from a biopsy sample of said organ or tissue; or an image of the entire organ or tissue, more preferably said image is non-invasively recovered from a living organism.

In one embodiment, the method of the invention comprises recovering:
  at least one histological section image, more preferably an image of a histological section from a biopsy sample of said organ or tissue; and
  at least one image of the entire organ or tissue, more preferably said image is non-invasively recovered from a living organism.

In one embodiment, the at least one image is obtained by an optical technique, preferably microscopic physical imaging, such as, for example electron microscopy, second harmonic generation (SHG), multiphoton imaging, coherent anti-Stokes Raman scattering—CARS), two-photon excitation fluorescence (TPEF), diffuse optical imaging or event-related optical signal.

In one embodiment, the at least one image is obtained by a non-optical technique, preferably selected from the group comprising radiography, such as, for example, X-ray, ultrasonography, computerized scanner, magnetic resonance imaging (MRI), functional magnetic resonance imaging, tomography, computed axial tomography, proton emission tomography (PET) or single photon emission computed tomography; and nuclear medicine, such as, for example, scintigraphy; photoacoustic methods; thermal methods; and magnetoencephalography.

In one embodiment, the mathematical combination is a combination using a mathematical function, preferably a multivariate analysis, more preferably a multivariate analysis selected from the list comprising binary logistic regression, linear discriminant analysis or multivariate or multiple linear analysis.

In one embodiment, the lesion is a fibrosis.

In one embodiment, the organ or tissue is selected from the list comprising liver, skin, heart, lung, kidney, gut, intestine, pancreas, bone marrow, muscle, joints and soft tissue such as, for example, soft tissue of the mediastinum or soft tissue of the retroperitoneum.

In one embodiment, the lesion is a liver fibrosis, preferably a portal fibrosis or a peri-sinusoidal fibrosis.

In one embodiment, the score obtained in step (c) is a diagnostic score indicative of the presence and/or of the severity of a disease, preferably of cirrhosis or of clinically significant fibrosis, more preferably of clinically significant fibrosis (septal fibrosis).

In one embodiment, the score obtained in step (c) is a diagnostic score indicative of the presence and/or of the severity of non-alcoholic steato-hepatitis (NASH), preferably definitive or borderline and definitive NASH.

In one embodiment, the score obtained in step (c) is a prognostic score, which is a score indicative of an increased risk of mortality or of liver mortality or of hepatic complications.

In one embodiment, the method of the invention further comprises measuring in step (a) at least one non-invasive test marker, and optionally mathematically combining in step (b) said at least one non-invasive test marker with the at least two descriptors in a score.

In one embodiment, the at least one non-invasive test marker is a biomarker, a clinical data, a physical data, preferably a data obtained by elastometry, more preferably with a Fibroscan™ and/or a score, preferably selected from ELF, FibroSpect™, APRI, FIB-4, Hepascore, Fibrotest™, FibroMeter™, CirrhoMeter™, CombiMeter™, InflaMeter™.

Therefore, in one embodiment, the method of the invention comprises measuring in step (a) and mathematically combining in a score in step (b) at least one descriptor and at least one biomarker. In another embodiment, the method of the invention comprises measuring in step (a) and mathematically combining in a score in step (b) at least one descriptor and at least one physical data, preferably at least one data obtained by elastometry, more preferably with a Fibroscan™. In another embodiment, the method of the invention comprises measuring in step (a) and mathematically combining in a score in step (b) at least one descriptor, at least one biomarker and at least one physical data, preferably at least one data obtained by elastometry, more preferably with a Fibroscan™.

Another object of the present invention is a descriptor selected from the group comprising descriptors (a) to (cm) in the hereinabove list.

Another object of the present invention is the use of a descriptor selected from the group comprising descriptors (a) to (cm) in the hereinabove list for assessing the presence and/or the severity of a lesion in a tissue or an organ, or a prognosis.

Another object of the invention is a method of measuring a descriptor selected from the group comprising descriptors (a) to (cm) in the hereinabove list.

Another object of the invention is a device for implementing the method of the invention, preferably said device is a microprocessor comprising a computer algorithm to perform the mathematical combination of step (b).

DEFINITIONS

In the present invention, the following terms have the following meanings:
  "Descriptor" refers to any computer-generated data associated with or derived from an image of an organ or tissue, such as, for example, an image obtained by microscopy or a radiological image. In an embodiment, the descriptor is a morphological descriptor. In an embodiment, the descriptor is an anatomic or physiological descriptor. Examples of computer-generated data include, but are not limited to, data regarding structural properties of the organ or tissue (such as, for example, its length), spectral properties of the organ or tissue image (such as, for example, contrast or luminosity), fractal properties of the organ or tissue, shape of the organ or tissue, and other image data transforms.

"Lesion" refers to any abnormality in a tissue or an organ of an organism. In one embodiment of the invention, a lesion is caused by a disease, and may consequently be referred as a "pathological lesion" described in anatomo-pathology.

"Fibrosis" refers to a lesion, preferably a pathological lesion, made of scaring tissue including, but not limited to, fibrillar proteins or glycoproteins, such as, for example, collagens or proteoglycans.

"Steatosis" refers to a lesion, preferably a pathological lesion, resulting from the accumulation of lipids, usually triglycerides within vacuoles of cells.

"Inflammation" refers to a stereotyped response of an organism to harmful stimuli, involved in innate immunity. Classical signs of inflammation that may be visualized include, but are not limited to, redness, swelling, and cell infiltrates (e.g. by macrophages, neutrophil polynuclear cell, lymphocytes).

"Score" refers to any digit value obtained by a test for assessing the presence and/or severity of a lesion, or a prognosis, involving the mathematical combination of at least one descriptor and/or non-invasive tests marker. In one embodiment, a score is a digit value, preferably an unbound digit value. In another embodiment, a score is a bound digit value, obtained by a mathematical function such as, for example, a logit function. Preferably, a score ranges from 0 to 1. In one embodiment, the descriptors and/or non-invasive tests markers mathematically combined in a score are independent, i.e. give each an information that is different and not linked to the information given by the others.

"Accuracy" of a method for assessing the presence and/or the severity of a lesion in an organ, or a prognosis, refers to the proportion of correctly assessed subjects by the method. In one embodiment where the method of the invention implies a binary diagnostic, the accuracy of the method may be assessed by measuring the percentage of correctly diagnosed or classified subjects, and/or by measuring the AUROC (area under the receiver operator characteristic), based on sensitivity and specificity, of the method. In another embodiment where the method is for predicting the class of a classification to which a subject belongs, the accuracy of the method may be assessed by measuring the agreement with the reference, such as the weighted kappa index discarding chance expected agreement.

"About" preceding a figure means plus or less 10% of the value of said figure.

DETAILED DESCRIPTION

The present invention relates to a method for assessing the presence and/or the severity of a lesion in a tissue (preferably a liver tissue) or an organ (preferably liver), or a prognosis, of a subject through automated analysis of at least one image of said organ or tissue, comprising the calculation of a score combining at least one descriptor of said image, wherein said method comprises the steps of:
   a. measuring on said at least one image at least one descriptor of said at least one image;
   b. mathematically combining said at least one descriptor in a score; and
   c. assessing the presence and/or the severity of a lesion in the organ or tissue or a prognosis, based on the value of the score calculated at step (b).

In one embodiment of the invention, at least 2, 3, preferably at least 4, 5, 6, 7 or 8 descriptors are measured at step (b) and/or mathematically combined at step (c).

In one embodiment, the method of the present invention may thus also be defined as an automated morphometry method, wherein morphometry refers to the quantitative measurement of forms, shape or other characteristics of an organ or tissue on an image of said organ or tissue.

In one embodiment, the method of the invention includes a predicted lesion (the dependent variable), which is predicted by descriptors or explicative variables, such as, for example, non-invasive test markers (independent variables).

In one embodiment of the invention, the method is computerized, which means that the image analysis leading to a score is carried out by a computer, without the intervention of a human operator.

In another embodiment, the method is essentially computerized, which means that a human operator may intervene in some steps, such as, for example, for recovering the image or for removing artefacts on the image of the organ to be analyzed. However, the image analysis per se, i.e. the measurement of the at least one, preferably at least two descriptors and the mathematical combination thereof is computerized.

The present invention thus also relates to a device for implementing the method of the invention, such as, for example, a software, or a microprocessor comprising a computer algorithm to perform the mathematical combination of step (b).

In one embodiment of the invention, the at least one image is an electronic or digital image.

In a first embodiment, the electronic or digital image is recovered directly after the medical examination. In a second embodiment, the electronic or digital image is a scanned image of the medical examination result.

In a first embodiment, the image is a two-dimensional image, such as, for example, a histological section image, preferably an image of a histological section of a biopsy sample from said organ or tissue.

In a second embodiment, the image is a three-dimensional image, such as, for example, an image of an entire organism, organ or tissue, preferably non-invasively recovered from a living organism.

In one embodiment of the invention, the two-dimensional image is an image from a biopsy sample, such as, for example, an image of a histological section of a biopsy. As used herein, the term "histological section" refers to a thin slice of tissue applied to a microscopic slide. In another embodiment, the two-dimensional image corresponds to a slice of a three-dimensional image, such as, for example, a slice of an image of an entire organism, organ or tissue non-invasively recovered from a living organism.

In one embodiment of the invention, the biopsy sample is transformed before the method of the invention is carried out.

Examples of transformations that may be applied to the biopsy sample include, but are not limited to, gross cutting of the biopsy material; fixation, such as, for example, by the fixed tissue method with paraffin, fixation with formalin or by frozen section; thin cutting, such as, for example, microtome cutting; mounting on a microscopic slide; and/or staining.

Types of staining applied on the histological section may depend on the tissue or organ and on the lesion to be detected.

In one embodiment of the invention, the biopsy sample is a liver biopsy sample, and the histological section of said liver biopsy sample is stained with picro-sirius red. This staining highlights the fibrosis in red, healthy tissues in yellow/orange whereas steatosis remains in white (i.e. optically empty).

In one embodiment of the invention, the histological section is then scanned in order to obtain the electronic or digital image that will be analyzed in the method of the invention. A non-limiting example of scan parameters is by using an Aperio digital slide scanner (Scanscope CS System, Aperio Technologies, USA) image processor that provides high quality 30 000×30 000 pixel images at a resolution of 0.5 µm/pixel (magnification×20).

In another embodiment of the invention, the histological section is observed by an optical technique.

Examples of optical techniques include, but are not limited to microscopic physical imaging, such as, for example electron microscopy, second harmonic generation (SHG), multiphoton imaging, coherent anti-Stokes Raman scattering—CARS), two-photon excitation fluorescence (TPEF), diffuse optical imaging or event-related optical signal, and the resulting image is then recovered to be analyzed in the method of the present invention.

In one embodiment of the invention, the at least one image is an image from an organ in a living organism provided by a non-invasive method. In one embodiment, the image is a three-dimensional image recovered on a living organism by a non-invasive method.

In one embodiment, the at least one image is a three dimensional image, preferably an image of an entire organ or organism, more preferably, said image is non-invasively recovered on a living organism. According to one embodiment, the three dimensional image is in the form of several slices distant from about 1 µm to about 10 cm, preferably from about 5 µm to about 1 cm, and more preferably of about 10 µm to about 5 mm. In one embodiment, the image analysis of each of the images of these slices is performed as described for a histological section image.

Examples of methods, preferably of non-invasive methods, that may be used for recovering an image of an organ in a living organism include, but are not limited to, non-optical techniques.

Examples of non-optical techniques include, but are not limited to, radiography (such as, for example, X-ray, ultrasonography, tomodensitometry (TDM), computerized scanner, magnetic resonance imaging (MRI), functional magnetic resonance imaging, tomography, computed axial tomography, proton emission tomography (PET) or single photon emission computed tomography); nuclear medicine (such as, for example, scintigraphy); photoacoustic methods; thermal methods; and magnetoencephalography.

In one embodiment of the invention, the at least one image is obtained by an optical technique.

In another embodiment of the invention, the at least one image is obtained by a non-optical technique.

In one embodiment of the invention, the image is pre-treated before its analysis by the method of the invention. Examples of pre-treatment include, but are not limited to, compression, transformation of the image in a binary image, such as, for example, a black and white image; removal of artefacts and the like.

The skilled artisan is a specialist of image analysis of organs and tissues, and knows what artefacts should be removed before analysis of the image. Examples of artefacts that may be removed from the image include, but are not limited to folds, dust, and optionally large blood vessels, large biliary tracts and the like. In one embodiment, pre-treatment of the image comprises elimination of very small areas, considered as noise, elimination of vessels surrounding fibrosis, elimination of non-round regions, such as, for example, biliary tracts, or elimination of heterogeneous regions, such as, for example, blood vessels.

In one embodiment, pre-treatment of the image comprises detecting the white background of the image so that it is not taken into account in the analysis.

In one embodiment of the invention, in order to facilitate sharing and storage of images, these may be compressed, such as, for example, using a JPEG2000 software.

In one embodiment of the invention, the at least one, preferably the at least two descriptors measured in step (a) are selected from the group comprising or consisting of (a) fractal dimension of the edges of the organ or fragment thereof, (b) linearity percentage of the edges, (c) nodularity of the curved and irregular edges of the organ, (d) angularity, (e) length of the organ or fragment thereof, (f) length of a biopsy, such as, for example, (g) length of a liver biopsy, (h) length of numeric specimen, (i) height of the organ, (j) perimeter of the organ or fragment thereof, (k) mean and (l) total native perimeter of the organ, (m) smoothed perimeter of the organ, (n) ratio between the native and smoothed perimeters, also referred as anfractuosity, (o) largest perimeter of the organ, (p) indentation of the organ, (q) area of the organ or fragment thereof, (r) granularity percentage, (s) fragmentation, (t) mean intensity of the image on the red component, (u) mean intensity of the image on the green component, (v) mean intensity of the image on the blue component, (w) area of fibrosis, (x) fractal dimension of fibrosis, (y) mean of percentage of fibrosis around areas (i.e. nodularity percentage), (z) number of nodules, (aa) number of nodules with more than 30% of fibrosis around, (ab) area of steatosis, (ac) relative area of steatosis, (ad) fractal dimension of steatosis, (ae) area of porto-septal fibrosis, (af) fractal dimension of porto-septal fibrosis, (ag) area of peri-sinusoidal fibrosis, (ah) fractal dimension of peri-sinusoidal fibrosis, (ai) area of lobular peri-sinusoidal fibrosis, (aj) ratio of peri-sinusoidal fibrosis among the whole fibrosis (i.e. ratio of peri-sinusoidal fibrosis area), (ak) luminosity of fibrosis staining in the red, (al) green and/or (am) blue components, (an) luminosity of the parenchyma staining in the red, (ao) green and/or (ap) blue components, (aq) luminosity contrast between fibrosis and parenchyma, (ar) luminosity contrast between fibrosis and the organ or fragment thereof, (as) area of stellar fibrosis among the total surface of the LB specimen (i.e. whole area of stellar fibrosis), (at) area of stellar fibrosis among the surface of porto-septal regions (i.e. portal area of stellar fibrosis), (au) area of stellar fibrosis among the surface of lobular regions (i.e. lobular area of stellar fibrosis), (av) number of porto-septal regions; (aw) mean area of stellar fibrosis, (ax) mean area of porto-septal regions, (ay) number of bridges, (az) ratio of bridges among the porto-septal areas (i.e. portal ratio of bridges), (ba) area of fibrosis in the bridges, (bb) bridges thickness, (bc) bridges perimeter, (bd) bridges surface (i.e. bridge area), (be) portal distance, (bf) organ fat ratio, (bg) abdominal fat ratio, (bh) hypertrophy of liver segment I, (bi) surface of the segment I, (bj) width of the liver segment IV, (bk) ratio between segment I and segment IV dimensions, (bl) furrow thickness, (bm) surface of the furrow I, (bn) internal nodularity in the liver, (bo) diameter of the portal vein, (bp) heterogeneity of the density intensity, (bq) fractal organization of the organ, (br) mean total density of the image, (bs) standard deviation of total density of the image, (bt) coefficient of variation of total density of the image, (bu) median total density of the image, (bv) interquartile range of total density of the image, (bw) ratio between interquartile range of total density and median of total density of the image, (bx) mean density of a region of interest (ROI) on the image, (by) standard deviation of ROI density on the image, (bz) coefficient of variation of ROI density on the image, (ca) median ROI density on the image, (cb) interquartile range of ROI density on the image, (cc) ratio between interquartile range of ROI density and median of ROI density on the image, (cd) mean surface of the organ or fragment thereof, (ce) total surface of the organ or fragment thereof, total mean surface of the organ or fragment thereof, (cf) ratio between the organ perimeter and the organ surface, (cg) ratio between spleen surface and liver surface, (ch) ratio between spleen perimeter and liver perimeter, (ci) ratio between segment I surface and liver surface, (cj) Arantiusfurrow thickness, (ck) Arantius furrow surface, (cl) portal furrow thickness and (cm) number of fragments.

In one embodiment, two descriptors, such as, for example, descriptors (a) and (b), (a) and (c), (a) and (d), . . . , or (cl) and (cm) are measured in step (a). In another embodiment, three descriptors, such as, for example, descriptors (a), (b) and (c); (a), (c) and (d); . . . ; or (ck), (cl) and (cm) are measured in step (a). In another embodiment, four descriptors, such as, for example, descriptors (a), (b), (c) and (d); (a), (c), (d) and (e); . . . ; or (cj), (ck), (cl) and (cm) are measured in step (a). In another embodiment, 5 descriptors, such as, for example, descriptors (a), (b), (c), (d) and (e); (a), (c), (d), (e) and (f); . . . ; or (ci), (cj), (ck), (cl) and (cm) are measured in step (a). In another embodiment, 6 descriptors, such as, for example, descriptors (a), (b), (c), (d), (e) and (f); (a), (c), (d), (e), (f) and (g); . . . ; or (ch), (ci), (cj), (ck), (cl) and (cm) are measured in step (a). In another embodiment, 7 descriptors, such as, for example, descriptors (a), (b), (c), (d), (e), (f) and (g); (a), (c), (d), (e), (f), (g) and (h); . . . ; or (cg), (ch), (ci), (cj), (ck), (cl) and (cm) are measured in step (a). In another embodiment, 8 descriptors, such as, for example, descriptors (a), (b), (c), (d), (e), (f), (g) and (h); (a), (c), (d), (e), (f), (g), (h) and (i); . . . ; or (cf), (cg), (ch), (ci), (cj), (ck), (cl) and (cm) are measured in step (a).

Another object of the invention is thus a descriptor selected from the group comprising descriptors (a) to (cm) in the list presented hereinabove. The present invention thus also relates to the use of at least one descriptor selected in the list above for assessing the presence and/or the severity of a lesion in a tissue or in an organ, or a prognosis. The present invention thus also relates to the combined use of at least two descriptors selected in the list above for assessing the presence and/or the severity of a lesion in a tissue or in an organ, or a prognosis, wherein said at least two descriptors are mathematically combined in a score.

Description of these descriptors and examples of methods for measuring thereof are given hereinafter.

In one embodiment, the step (a) of method of the invention comprises or consists in measuring edge linearity: The analysis of the edges of an organ or of a fragment thereof is an important descriptor for assessing the presence and/or the severity of a lesion or for diagnosing a disease of for a prognosis. In one embodiment, the analysis of the edges of an organ, tissue or fragment thereof includes measuring the fractal dimension of the edges and/or the linearity percentage of the edge. The present invention thus also relates to a method for measuring edge linearity of an organ, tissue or fragment thereof.

A non-limiting example of a method for measuring edge linearity is shown thereafter. First, the edges of the organs or fragments thereof are detected leading to a mask ($MASK_{EDGE}$). Then, the Hough transform is applied to detect straight lines on $MASK_{EDGE}$ (Duda et al, Comm ACM, 1972, 15:11-15), leading to a mask called $MASK_{HOUGH}$ containing only the edges of the mask detected as straight by the Hough transform. In parallel, a straight mask $MASK_{RECT}$ is created from the edge mask ($MASK_{EDGE}$), using a Harris detector (Harris et al, Proceedings of the 4$^{th}$ Alvey Vision Conference, 1988:147-151). Therefore, $MASK_{RECT}$ represents the edges of $MASK_{EDGE}$ that are in common with this theoretical straight mask. Then, a third mask is obtained by the combination of both previous masks: $MASK_{RECTCOMB}$ ($MASK_{RECTCOMB} = MASK_{HOUGH} + MASK_{RECT}$).

$MASK_{RECTCOMB}$ thus contains all the straightest edges of the organ, tissue or fragment thereof. The descriptors associated with edge linearity are thus the following:

Fractal dimension of the edges (DF_EDGE): refers to the fractal dimension of the edges of the organ, tissue or fragment thereof on $MASK_{EDGE}$. Methods for determining fractal dimensions are well known from the skilled artisan. Examples of such methods include, but are not limited to the "box-counting" method (Moal et al, Hepatology, 2002, 36:840-849).

Linearity percentage of the edges (PCT_RECT): is determined according to the following formula:

$$PCT\_RECT = Pix_{MaskRectComb}/Pix_{MaskEdge} * 100$$

wherein $Pix_{MaskRectComb}$ is the number of pixels of $MASK_{RECTCOMB}$ and $Pix_{MaskEdge}$ is the number of pixels of $MASK_{EDGE}$.

In one embodiment, the step (a) of method of the invention comprises or consists in measuring the length of an organ, tissue or fragment thereof (ORGAN_LENGTH). For measuring the length of the organ, tissue or fragment thereof on the image, a mask obtained after the elimination of the artefacts ($MASK_{ORGAN}$) may be used: a morphometric operation (skeletonization) is applied and gives a skeleton of the organ, tissue or fragment thereof. Then, small ramifications may be removed in order to keep the main skeleton ($MASK_{SKELETON}$) that represents the organ's length.

$$ORGAN\_LENGTH = Pix_{ORGAN\_SKELETON} * IM_{Resolution} * R_{SCALE}.$$

wherein $Pix_{ORGAN\_SKELETON}$ is the number of pixels that represent the organ length on $MASK_{ORGAN}$, $IM_{Resolution}$ is the resolution of the scanned image and $R_{SCALE}$ is the scale factor used to resize the image. In one embodiment of the invention, $IM_{Resolution}$ is of about 0.5 μm. In another embodiment of the invention, $R_{SCALE}$ is of about 4.

In one embodiment, the same operations may be carried out for measuring the length of a biopsy sample (BIOPSY_LENGTH), such as, for example, the length of a liver biopsy (LB_LENGTH). In one embodiment, the same operations may be carried out for measuring the length of a numeric specimen (N_LENGTH).

In one embodiment, the length of the biopsy sample, preferably of the liver biopsy sample, is of more than 10 mm, preferably more than 15 mm, more preferably more than 20 mm.

In one embodiment, the step (a) of method of the invention comprises or consists in measuring the perimeter of the organ, tissue or fragment thereof. The measure of the perimeter of the organ, tissue or fragment thereof (ORGAN_PERIMETER) may comprise detecting, preferably automatically detecting, the edges of the fragments on the organ specimen and, using the mask $MASK_{EDGE}$ (see hereinabove), calculating the perimeter as follows:

ORGAN_PERIMETER=$Pix_{MaskEdge}$*$IM_{Resolution}$*$R_{SCALE}$.

wherein $Pix_{MaskEdge}$ is the number of pixels of $MASK_{EDGE}$, $IM_{Resolution}$ is the resolution of the scanned image (preferably about 0.5 μm) and $R_{SCALE}$=4 is the scale factor used to resize the image.

In one embodiment, the step (a) of method of the invention comprises or consists in measuring the area of the organ, tissue or fragment thereof. The measure of the area of the organ, tissue or fragment thereof (ORGAN_AREA) may comprise detecting, preferably automatically detecting, the edges of the fragments on the organ specimen or tissue sample and, thanks to the mask $MASK_{EDGE}$ (see hereinabove), calculating the area as follows:

ORGAN_AREA=$Pix_{MASK\_ORGAN}$*$IM_{Resolution}^2$*$R_{SCALE}^2$.

wherein $Pix_{MASK\_ORGAN}$ is the number of pixels of the total area of the organ specimen or fragment thereof, IM Resolution is the resolution of the scanned image (preferably about 0.5 μm) and $R_{SCALE}$=4 is the scale factor used to resize the image.

In one embodiment, the step (a) of method of the invention comprises or consists in measuring the granularity of the organ, tissue or fragment thereof. The measure of the granularity percentage (PCT_GRANULARITY) aims at quantifying the impairment of the structure (i.e. destructuration) of an organ or tissue due to the presence of a lesion. PCT_GRANULARITY is the ratio between the number of fragments without destructuration and the number of granules obtained in these fragments after destructuration by porto-septal areas:

PCT_GRANULARITY=100−(NB_FRAG/Nb_Granules*100)

wherein NB_FRAG is the number of fragment in the analysed area and Nb_Granules is the number of granules obtained in these fragments. The present invention thus also relates to a method for measuring the granularity percentage of an organ, tissue or fragment thereof.

In one embodiment, the step (a) of method of the invention comprises or consists in measuring the fragmentation of the organ, tissue or fragment thereof. An organ or tissue specimen is sometimes fragmented, depending on the presence of lesions. Another object of the invention is thus a method for measuring fragmentation of an organ, tissue or fragment thereof, wherein said fragmentation is assessed through the measurement of a fragmentation index. In one embodiment, a mask obtained after the elimination of the artefacts ($MASK_{ORGAN}$) is used for measuring said fragmentation: detection on this mask of small fragments leads to another mask: $MASK_{FRAG\_SMALL}$.

In one embodiment, a fragment is considered as small if its surface is lower than or equal to about 5 $mm^2$, preferably lower than or equal to about 3 $mm^2$, more preferably lower than or equal to about 2 $mm^2$.

In another embodiment, a fragment is considered as small if its surface is lower than or equal to about 7 $mm^2$, preferably lower than or equal to about 5 $mm^2$, more preferably lower than or equal to about 3 $mm^{2'}$ if this fragment has a circularity up to 0.7. The fragmentation index is the ratio between the surface of small fragments detected and the total surface of the organ specimen:

INDEX_FRAGMENTATION=Pix_Mask_Frag_Small/Pix_Mask_Frag*100 wherein Pix_Mask_Frag is the number of pixels in $MASK_{ORGAN}$ and Pix_Mask_Frag_Small the number of pixel in $MASK_{FRAG\_SMALL}$.

In one embodiment, the step (a) of method of the invention comprises or consists in measuring descriptors reflecting the quality of the image. The invention thus also relates to a method for measuring the quality of the invention. A non-limiting example of such a method is shown hereinafter. In one embodiment, all the measures of intensity luminosity are applied on the three components of the image (RGB: Red, Green and Blue). The luminosity intensity of the image is calculated by averaging all pixel intensities. Descriptors corresponding to the mean intensity for each component may be measured: ILbR (mean intensity of the image on the red component), ILbG (mean intensity of the image on the green component) and IlbB (mean intensity of the image on the blue component).

In one embodiment of the invention where the lesion is fibrosis, the following descriptors may be assessed:

In one embodiment, the step (a) of method of the invention comprises or consists in measuring the Area of Fibrosis (AOF). AOF is equal to the ratio of pixels of fibrosis divided by the number of pixels in the studied area:

AOF=$Pix_{FIB}$/$Pix_{MASK\_PBH}$*100 wherein $Pix_{FIB}$ is the number of fibrosis pixels and $Pix_{MASK\_PBH}$ is the number of pixels of the studied area.

In one embodiment, the step (a) of method of the invention comprises or consists in measuring the Fractal dimension of fibrosis ($D_F$). In one embodiment of the invention, when the descriptor is a data regarding fractal properties of the organ or tissue, fractal dimension may be measured using the "box-counting" method (Moal et al, Hepatology, 2002, 36:840-849). The box-counting method provides the fractal dimension of Kolmogorov (D). The technique has been reported in details for biological structures. Briefly, a grid of square boxes (with ε pixels as the side length) resembling a chessboard is superimposed over the histologic image of threshold fibrosis. Boxes intersecting with collagen fibers are counted. Another chessboard grid is then used to cover the entire surface of the microscopic field. Thus, the total number (N) of boxes of sides (e) required to completely cover the collagen fibers reflects the perimeter examined with the scale ratio ε. In one embodiment, this step is repeated with ε varying until a size of about 14 pixels, and data are plotted on a log-log graph (i.e., log [N] against log [ε]). The relationship between points is measured by linear regression analysis using the least square method; the slope $D_F$ of the regression line corresponds to the fractal dimension of fibrosis $D_F$.

In one embodiment, the step (a) of method of the invention comprises or consists in measuring nodules. Nodules are the result of the disruption of fibrosis that circles regions of tissue (parenchyma), that may be defined as circular and non-fibrotic (without fibrous septa inside) area surrounded by fibrosis. In one embodiment, the method of the invention comprises measuring descriptors associated with the presence of nodules. Preferably, two descriptors associated with the presence of nodules are measured: nodularity percentage, i.e. mean of percentage of fibrosis around areas (PCT-NOD) and number of nodules (NB_NOD). The present invention thus also relates to a method for measuring nodularity percentage and/or number of nodules. In one embodiment, the measure of PCT-NOD is carried out the same way as PCT_GRANULARITY (see hereinabove), wherein only circular granules are kept. In one embodiment, as nodules are not always perfectly round, granules having a circularity of at least about 0.3, preferably at least about 0.4, more preferably at least about 0.45 are considered as nodules. In one embodiment, among the round or quite-round granules, those having at least about 10%, preferably at least about 20%, more preferably at least about 30% of fibrosis around (i.e. at least about 10, 20 or 30% of the external border) are considered as nodules. Finally, a mask with regions tending towards nodularity ($MASK_{NOD}$) is obtained. In one embodiment, nodules were considered as definitive when PCT_GRANULARITY was of at least 50%, preferably at least 70%, more preferably of at least 80%. The descriptors associated with the measure of nodules are the following:

PCT_NOD=mean of percentage of fibrosis around areas in $MASK_{NOD}$.

NB_NOD=number of nodules in $MASK_{NOD}$ with more than 80% of fibrosis around.

In one embodiment, the number of nodules in $MASK_{NOD}$ with more than 30% of fibrosis around (NB_NOD_30) is calculated, according to the following formula:

NB_NOD=number of nodules in $MASK_{NOD}$ with more than 30% of fibrosis around.

In one embodiment of the invention where the lesion is steatosis, the following descriptors may be assessed:

In one embodiment, the step (a) of method of the invention comprises or consists in measuring the Area of Steatosis (AOS). AOS is equal to the ratio of pixels of steatosis divided by the number of pixels in the studied area:

$$AOS=Pix_{STEA}/Pix_{MASK\_PBH}*100$$

wherein $Pix_{STEA}$ is the number of steatosis pixels and $Pix_{MASK\_PBH}$ is the number of pixels of the studied area.

In one embodiment, the step (a) of method of the invention comprises or consists in measuring the relative Area of Steatosis (rAOS), corresponding to the area of steatosis in the non-fibrotic area of the image.

In one embodiment, the step (a) of method of the invention comprises or consists in measuring the Fractal dimension of steatosis (DS), which may be measured according to the method already described for measuring the fractal dimension of fibrosis (see hereinabove) using images showing steatosis.

In one embodiment of the invention where the organ is liver and the lesion is fibrosis, the following descriptors may be assessed:

In one embodiment, the step (a) of method of the invention comprises or consists in measuring the Area and fractal dimension of porto-septal and peri-sinusoidal fibrosis.

Fibrosis can start in the centro-lobular region (alcoholic liver disease) and/or in the periphery of the liver lobule or around the portal tracts (viral liver disease). This fibrosis grows gradually to form bands of fibrosis, or septa, called septal fibrosis. This septal fibrosis is extended between the portal tracts or between the portal tracts and the centro-lobular region. The cirrhosis stage occurs when these different septa entirely surround hepatocytes. When pathologists are assessing the Metavir stage, their judgment is based on the porto-septal fibrosis. The other form of fibrosis is located between the rows of hepatocytes and sinusoids, the equivalent of the capillary in the liver, that is to say, in the intercellular space where there are many liver metabolic exchanges. This is called the peri-sinusoidal fibrosis. Although it is not taken into account in the fibrosis scores in clinical use, this fibrosis is important because it has a key role in the genesis of liver failure and portal hypertension. In one embodiment, the method of the invention thus comprises measuring descriptors associated with porto-septal and/or peri-sinusoidal fibrosis, such as, for example, area and fractal dimension of porto-septal fibrosis, area and fractal dimension of peri-sinusoidal fibrosis, area of lobular peri-sinusoidal fibrosis and ratio of peri-sinusoidal fibrosis among the whole fibrosis. The present invention also relates to a method for measuring descriptors associated with porto-septal and/or peri-sinusoidal fibrosis such as, for example, area and fractal dimension of porto-septal fibrosis, area and fractal dimension of peri-sinusoidal fibrosis, area of lobular peri-sinusoidal fibrosis and ratio of peri-sinusoidal fibrosis among the whole fibrosis. A non-limiting example of such a method is shown hereinafter. The Inventors thus developed a mask ($MASK_{PORT}$) which allows distinguishing porto-septal and peri-sinusoidal fibrosis. In one embodiment, as the creation of this mask requires a large number of morphometric treatments (regarding erosions, dilations, the size of fibrosis areas . . . ) the image dimensions may be reduced.

In one embodiment of the invention, the image is pre-treated by at least one, preferably both, of the following steps: (i) peri-sinusoidal fibrosis lies between the rows of hepatocytes; therefore, in one embodiment, peri-sinusoidal fibrosis is eliminated by detecting the hepatocytes which have the intensity of healthy tissue; (ii) concerning veins and vessels, if their diameter is less than about 500 μm, preferably less than about 350 μm, more preferably less than about 200 μm and if the fibrosis around is small compared to their size, they are not considered in the $MASK_{PORT}$, and their walls are automatically excluded in the area of perisinusoidal fibrosis.

In one embodiment, as porto-septal regions have a lot of fibrosis, the elements of fibrosis with large areas are considered in the $MASK_{PORT}$. In another embodiment, the fractal dimension of fibrosis into these regions is a further criterion to determine if these regions are in $MASK_{PORT}$. In one embodiment, thin regions (small ratio between the perimeter of the area and its surface) with nodes (interconnection points in fibrosis filaments), which is a sign of branched forms as observed in peri-sinusoidal fibrosis, are not considered as porto-septal fibrosis.

In one embodiment, any fibrous septum lacking liver cell plated between collagen fibers is included in the area of portal and/or bridging fibrosis.

The descriptors assessing porto-septal and/or peri-sinusoidal fibrosis that may be measured in step (a) of the method of the invention are the following:

Area of porto-septal fibrosis (AO_FPORT) that may be assessed using the following formula:

$$AO\_FPORT=Pix_{PORT}/PixMASK\_LB*100$$

wherein $Pix_{PORT}$ is the number of pixels of porto-septal fibrosis and PixMASK_LB is the number of pixels of the total area of the LB specimen.

Fractal dimension of porto-septal fibrosis (DF_FPORT): fractal dimension of porto-septal fibrosis may be measured according to the method already described for measuring the fractal dimension of fibrosis (see hereinabove).

Area of peri-sinusoidal fibrosis (AO_FPS) that may be assessed using the following formula:

$$AO\_FPS=Pix_{FPS}/PixMASK\_LB*100$$

wherein $Pix_{FPS}$ is the number of pixels of peri-sinusoidal fibrosis and PixMASK_LB is the number of pixels of the total area of the LB specimen.

Fractal dimension of peri-sinusoidal fibrosis (DF_FPS): fractal dimension of peri-sinusoidal fibrosis may be measured according to the method already described for measuring the fractal dimension of fibrosis (see hereinabove).

Area of lobular peri-sinusoidal fibrosis (AO_FPS_LOB) that may be assessed using the following formula:

AO_FPS_LOB=$Pix_{FPS}$/(PixMASK_LB−Pix_Mask_Port)*100 wherein $Pix_{FPS}$ is the number of pixels of peri-sinusoidal fibrosis, PixMASK_LB is the number of pixels of the total area of the LB specimen and Pix_Mask_Port is the number of pixels of the porto-septal area.

Ratio of peri-sinusoidal fibrosis among the whole fibrosis (RATIO_FPS) corresponding to the following ratio:

RATIO_FPS=$Pix_{FPS}/Pix_{FIB\_TOT}$*100 wherein $Pix_{FPS}$ is the number of pixels of peri-sinusoidal fibrosis and $Pix_{FIB\_TOT}$ is the number of pixels representing all the fibrosis (porto-septal and peri-sinusoidal fibrosis).

In one embodiment, the step (a) of method of the invention comprises or consists in measuring the quality of the staining. In one embodiment wherein the lesion is fibrosis, the measure of the quality of the image as hereinabove described may further comprise measurement of the luminosity of fibrosis staining in the red, green and blue components (IfibR, IfibG, and IfibB) and of the luminosity parenchyma staining in the red, green and blue components (IparenchymaR, IparenchymaG, and IparenchymaB). As the quality of the coloration may also be considered as insufficient if the fibrosis intensity is closed to the intensity of the parenchyma or the LB (i.e. if there is only a weak contrast between the fibrosis and the parenchyma or LB), descriptors assessing said contrast were developed: luminosity contrast between fibrosis and parenchyma (Contrast_Fib_Parenchyma) and luminosity contrast between fibrosis and the organ, tissue or fragment thereof (Contrast_Fib_Lb). These are measured as follows:

$$Contrast\_Fib\_Parenchyma = \sqrt{(IparenchymaR - IfibR)^2 + (IparenchymaG - IfibG)^2 + (IparenchymaB - IfibB)^2}$$

$$Contrast\_Fib\_Lb = \sqrt{(ILbR - IfibR)^2 + (ILbG - IfibG)^2 + (ILbB - IfibB)^2}$$

In one embodiment, the step (a) of method of the invention comprises or consists in measuring stellar fibrosis. Stellar fibrosis may be defined as fibrosis patterns with small and fine fibrils around a more dense area. Stellar fibrosis usually appears around the portal tracts. Therefore, stellar fibrosis may be assessed in the method of the present invention using the following descriptors: area of stellar fibrosis among the total surface of the LB specimen (AOF_STELLAR_TOT), area of stellar fibrosis among the surface of porto-septal regions (AOF_STELLAR_EP) and area of stellar fibrosis among the surface of lobular regions (AOF_STELLAR_LOB); number of porto-septal regions (NB_PORT); mean area of stellar fibrosis (MEAN_STELLAR_PORT) and mean area of porto-septal regions (MEAN_AO_PORT). The present invention thus also relates to methods for measuring these descriptors assessing stellar fibrosis. Examples of such methods are shown hereinafter. In one embodiment, fibrosis is detected in a distance of about 1000 µm, preferably of about 500 µm, more preferably of about 100 µm around the porto-septal regions on a mask allowing the separation of peri-sinusoidal fibrosis from porto-septal fibrosis ($MASK_{PORT}$). Descriptors assessing stellar fibrosis are the following:

AOF_STELLAR_TOT=Pix_Fib_Stellar/Pix-MASK_LB*100

AOF_STELLAR_EP=Pix_Fib_Stellar/Pix_Mask_Port*100

AOF_STELLAR_LOB=Pix_Fib_Stellar/(Pix-MASK_LB−Pix_Mask_Port)*100

MEAN_STELLAR_PORT=Pix_Fib_Stellar/NB_PORT

MEAN_AO_PORT=Pix_Mask_Port/NB_PORT wherein Pix_Fib_Stellar is the number of pixels detected as stellar fibrosis, PixMASK_LB is the number of pixels of the total area on the liver biopsy specimen, Pix_Mask_Port is the number of pixels of the porto-septal area in $MASK_{PORT}$ and NB_PORT is the number of porto-septal regions in $MASK_{PORT}$.

In one embodiment, the step (a) of method of the invention comprises or consists in measuring bridging fibrosis. As used herein, a bridge refers to a situation where two portal tracts are interconnected. A bridge may thus be defined as a structure lying between two thick elements. For assessing bridging fibrosis, the following descriptors may be measured in the method of the invention: number of bridges (NB_BRIDGE), ratio of bridges among the porto-septal areas (RATIO_BRIDGE), area of fibrosis in the bridges (AOF_BRIDGE), bridges thickness (MEAN_THICK_BRIDGE), bridges perimeter (MEAN_PERIM_BRIDGE) and bridges surface (MEAN_SURF_BRIDGE). The present invention thus also relates to a method for measuring these descriptors assessing bridging fibrosis. Examples of such methods are shown hereinafter.

In one embodiment, for each porto-septal region in $MASK_{PORT}$ (the construction of $MASK_{PORT}$ is described hereinabove), morphometric operations such as, for example, high erosion followed by a small dilation are applied. The aim is to observe a separation of the structures which determines the presence of bridges. At the end of the morphometric operations, a studied area with at least two elements is considered as a bridge and added in the $MASK_{BRIDGE}$.

In one embodiment, descriptors are measured as follows:

NB_BRIDGE is the number of bridges in $MASK_{BRIDGE}$

RATIO_BRIDGE=Pix_Mask_Bridge/Pix_Mask_Port*100

AOF_BRIDGE=Pix_Fib_Bridge/PixMASK_LB*100 wherein Pix_Mask_Port is the number of pixels in $MASK_{PORT}$, Pix_Mask_Bridge is the number of pixels in $MASK_{BRIDGE}$, Pix_Fib_Bridge is the number pixels of fibrosis in the bridges, and PixMASK_LB is the number of pixels of the total area on the LB specimen.

MEAN_THICK_BRIDGE=MEAN_SURF_BRIDGE/MEAN_PERIM_BRIDGE*100 wherein MEAN_SURF_BRIDGE is the mean of pixels representing the surface of bridges and MEAN_PERIM_BRIDGE is the mean of pixels representing the perimeter of bridges.

In one embodiment, the step (a) of method of the invention comprises or consists in measuring portal distance (DIST_EP_MEAN). As the distance between portal tracts tends to reduce when fibrosis progresses, descriptors assessing the portal distance were developed: NB_FRAG is the number of fragments in $MASK_{LB}$ and $Nb\_EP_n$ is the number of porto-septal regions present on the fragment n (wherein n ranges between 1 and NB_FRAG). For each n fragment, the minimum distance $Dmin_n$ between all porto-septal regions present on $MASK_{PORT}$ are measured. $Dmoy_n$ is the average distance between regions on the porto-septal fragment n.

$$Dmoy_n = Dmin_n/(Nb\_EPn-1).$$

The average distance between porto-septal regions for all fragments is called DIST_EP_MEAN:

$$DIST\_EP\_MEAN = (Dmoy_1 + Dmoy_2 + \ldots Dmoy_{NB\_FRAG})/NB\_FRAG.$$

In one embodiment wherein the image is a three-dimensional image, such as, for example, an image of an entire organ, the following descriptors may be measured in step (a) of the method of the invention:
External morphology descriptors:
  the characteristic of anfractuosity is assessed with the following descriptors:
    mean (MEAN_NAT_ORGAN_PERIMETER) and total native perimeter of the organ (TOT_NAT_ORGAN_PERIMETER). In particular, when the organ is liver, mean native liver perimeter (MNLP) and total native liver perimeter may be measured. In another embodiment, when the organ is spleen, total spleen perimeter (TSP) and mean total spleen perimeter (MTSP) may be measured,
    smoothed perimeter of the organ (SMOOTH_ORGAN_PERIMETER). In one embodiment where the organ is liver, total smoothed liver perimeter may thus be measured,
    ratio between the native and smoothed perimeters (RATIO_ORGAN_PERIMETER), such as, for example, ratio between the native and smoothed total liver perimeters (which may be abbreviated RNSTLP).
  largest perimeter of the organ (LARGEST_ORGAN_PERIMETER), such as, for example, largest liver perimeter,
  mean surface of the organ, such as, for example, mean liver surface,
  total surface (or area) and total mean surface (or area) of the organ, such as, for example, total liver surface, total spleen surface or mean total spleen surface,
  ratio between organ perimeter and organ surface, such as, for example, ratio between liver perimeter and liver surface (RLPS),
  indentation of the organ (ORGAN_INDENTATION), such as, for example, liver indentation,
  height (ORGAN_HEIGHT), such as, for example, liver height or spleen height,
  fractal dimension of the edges of the organ (DF_EDGE), such as, for example, fractal dimension of liver edges or mean fractal dimension of spleen edges,
  nodularity of the curved and irregular edges of the organ (ORGAN_NODULARITY), such as, for example, liver nodularity or spleen edges nodularity,
  angularity (representing the angles present on the edges); (ORGAN_ANGULARITY), such as, for example, liver angularity.
In one embodiment, a box containing the organ is drafted and the following descriptors are assessed:
  organ fat ratio (black pixels vs other pixels; ORGAN_FAT), such as, for example, liver fat ratio,
  abdominal fat ratio (black pixels vs other pixels contained in the abdomen; ABDO_FAT).
In one embodiment, descriptors related to liver and spleen may be mathematically combined. For example, the ratio spleen/liver surfaces (RSLS) or the ratio spleen/liver perimeters may be measured.
Internal morphology descriptors: In one embodiment wherein the organ is the liver, the following descriptors may be assessed:
  hypertrophy of liver segment I (one) (LIVER_HYPERTROPHY) which is observed in the high Metavir fibrosis stages. Methods for measuring hypertrophy are known from the skilled artisan, and a particular method for measuring hypertrophy is shown in the Examples. Briefly, said method includes, using the inferior cave vein as a landmark, measuring 2 antero-posterior lengths (D1 and D3), 2 transversal lengths (D2 and D4) and the surface of the segment I (Surf_S1),
  width of the liver segment IV (WIDTH_S4),
  ratio between segment I and liver surface (RS1LS),
  ratio between segment I and segment IV dimensions (RATIO_S1_S4),
  furrow thickness (D_F1),
  surface of the furrow I (Surf_F1),
  internal nodularity in the liver (LIVER_NODULARITY),
  diameter of the portal vein (PORT_DIAMETER),
  Arantius furrow thickness (PFT),
  Arantius furrow surface, and
  portal furrow thickness.
As used herein, a furrow refers to an anatomical area with a high length and small width located between two parts of the liver. Other names of furrows are: scissures and sometimes ligaments. In liver cirrhosis, due to parenchyma atrophy, furrows enlarge and are filled with fat. Thus, as fat is very visible (black in tomodensitometry), they are prominent descriptors of liver cirrhosis in radiological examinations, especially tomodensitometry. Furrow can also separate two liver lobes or segments. In the present invention, Arantius furrow depicts the area located between segment I and segment II/III of the left liver lobe (FIG. 19). Other names of Arantius furrow are: venous ligament or ligamentum venosum of Arantius.
  Structure of the organ: the following descriptors may be assessed:
    mean total density, standard deviation of total density (SDTD), coefficient of variation of total density, median total density, interquartile range of total density (IQRTD), ratio between interquartile range of total density and median of total density,
    for a region of interest (ROI) on the image: mean density of the region of interest (ROI), standard deviation of ROI density (SDROID), coefficient of variation of ROI density, median ROI density, interquartile range of ROI density and ratio between interquartile range of ROI density and median of ROI density, heterogeneity of the density intensity (HETEROGENEITY), Fractal organization of the organ (ORGAN_FRACT).

Non-limiting examples of methods that may be used for measuring these three-dimensional image descriptors are shown in the Examples.

The method of the invention may be applied to any organ or tissue of an organism.

In one embodiment of the invention, the organ or tissue is susceptible to comprise fibrosis. Examples of organs or tissues susceptible to comprise fibrosis include, but are not limited to, liver, skin, heart, lung, kidney, gut, intestine, pancreas, bone marrow, joints, and soft tissues, such as, for example, soft tissue of the mediastinum or soft tissue of the retroperitoneum.

In one embodiment of the invention, the organ or tissue is susceptible to comprise steatosis. Examples of organs or tissues susceptible to comprise steatosis include, but are not limited to, liver, kidney, heart and muscle (muscle may comprise steatosis in metabolic syndrome).

In one embodiment of the invention, the organ or tissue is liver, and the lesion is preferably related to a liver disease. Examples of liver lesions include, but are not limited to, liver fibrosis, cirrhosis, liver steatosis or non-alcoholic steato-hepatitis (NASH).

Examples of liver diseases include, but are not limited to, acute liver diseases and chronic liver diseases. Specific examples of liver diseases that may cause lesions to the liver include, but are not limited to chronic viral hepatitis C, chronic viral hepatitis B, chronic viral hepatitis D, chronic viral hepatitis E, non-alcoholic fatty liver disease (NAFLD), alcoholic chronic liver disease, autoimmune hepatitis, hemochromatosis, Wilson disease and acquired or inherited metabolic disorder.

In one embodiment of the invention, the subject is an animal, preferably a mammal, such as for example, a rat or a pet, such as, for example, a cat or a dog. According to a preferred embodiment, the subject is a human. In one embodiment of the invention, the human is a male, a female or a child.

According to an embodiment, the subject, including a human, is at risk of presenting a lesion in an organ or a tissue; or presents a lesion in an organ or a tissue. In one embodiment, said risk may correspond to a family predisposition to lesions, to a genetic predisposition to lesions, or to an environmental exposure to compounds or conditions promoting the appearance or development of lesions.

Examples of lesions whose presence and/or severity may be assessed by the method of the invention include, but are not limited to, fibrosis, steatosis, lesions induced by inflammation, tumors, polyps, nodules, cyst, ulcers, and the like.

In one embodiment of the invention, the lesion is fibrosis.

Fibrosis lesions can be distinguished according to their origin into different patterns. Therefore, in a first embodiment, the lesion includes fibrosis, such as, for examples, fibrils or septa. In a second embodiment, the lesion does not comprise fibrosis but is secondary or related to fibrosis, such as, for example, parenchymal nodules, specimen fragmentation, irregular edges . . . .

Moreover, fibrosis patterns can also be distinguished according to their development.

Therefore, in a first embodiment, the lesion is an elementary or primary lesion. Elementary or primary lesions are the smallest single lesions with pattern corresponding to an organized structure visible at the smallest usual magnification. For example, fibrosis fibers or fibrils are the basic pattern and stellar fibrosis is an elementary lesion. They correspond to architectural distortions of first rank.

In a second embodiment, the lesion is a syndromic or secondary lesion. Syndromic or secondary lesions correspond to the grouping of elementary lesions. For example, bridging fibrosis is a secondary lesion by grouping stellar fibrosis arising from two portal tracts. They correspond to architectural distortions of second rank.

In one embodiment, the lesion is fibrosis and the organ or tissue is liver or liver tissue.

In one embodiment of the invention, liver fibrosis severity is assessed to two main semi-quantitative diagnostic scores commonly used by hepatologists and pathologists: the METAVIR fibrosis score and the ISHAK staging system. The METAVIR fibrosis score comprises 5 classes (F0: no fibrosis; F1: portal fibrosis without septa; F2: portal fibrosis with rare septa; F3: numerous septa without cirrhosis; F4: cirrhosis). The ISHAK staging system comprises 7 classes based on portal and septal fibrosis and the degree of completeness for cirrhosis.

In one embodiment, the lesion is clinically significant fibrosis, which is defined by a METAVIR fibrosis score $F \geq 2$.

In another embodiment, the lesion is cirrhosis, which is defined by a METAVIR fibrosis score F=4.

As known by the skilled artisan in the art, liver fibrosis may be localized in different zones of the liver, and may present different geometrical organizations.

In one embodiment of the invention, fibrosis is portal fibrosis, septal fibrosis, porto-septal fibrosis or peri-sinusoidal fibrosis. Indeed, a first type of fibrosis usually starts in the centro-lobular region and/or in the periphery of the lobule or around the portal tracts. This fibrosis grows gradually to form bands of fibrosis, or septa, called septal fibrosis, that will extends between the portal tracts or between the portal tracts and the centro-lobular region. The second type of fibrosis is located between the rows of hepatocytes and sinusoids, the equivalent of the capillary in the liver, that is to say, in the intercellular space where there are many liver metabolic exchanges. This second type is called the peri-sinusoidal fibrosis.

In one embodiment of the invention, fibrosis is stellar fibrosis. The main feature to differentiate stage of fibrosis F0 from stage F1 and higher stages is the presence of star-branched fibrosis around porto-septal regions. These are small and fine fibrils around a more dense area.

In one embodiment of the invention, fibrosis is bridging fibrosis. Bridging fibrosis refers to a fibrosis situation wherein two portal tracts are interconnected. Bridging fibrosis fibers occur at the METAVIR stage F2, and pathologists consider that if there is a ratio of more than 50% of bridges, the METAVIR stage will be higher than F2.

In another embodiment of the invention, the lesion is steatosis.

In one embodiment of the invention, steatosis is liver steatosis, and is related to FLD (Fatty Liver Disease). FLD describes a wide range of potentially reversible conditions involving the liver, wherein large vacuoles of triglyceride fat accumulate in hepatocytes via the process of steatosis (i.e. the abnormal retention of lipids within a cell). FLD is commonly associated with alcohol or metabolic disorders (such as, for example, diabetes, hypertension, dyslipidemia, abetalipoproteinemia, glycogen storage diseases, Weber-Christian disease, Wolman disease, acute fatty liver of pregnancy or lipodystrophy). However, it can also be due to nutritional causes (such as, for example, malnutrition, total parenteral nutrition, severe weight loss, refeeding syndrome, jejuno-ileal bypass, gastric bypass or jejunal diverticulosis with bacterial overgrowth), as well as various drugs and toxins (such as, for example, amiodarone, methotrexate, diltiazem, highly active antiretroviral therapy, glucocorticoids, tamoxifen or environmental hepatotoxins) and other diseases such as inflammatory bowel disease or HIV.

Whether it is AFLD (Alcoholic Fatty Liver Disease) or NAFLD (Non-Alcoholic Fatty Liver Disease), FLD encompasses a morphological spectrum consisting from the mildest type "liver steatosis" (fatty liver), called NAFL, to the potentially more serious type "steatohepatitis", called NASH, which is associated with liver-damaging inflammation and, sometimes, the formation of fibrous tissue. In fact, steatohepatitis has the inherent propensity to progress towards the development of fibrosis then cirrhosis which can produce progressive, irreversible liver scarring or towards hepatocellular carcinoma (liver cancer).

Therefore, in one embodiment, steatosis is simple liver steatosis or NAFL (Non-alcoholic fatty liver). In another embodiment, steatosis is part of steatohepatitis or NASH.

In one embodiment, the cause of steatosis is an alcohol or metabolic syndrome, such as, for example, Diabetes, hypertension, dyslipidemia, abetalipoproteinemia, glycogen storage diseases, Weber-Christian disease, Wolman disease, acute fatty liver of pregnancy or lipodystrophy; a nutritional cause, such as, for example, malnutrition, total parenteral nutrition, severe weight loss, refeeding syndrome, jejuno-ileal bypass, gastric bypass or jejunal diverticulosis with bacterial overgrowth; consumption or exposure to drugs and toxins, such as, for example, amiodarone, methotrexate, diltiazem, highly active antiretroviral therapy, glucocorticoids, tamoxifen or environmental hepatotoxins; inflammatory bowel disease or HIV.

In another embodiment of the invention, the lesion is inflammation. In one embodiment where the organ is liver, inflammation may refer to NASH.

According to the invention, the score obtained at step (c) of the method of the invention is indicative of the presence and/or of the severity of lesions in an organ or in a tissue or a prognosis. In one embodiment of the invention, the score ranges from 0 to 1, and the higher the value of the score, the higher the probability for the subject to have developed lesions.

In one embodiment, the method of the invention is a method for assessing the presence of a lesion, preferably is a method for diagnosing pathological lesions of the organ or tissue.

In one embodiment of the invention, the method of the invention is for diagnosing a disease characterized by the presence of lesions in an organ or tissue. According to this embodiment, the score obtained at step (c) of the method of the invention is a diagnostic score, which means that it is indicative of the presence and/or of the severity of a specific disease, defined as the "diagnostic target". In one embodiment of the invention, the score ranges from 0 to 1, and the higher the value of the score, the higher the probability for the subject to be diagnosed with the diagnostic target.

Examples of diagnostic targets include, but are not limited to, clinically significant fibrosis (i.e. Metavir F stage≥2), severe fibrosis (i.e. Metavir F stage≥3), cirrhosis, NAFLD or NASH.

In one embodiment of the invention, the method of the invention allows a direct assessment of the presence and/or severity of a lesion, or a direct diagnostic of the diagnostic target, i.e. the method leads to a binary diagnostic. In other words, according to this embodiment, the method of the invention usually leads to a dual type response "yes or no": according to the value of the score obtained at step (c), a direct conclusion about the presence and/or severity of a lesion or a disease may be given. For example, according to this embodiment, when the diagnostic target is clinically significant fibrosis, the method of the invention allows determining if the subject is affected or not by clinically significant fibrosis.

In one embodiment of the invention, the method of the invention thus leads to the classification of the subject in a class of a classification. For example, when the lesion is fibrosis and the organ is liver, the method of the invention may determine the METAVIR F stage or the ISHAK F stage of the subject. In another embodiment of the invention, the method of the invention indicates, for the subject, a belonging probability for each class of a classification. For example, when the lesion is fibrosis and the organ is liver, the method of the invention may indicate the probability of the subject to belong to each class (e.g. F1/2) of the METAVIR F stage or of the ISHAK stage. In one embodiment of the invention, the method of the invention is for classifying a subject in a classical classification. Examples of classical classification for liver fibrosis include, but are not limited to, METAVIR staging and ISHAK staging. In another embodiment of the invention, the method of the invention is for classifying a subject in a classification, whatever said classification is classical or not.

In another embodiment of the invention, the method of the invention is for determining an increased risk of complications due to the presence and/or severity of lesions or of the disease, preferably of the diagnostic target. According to this embodiment, the score obtained at step (c) of the method of the invention is a prognostic score, which is a score indicative of an increased risk of overall mortality or of liver mortality or of hepatic complications. Examples of complications include, but are not limited to, death, hospitalization, severe impairment of the function of the organ or tissue comprising the lesions, potentially leading to the necessity of a graft of said organ, ascites, encephalopathy, variceal beeding jaundice, hepatorenal syndrome, and the like.

In one embodiment, in step (c) of the method of the invention, the score calculated at step (b) is compared to a reference score in order to assess the presence and/or the severity of the lesion or to make a prognosis.

In one embodiment, the reference score may be an index value or may be derived from one or more risk prediction algorithms or computed indices for the presence and/or severity of a lesion or for prognosis. A reference score can be relative to a number or value derived from population studies, including, without limitation, such subjects having similar age range, subjects in the same or similar ethnic group, subjects having family histories of lesions within the organ, subjects affected by or not affected by a lesion within the organ or tissue, or relative to the starting sample of a subject undergoing treatment for a lesion within the organ or tissue.

In one embodiment, a score obtained at step (b) inferior or equal to about 10%, 20%, 30%, 40%, 50%, 60%, 70%, 80%, 90%, 100% or more of the reference score is indicative of the presence of a lesion, or is indicative of the severity of the lesion or indicative of the risk of mortality or liver complications.

In one embodiment, a score obtained at step (b) superior or equal to about 10%, 20%, 30%, 40%, 50%, 60%, 70%, 80%, 90%, 100% or more of the reference score is indicative of the presence of a lesion, or is indicative of the severity of the lesion.

In one embodiment, the reference value is a personalized reference, i.e. the reference value was determined using a sample obtained from the subject. According to an embodiment, a difference between the score obtained in step (b) and the personalized reference score is indicative of the appearance or disappearance of a lesion, or of an increased or a decreased severity of a pre-existing lesion.

In one embodiment of the present invention, the reference score is derived from the score obtained from a control sample derived from one or more subjects who are substantially healthy, i.e. who do not present lesion within their organ or tissue.

In another embodiment, a reference score can also be derived from the score in a sample derived from one or more subject who has been previously diagnosed or identified with a lesion in an organ or tissue, or are at high risk for developing a lesion, or who have suffered from a lesion.

According to one embodiment, the score obtained at step (b) may be positioned in a class of a classification which is set up in a reference population of patients with a lesion in an organ, such as, for example, a reference population with a chronic liver disease. According to the invention, the presence and/or the severity of a lesion in an organ may be assessed according to the class wherein the score obtained at step (b) has been classified. According to an embodiment, the reference population may be a population of patients affected with a hepatitis virus, preferably with the hepatitis C virus. According to an embodiment, the reference population contains at least about 50, 75, 100, 200, 300, 400, 500 patients, preferably at least about 700 patients, more preferably at least about 1000 patients.

According to an embodiment, in order to set up a classification relating a score with the presence and/or the severity of a lesion, the following data are needed for each patient of the reference population:
- a score measured according to the present invention, and
- a histological staging, preferably a histological staging according to the Metavir system, obtained by a biopsy of the organ or tissue, such as, for example, a liver biopsy.

In one embodiment of the invention, the method for assessing the presence and/or the severity of a lesion in an organ or a tissue of a subject further comprises classifying the subject using a conventional semi-quantitative scoring or staging system. For example, for assessing the presence and/or the severity of a liver lesion, the method of the invention comprises determining the Metavir F score ($F_M$ score) and/or the Ishak stage.

In one embodiment, the Metavir F score ($F_M$ score) and/or the Ishak stage is mathematically combined with the at least one descriptor of the invention.

In one embodiment of the invention, the method of the invention further comprises measuring at least one non-invasive test marker (i.e. markers measured by a non-invasive test) in step (a). According to one embodiment, the non-invasive test markers are mathematically combined with the two-dimensional image descriptors and/or with the three-dimensional image descriptors measured in step (a).

As used herein, a "Non-invasive diagnostic test" refers to a test for diagnosing, or for assessing the presence and/or severity of a lesion in an organ or tissue or of a disease. In one embodiment, a non-invasive diagnostic test may give a data, or a score, which all correspond within the present invention to a "non-invasive test marker". Such test may use measurement of biomarkers (measured in a sample from the subject, wherein the sample may be a bodily fluid sample, such as, for example, a blood, serum or urine sample, preferably a blood or serum sample), clinical data (i.e. data recovered from external observation of the subject, without the use of laboratory tests and the like), physical data (such as those obtained by the Fibroscan, for example), or scores. In one embodiment, a non-invasive test marker may be a biomarker, a clinical data, a physical data, or a score.

Examples of non-invasive tests resulting in a score include, but are not limited to, ELF, FibroSpect™, Hepascore, Fibrotest™, FibroMeter™, InflaMeter™, CirrhoMeter™, CombiMeter™, APRI and FIB-4.

Examples of biomarkers include, but are not limited to, glycemia, total cholesterol, HDL cholesterol (HDL), LDL cholesterol (LDL), AST (aspartate aminotransferase), ALT (alanine aminotransferase), AST/ALT, AST.ALT, ferritin, platelets (PLT), AST/PLT, prothrombin time (PT) or prothrombin index (PI), hyaluronic acid (HA or hyaluronate), haemoglobin, triglycerides, alpha-2 macroglobulin (A2M), gamma-glutamyl transpeptidase (GGT), urea, bilirubin, apolipoprotein A1 (ApoA1), type III procollagen N-terminal propeptide (P3NP), gamma-globulins (GBL), sodium (Na), albumin (ALB), ferritine (Fer), glucose (Glu), alkaline phosphatases (ALP), YKL-40 (human cartilage glycoprotein 39), tissue inhibitor of matrix metalloproteinase 1 (TIMP-1), TGF, cytokeratine 18 and matrix metalloproteinase 2 (MMP-2) to 9 (MMP-9), ratios and mathematical combinations thereof.

In one embodiment, the non-invasive test marker is a binary marker, i.e. a marker having the value 0 or 1. Examples of binary non-invasive test markers include, but are not limited to, diabetes or SVR (wherein SVR stands for sustained virologic response, and is defined as aviremia 10 weeks, preferably 20 weeks, more preferably 24 weeks after completion of antiviral therapy for chronic hepatitis C virus (HCV) infection).

Examples of clinical data include, but are not limited to, weight, body mass index, age, sex, hip perimeter, abdominal perimeter or height and mathematical combinations thereof, such as, for example, the ratio thereof, such as for example hip perimeter/abdominal perimeter.

Examples of physical methods, such as, for example, physical methods for assessing liver disease include, but are not limited to, medical imaging data and clinical measurements, such as, for example, measurement of spleen, especially spleen length. According to an embodiment, the physical method is selected from the group comprising ultrasonography, especially Doppler-ultrasonography and elastometry ultrasonography and velocimetry ultrasonography (preferred tests using said data are Fibroscan™, ARFI, VTE, supersonic imaging), MRI (Magnetic Resonance Imaging), and MNR (Magnetic Nuclear Resonance) as used in spectroscopy, especially MNR elastometry or velocimetry. Preferably, the data are Liver Stiffness Evaluation (LSE) data or spleen stiffness evaluation. According to a preferred embodiment of the invention, the data from physical methods are issued from a Fibroscan™

Examples of tests include, but are not limited to ELF, FibroSpect™, APRI, FIB-4, Hepascore, Fibrotest™, FibroMeter™, CirrhoMeter™, CombiMeter™, InflaMeter™.

ELF is a blood test based on hyaluronic acid, P3P, TIMP-1 and age.

FibroSpect™ is a blood test based on hyaluronic acid, TIMP-1 and A2M.

APRI is a blood test based on platelet and AST.

FIB-4 is a blood test based on platelet, ASAT, ALT and age.

HEPASCORE is a blood test based on hyaluronic acid, bilirubin, alpha2-macroglobulin, GGT, age and sex.

FIBROTEST™ is a blood test based on alpha2-macroglobulin, haptoglobin, apolipoprotein A1, total bilirubin, GGT, age and sex.

FIBROMETER™ and CIRRHOMETER™ together form to a family of blood tests, the content of which depends on the cause of chronic liver disease and the diagnostic target, and this blood test family is called FM family and detailed in the table below.

|  | Variables | | | | | | | | | | | | |
|---|---|---|---|---|---|---|---|---|---|---|---|---|---|
| Cause | Age | Sex | Weigth | A2M | HA | PI | PLT | AST | Urea | GGT | ALT | Fer | Glu |
| Virus | | | | | | | | | | | | | |
| FM V 1G | x | | | x | x | x | x | x | x | | | | |
| FM V 2G | x | x | | x | x | x | x | x | x | | | | |
| CM V 2G | x | x | | x | x | x | x | x | x | | | | |
| FM V 3G[a] | x | x | | x | | x | x | x | x | x | | | |
| CM V 3G[a] | x | x | | x | | x | x | x | x | x | | | |
| Alcohol | | | | | | | | | | | | | |
| FM A 1G | x | | | x | x | x | | | | | | | |
| FMA 2G | | | | x | x | x | | | | | | | |
| NAFLD (steatosis) | | | | | | | | | | | | | |
| FM S | x | | x | | | | x | x | | | x | x | x |

FM: FibroMeter,
CM: CirrhoMeter,
A2M: alpha-2 macroglobulin,
HA: hyaluronic acid,
PI: prothrombin index,
PLT: platelets,
Fer: ferritin,
Glu: glucose
[a]HA may be replaced by GGT COMBIMETER™ or Elasto-FibroMeter™ is a family of tests based on the mathematical combination of variables of the FM family (as detailed in the Table hereinabove) or of the result of a test of the FM family with FIBROSCAN™ result. In one embodiment, said mathematical combination is a binary logistic regression.

In one embodiment, CombiMeter™ results in a score based on the mathematical combination of physical data from liver or spleen elastometry such as dispersion index from Fibroscan™ such as IQR or IQR/median or median, preferably of Fibroscan™ median with at least 3, preferably at least 4, 5, 6, 7 or more and more preferably of 7 or 8 or 9 biomarkers and/or clinical data selected from the list comprising glycemia, total cholesterol, HDL cholesterol (HDL), LDL cholesterol (LDL), AST (aspartate aminotransferase), ALT (alanine aminotransferase), AST/ALT, AST.ALT, ferritin, platelets (PLT), AST/PLT, prothrombin time (PT) or prothrombin index (PI), hyaluronic acid (HA or hyaluronate), haemoglobin, triglycerides, alpha-2 macroglobulin (A2M), gamma-glutamyl transpeptidase (GGT), urea, bilirubin, apolipoprotein A1 (ApoA1), type III procollagen N-terminal propeptide (P3NP), gamma-globulins (GBL), sodium (Na), albumin (ALB), ferritine (Fer), glucose (Glu), alkaline phosphatases (ALP), YKL-40 (human cartilage glycoprotein 39), tissue inhibitor of matrix metalloproteinase 1 (TIMP-1), TGF, cytokeratine 18 and matrix metalloproteinase 2 (MMP-2) to 9 (MMP-9), diabetes, weight, body mass index, age, sex, hip perimeter, abdominal perimeter or height and the ratio thereof ratios and mathematical combinations thereof.

In one embodiment, CombiMeter™ results in a score based on the mathematical combination of Fibroscan™ median with at least 3, preferably at least 4, 5, 6, 7 or more and more preferably of 7 or 8 or 9 biomarkers and/or clinical data selected from the list comprising alpha-2-macroglobulin (A2M), hyaluronic acid (HA), prothrombin index (PI), platelets (PLT), AST, Urea, GGT, Bilirubin (Bili), ALT, Ferritin, Glucose, age, sex and weight.

In one embodiment, CombiMeter™ results in a score based on the mathematical combination of Fibroscan™ median with platelets, PI, AST, HA, A2M, sex and age. In one embodiment, CombiMeter™ score is called E-FibroMeter$^{2G}$ and is the following: 1.2910+0.2143 Fibroscan (kPa)−0.0046 platelets (G/L)−0.0273 prothrombin index (%)+0.0032 AST (UI/L)+0.0028 hyaluronate (μg/L)+0.7692 A2M (g/L)+0.1400 sex (F=0, M=1)+0.0119 age (years).

In one embodiment, CombiMeter™ results in a score based on the mathematical combination of Fibroscan™ median with platelets, PI, AST, HA, A2M, urea, ALT, sex and age.

In one embodiment, CombiMeter™ results in a score based on the mathematical combination of Fibroscan™ median with platelets, PI, AST, HA, A2M, urea, sex and age.

In one embodiment, CombiMeter™ results in a score based on the mathematical combination of Fibroscan™ median with platelets, PI, AST, HA, A2M, ALT, sex and age.

In one embodiment, CombiMeter™ results in a score based on the mathematical combination of Fibroscan™ median with PI, AST, A2M, diabetes and age.

In one embodiment, CombiMeter™ results in a score based on the mathematical combination of Fibroscan™ median with PI, AST/ALT, A2M, platelets, and diabetes.

In one embodiment, CombiMeter™ results in a score based on the mathematical combination of Fibroscan™ median with PI, HA, and A2M.

In another embodiment, CombiMeter™ results in a score based on the mathematical combination of Fibroscan™ median with a score of CirrhoMeter™, preferably a score of CirrhoMeter$^{2G}$.

In another embodiment, CombiMeter™ results in a score based on the mathematical combination of Fibroscan™ median with a score of FibroMeter™, preferably a score of FibroMeter$^{2G}$.

INFLAMETER™ is a companion test reflecting necro-inflammatory activity including ALT, A2M, PI, and platelets.

In one embodiment, the method for assessing the presence and/or the severity of a lesion in an organ or a tissue of a subject comprises recovering at least one two-dimensional image of said organ or tissue, preferably a histological section image.

In another embodiment, the method for assessing the presence and/or the severity of a lesion in an organ or a tissue of a subject comprises recovering at least one three-dimensional image of said organ or tissue, preferably an image of the entire organ or tissue, more preferably an image recovered by a non-invasive method, such as, for example, tomodensimetry.

In one embodiment, the method for assessing the presence and/or the severity of a lesion in an organ or a tissue of a subject comprises recovering at least one two-dimensional image of said organ or tissue, preferably a histological section image and at least one three-dimensional image of said organ or tissue, preferably an image of the entire organ or tissue, more preferably an image recovered by a non-invasive method, such as, for example, tomodensimetry. According to one embodiment, the at least one two-dimensional image descriptor (i.e. descriptors measured on said at least one two-dimensional image) and the at least one three-dimensional image descriptor (i.e. descriptors measured on said at least one three-dimensional image) measured in step (a) are mathematically combined in a score in step (b).

In one embodiment, the method for assessing the presence and/or the severity of a lesion in an organ or a tissue of a subject further comprises assessing at least one non-invasive test marker as described hereinabove. According to one embodiment, the non-invasive test markers measured in step (a) are mathematically combined with the two-dimensional image descriptors and/or with the three-dimensional image descriptors in a score in step (b).

Therefore, in some embodiments, the method of the invention may comprise measuring in step (a):
At least one two-dimensional image descriptor;
At least one two-dimensional image descriptor and at least one non-invasive tests marker;
At least one three-dimensional image descriptor;
At least one three-dimensional image descriptor and at least one non-invasive tests marker;
At least one two-dimensional image descriptor and at least one three-dimensional image descriptor; or
At least one two-dimensional image descriptor and at least one three-dimensional image descriptors and at least one non-invasive tests marker.

In one embodiment of the invention, the mathematical combination of step (b) is a linear combination of several descriptors (x, y, . . . ) like a+bx+cy (a, b, c . . . being the coefficients), preferably a binary logistic regression. In one embodiment of the invention, the mathematical function of step (b) is a binary logistic regression, a multiple linear regression or any multivariate statistical analysis. In one embodiment of the invention, the mathematical combination of step (b) is a combination with a logit function. In one embodiment of the invention, the mathematical combination of step (b) implies a linear discriminant analysis. In one embodiment of the invention, the mathematical combination of at least two descriptors does not consist in the ratio or division of two descriptors. In another embodiment, the mathematical combination of at least two descriptors does not comprise the ratio or division of said at least two descriptors.

In one embodiment, the diagnostic target is clinically significant fibrosis, and the method of the invention comprises measuring in step (a) and mathematically combining in a score in step (b) the following descriptors: linearity percentage of the edges, mean of percentage of fibrosis around areas (i.e. nodularity percentage), area of stellar fibrosis among the total surface of the LB specimen, number of bridges and bridges thickness. Preferably, said mathematical combination is a binary logistic regression.

In another embodiment, the diagnostic target is clinically significant fibrosis, and the method of the invention comprises measuring in step (a) and mathematically combining in a score in step (b) the following descriptors: bridges thickness and linearity percentage of the edges.

Preferably, said mathematical combination is a binary logistic regression.

In another embodiment, the diagnostic target is clinically significant fibrosis, and the method of the invention comprises measuring in step (a) and mathematically combining in a score in step (b) the following descriptors: mean area of porto-septal regions, bridges perimeter, ratio of bridges among the porto-septal areas, mean of percentage of fibrosis around areas, area of fibrosis in the bridges and fractal dimension of peri-sinusoidal fibrosis.

Preferably, said mathematical combination is a binary logistic regression.

In another embodiment, the diagnostic target is clinically significant fibrosis, and the method of the invention comprises measuring in step (a) and mathematically combining in a score in step (b) the following descriptors: perimeter of the organ, tissue or fragment thereof, area of fibrosis in the bridges, fractal dimension of porto-septal fibrosis, ratio of peri-sinusoidal fibrosis among the whole fibrosis, length of the organ, tissue or fragment thereof, fractal dimension of peri-sinusoidal fibrosis and anfractuosity descriptors (native perimeter, smoothed perimeter and ratio between both perimeters).

Preferably, said mathematical combination is a binary logistic regression.

In another embodiment, the diagnostic target is clinically significant fibrosis, and the method of the invention comprises measuring in step (a) and mathematically combining in a score in step (b) the following descriptors: interquartile range of total density, Arantius furrow thickness, mean native liver perimeter, mean total spleen perimeter, and ratio spleen surface to liver surface.

In another embodiment, the diagnostic target is clinically significant fibrosis, and the method of the invention comprises measuring in step (a) and mathematically combining in a score in step (b):
the following descriptors: linearity percentage of the edges, mean of percentage of fibrosis around areas (i.e. nodularity percentage), area of stellar fibrosis among the total surface of the LB specimen, number of bridges, bridges thickness and fractal dimension of fibrosis; or mathematic combination thereof and
FibroMeter™ or CirrhoMeter™ 2G, preferably FM V 2G.

In another embodiment, the diagnostic target is clinically significant fibrosis, and the method of the invention comprises measuring in step (a) and mathematically combining in a score in step (b):
- the following descriptors: linearity percentage of the edges, mean of percentage of fibrosis around areas (i.e. nodularity percentage), area of stellar fibrosis among the total surface of the LB specimen, number of bridges and bridges thickness; or mathematic combination thereof and
- FibroMeter™ or CirrhoMeter™ 2G, preferably FM V 2G.

In another embodiment, the diagnostic target is clinically significant fibrosis, and the method of the invention comprises measuring in step (a) and mathematically combining in a score in step (b):
- the following descriptors: interquartile range of total density, Arantius furrow thickness, mean native liver perimeter, mean total spleen perimeter, and ratio spleen surface to liver surface,
- liver stiffness, preferably evaluated with a Fibroscan™, and
- optionally at least one, preferably 1, 2 or 3 non-invasive diagnostic test markers, such as, for example, PI, A2M and AST.

In another embodiment, the diagnostic target is clinically significant fibrosis, and the method of the invention comprises measuring in step (a) and mathematically combining in a score in step (b):
at least one, preferably at least 2, 3, 4, 5, 6, 7, 8, 9, or 10 descriptors selected from the group consisting of linearity percentage of the edges, mean of percentage of fibrosis around areas (i.e. nodularity percentage), area of stellar fibrosis among the total surface of the LB specimen, number of bridges, bridges thickness, mean area of porto-septal regions, bridges perimeter, ratio of bridges among the porto-septal areas, area of fibrosis in the bridges and fractal dimension of peri-sinusoidal fibrosis, perimeter of the organ, tissue or fragment thereof, fractal dimension of porto-septal fibrosis, ratio of peri-sinusoidal fibrosis among the whole fibrosis, length of the organ, tissue or fragment thereof, anfractuosity descriptors (native perimeter, smoothed perimeter and ratio between both perimeters), fractal dimension of fibrosis, interquartile range of total density, Arantius furrow thickness, mean native liver perimeter, mean total spleen perimeter, ratio spleen surface to liver surface and mathematic combination thereof and
- optionally liver stiffness, preferably evaluated with a Fibroscan™, and
- optionally at least one, preferably 1, 2 or 3 non-invasive diagnostic test markers, such as, for example, FibroMeter™ 2G, PI, A2M and AST.

In one embodiment, the diagnostic target is severe fibrosis and the method of the invention comprises measuring in step (a) and mathematically combining in a score in step (b) the following descriptors: ratio segment I surface to liver surface, second transversal segment I length (D4) and ratio native total liver perimeter to smoothed total liver perimeter.

In another embodiment, the diagnostic target is severe fibrosis and the method of the invention comprises measuring in step (a) and mathematically combining in a score in step (b):
- the following descriptors: ratio segment I surface to liver surface, second transversal segment I length (D4) and ratio native total liver perimeter to smoothed total liver perimeter,
- liver stiffness, preferably evaluated with a Fibroscan™, and
- optionally at least one, preferably one, non-invasive diagnostic test markers, such as, for example, AST.

In one embodiment, the diagnostic target is cirrhosis, and the method of the invention comprises measuring in step (a) and mathematically combining in a score in step (b) the following descriptors: linearity percentage of the edges, granularity percentage, fragmentation, mean of percentage of fibrosis around areas (i.e. nodularity percentage), area of stellar fibrosis among the surface of porto-septal regions, and portal distance. Preferably, said mathematical combination is a binary logistic regression.

In another embodiment, the diagnostic target is cirrhosis, and the method of the invention comprises measuring in step (a) and mathematically combining in a score in step (b) the following descriptor: mean of percentage of fibrosis around areas (i.e. nodularity percentage).

Preferably, said mathematical combination is a binary logistic regression.

In another embodiment, the diagnostic target is cirrhosis, and the method of the invention comprises measuring in step (a) and mathematically combining in a score in step (b) the following descriptors: mean of percentage of fibrosis around areas (i.e. nodularity percentage), linearity percentage of the edges, length of the liver biopsy, fractal dimension of porto-septal fibrosis, area of stellar fibrosis among the surface of porto-septal regions, number of bridges, fractal dimension of peri-sinusoidal fibrosis, perimeter of the organ, tissue or fragment thereof.

Preferably, said mathematical combination is a binary logistic regression.

In another embodiment, the diagnostic target is cirrhosis, and the method of the invention comprises measuring in step (a) and mathematically combining in a score in step (b) the following descriptors: standard deviation of total density, second antero-posterior segment I length (D3), portal furrow thickness, and ratio between spleen surface and liver surface. In one embodiment, the method of the invention further comprises measuring total spleen perimeter.

In one embodiment, the diagnostic target is cirrhosis, and the method of the invention comprises measuring in step (a) and mathematically combining in a score in step (b):
- the following descriptors: linearity percentage of the edges, granularity percentage, fragmentation, mean of percentage of fibrosis around areas (i.e. nodularity percentage), area of stellar fibrosis among the surface of porto-septal regions, and portal distance; or mathematic combination thereof and
- liver stiffness, preferably evaluated with a Fibroscan™.

In another embodiment, the diagnostic target is cirrhosis, and the method of the invention comprises measuring in step (a) and mathematically combining in a score in step (b):
- the following descriptors: standard deviation of total density, second antero-posterior segment I length (D3), Arantius furrow thickness, and ratio between spleen surface and liver surface, and total spleen perimeter,
- liver stiffness, preferably evaluated with a Fibroscan™, and
- optionally at least one, preferably 1, 2 or 3 non-invasive diagnostic test markers, such as, for example, GGT, age and HA.

In another embodiment, the diagnostic target is cirrhosis, and the method of the invention comprises measuring in step (a) and mathematically combining in a score in step (b):
at least one, preferably at least 2, 3, 4, 5, 6, 7, 8, 9, or 10 descriptors selected from the group consisting of linearity percentage of the edges, granularity percentage, fragmentation, mean of percentage of fibrosis around areas (i.e. nodularity percentage), area of stellar fibrosis among the surface of porto-septal regions, portal distance, length of the liver biopsy, fractal dimension of porto-septal fibrosis, number of bridges, fractal dimension of peri-sinusoidal fibrosis, perimeter of the organ, tissue or fragment thereof, standard deviation of total density, second antero-posterior segment I length (D3), Arantius furrow thickness, ratio between spleen surface and liver surface, total spleen perimeter, portal furrow thickness and mathematic combination thereof, and liver stiffness, preferably evaluated with a Fibroscan™, and optionally a non-invasive diagnostic test marker, such as, for example, GGT, age or HA.

In one embodiment, the method of the invention comprises measuring in step (a) and mathematically combining in a score in step (b): Arantius furrow thickness, mean native liver perimeter, ratio spleen surface to liver surface, standard deviation of total density, and spleen height.

In one embodiment, the method of the invention comprises measuring in step (a) and mathematically combining in a score in step (b):

the following descriptors: interquartile range of total density, Arantius furrow thickness, mean native liver perimeter, mean total spleen perimeter, ratio of spleen surface to liver surface, standard deviation of total density, second antero-posterior segment I length, total spleen perimeter, standard deviation of ROI density, ratio liver perimeter to liver surface, largest liver perimeter and mathematical combination thereof, liver stiffness, preferably evaluated with a Fibroscan™, and optionally at least one, preferably 1, 2 or 3 non-invasive diagnostic test markers, such as, for example, PI and A2M, and mathematical combination thereof.

In one embodiment, the method of the invention comprises measuring in step (a) and mathematically combining in a score in step (b):

the following descriptors: interquartile range of total density, Arantius furrow thickness, mean native liver perimeter, mean total spleen perimeter, ratio of spleen surface to liver surface, standard deviation of total density, second antero-posterior segment I length, total spleen perimeter, standard deviation of ROI density, and mathematical combination thereof, liver stiffness, preferably evaluated with a Fibroscan™, and optionally at least one, preferably 1, 2 or 3 non-invasive diagnostic test markers, such as, for example, PI and A2M, and mathematical combination thereof.

In one embodiment, the diagnostic target is NAFLD (non-alcoholic fatty liver disease), preferably NASH (non-alcoholic steatohepatitis), and the method of the invention comprises measuring in step (a) and mathematically combining in a score in step (b) the following descriptors: fractal dimension of steatosis, fractal dimension of fibrosis and relative area of steatosis.

Preferably, said mathematical combination is a binary logistic regression.

In one embodiment, the diagnostic target is definitive NASH, and the method of the invention comprises measuring in step (a) and mathematically combining in a score in step (b) the following descriptors: luminosity contrast between fibrosis and parenchyma, biopsy length and area of stellar fibrosis among the total surface of the LB specimen.

Preferably, said mathematical combination is a binary logistic regression.

In one embodiment, the diagnostic target is borderline and definitive NASH, and the method of the invention comprises measuring in step (a) and mathematically combining in a score in step (b) the following descriptors: luminosity contrast between fibrosis and parenchyma, area of stellar fibrosis among the surface of porto-septal regions and area of stellar fibrosis among the total surface of the LB specimen.

Preferably, said mathematical combination is a binary logistic regression.

In one embodiment, the method of the invention is for predicting the METAVIR stage of a subject, and comprises measuring in step (a) and mathematically combining in a score in step (b) the following descriptors: linearity percentage of the edges, granularity percentage, fragmentation, mean of percentage of fibrosis around areas (i.e. nodularity percentage), fractal dimension of porto-septal fibrosis, fractal dimension of peri-sinusoidal fibrosis, ratio of peri-sinusoidal fibrosis among the whole fibrosis and ratio of bridges among the porto-septal areas.

Preferably, said mathematical combination is a linear discriminant analysis.

In one embodiment, the method of the invention is for determining an increased risk of complications due to the presence and/or severity of lesions or to the presence of the diagnostic target, and the score of the invention is a prognostic score.

In one embodiment, the method of the invention is for determining an increased risk of complications due to the presence and/or severity of lesions or to the presence of the diagnostic target, preferably of liver related mortality and comprises measuring in step (a) and mathematically combining in a prognostic score in step (b) the following descriptors: area of porto-septal fibrosis, area of stellar fibrosis among the surface of lobular regions (i.e. lobular area of stellar fibrosis), number of nodules and number of bridges.

In one embodiment, the method of the invention is for determining an increased risk of complications due to the presence and/or severity of lesions or to the presence of the diagnostic target, preferably of liver complications and comprises measuring in step (a) and mathematically combining in a prognostic score in step (b) the following descriptors:

bridges surface (i.e. mean bridge area), fractal dimension of steatosis and linearity percentage of the edges, mean of percentage of fibrosis around areas (i.e. nodularity percentage), area of stellar fibrosis among the surface of porto-septal regions (i.e. portal area of stellar fibrosis), portal distance, granularity percentage, fragmentation or mathematical combination thereof.

In one embodiment, the method of the invention is for determining an increased risk of complications due to the presence and/or severity of lesions or to the presence of the diagnostic target, preferably of overall mortality and comprises measuring in step (a) and mathematically combining in a prognostic score in step (b):

the following descriptor: area of porto-septal fibrosis, and Metavir $F_M$ score.

In one embodiment, the method of the invention is for determining an increased risk of mortality and comprises measuring in step (a) and mathematically combining in a prognostic score in step (b):

the following descriptors: portal distance, fractal dimension of the edges of the organ, tissue or fragment thereof,
CirrhoMeter™ Virus 2G,
FibroTest™; and
SVR.

In one embodiment, the method of the invention is for determining an increased risk of mortality and comprises measuring in step (a) and mathematically combining in a prognostic score in step (b):
the following descriptors: linearity percentage of the edges, granularity percentage, fragmentation, mean of percentage of fibrosis around areas (i.e. nodularity percentage), area of stellar fibrosis among the surface of porto-septal regions, and portal distance or mathematical combination thereof,
CirrhoMeter™ Virus 2G.

In one embodiment, the method of the invention is for determining an increased risk of liver-related mortality and comprises measuring in step (a) and mathematically combining in a prognostic score in step (b):
area of steatosis, and
CirrhoMeter™ Virus 2G.

In one embodiment, the method of the invention is for determining an increased risk of liver-related mortality and comprises measuring in step (a) and mathematically combining in a prognostic score in step (b):
the following descriptors: linearity percentage of the edges, granularity percentage, fragmentation, mean of percentage of fibrosis around areas (i.e. nodularity percentage), area of stellar fibrosis among the surface of porto-septal regions, portal distance, area of steatosis and mean intensity of the image on the blue component or mathematical combination thereof,
CirrhoMeter™ Virus 2G.

In one embodiment, the method of the invention is for determining an increased risk of liver complications and comprises measuring in step (a) and mathematically combining in a prognostic score in step (b):
the following descriptors: number of nodules and area of steatosis,
CirrhoMeter™ Virus 2G,
FibroTest™,
Hepascore, and
SVR.

In one embodiment, the method of the invention is for determining an increased risk of liver complications and comprises measuring in step (a) and mathematically combining in a prognostic score in step (b):
the following descriptors: mean intensity of the image on the blue component, fractal dimension of the edges, luminosity of the parenchyma staining in the green component, number of fragments and area of steatosis, and
CirrhoMeter™ Virus 2G.

In one embodiment, the method of the invention is for determining an increased risk of complications due to the presence and/or severity of lesions or to the presence of the diagnostic target, and the method comprises measuring in step (a) and mathematically combining in a prognostic score in step (b):
at least one, preferably at least 2, 3, 4, 5, 6, 7, 8, 9, or 10 descriptors selected from the list consisting of linearity percentage of the edges, granularity percentage, fragmentation, mean of percentage of fibrosis around areas (i.e. nodularity percentage), area of stellar fibrosis among the surface of porto-septal regions (i.e. portal area of stellar fibrosis), area of stellar fibrosis among the surface of lobular regions (i.e. lobular area of stellar fibrosis), area of porto-septal fibrosis, portal distance, fractal dimension of the edges of the organ, tissue or fragment thereof, area of steatosis, mean intensity of the image on the blue component, number of nodules, number of bridges, mean bridge area (i.e. bridge surface), fractal dimension of steatosis, luminosity of the parenchyma staining in the green component, fragmentation, granularity percentage, number or fragments or mathematical combination thereof,
optionally a Metavir F score ($F_M$ score) and/or a Ishak stage,
optionally a non-invasive diagnostic test marker, preferably selected from the group comprising CirrhoMeter™ virus 2G, FibroTest™, or Hepascore, and
optionally a binary non-invasive diagnostic test marker, preferably SVR.

In one embodiment of the invention, the method of the invention comprises measuring in step (a) and mathematically combining in a score in step (b):
at least 1, 2, 3, 4, 5, 6, 7 or 8 descriptors selected from the list comprising: linearity percentage of the edges, granularity percentage, perimeter of the organ, tissue or fragment thereof, fragmentation, mean of percentage of fibrosis around areas, fractal dimension of porto-septal fibrosis, mean of percentage of fibrosis around areas, area of fibrosis in the bridges, fractal dimension of peri-sinusoidal fibrosis, ratio of peri-sinusoidal fibrosis among the whole fibrosis, area of stellar fibrosis among the total surface of the LB specimen, area of stellar fibrosis among the surface of porto-septal regions, number of bridges, bridges perimeter, ratio of bridges among the porto-septal areas, bridges thickness, mean area of porto-septal regions, length of the organ, tissue or fragment thereof, length of a liver biopsy, anfractuosity descriptor (native perimeter, smooted perimeter and ratio between both perimeters), fractal dimension of steatosis, fractal dimension of fibrosis, relative area of steatosis, mean intensity of the image on the blue component, portal distance, fractal dimension of the edges, luminosity contrast between fibrosis and parenchyma, number of nodules, and luminosity of the parenchyma staining in the green component, biopsy length, Arantius furrow thickness, area of porto-septal fibrosis, area of steatosis, area of stellar fibrosis among the surface of lobular regions (i.e. lobular area of stellar fibrosis), bridges surface (i.e. mean bridge area), interquartile range of total density, largest liver perimeter, mean total spleen perimeter, mean native liver perimeter, ratio between spleen surface and liver surface, ratio liver perimeter to liver surface, ratio native total liver perimeter to smoothed total liver perimeter, ratio segment I surface to liver surface, ratio spleen surface to liver surface, second antero-posterior segment I length (D3), second transversal segment I length (D4), standard deviation of total density, standard deviation of ROI density, total spleen perimeter, number of fragments, portal furrow thickness and mathematic combination thereof, and
optionally a Metavir F score ($F_M$ score) and/or a Ishak stage,
optionally a non-invasive diagnostic test marker, preferably selected from the group comprising FibroMeter™ 2G CirrhoMeter™ virus 2G, FibroTest™, Hepascore, PI, A2M, GGT, Age, HA or AST, liver stiffness, preferably evaluated with a Fibroscan™, and optionally a binary non-invasive diagnostic test marker, preferably SVR.

In one embodiment of the invention, the accuracy of the method of the invention corresponds to the percentage of correctly diagnosed or classified patient. Advantageously, the percentage of correctly diagnosed or classified patients is of at least about 70%, about 75%, about 80%, preferably at least about 85%, more preferably at least about 90%, and even more preferably at least about 95%.

In another embodiment of the invention, the accuracy of the method of the invention is assessed by the AUROC of the method. Advantageously, the AUROC is of at least about 0.85, preferably at least about 0.90, more preferably at least about 0.95 and even more preferably at least about 0.99.

In another embodiment the accuracy of the method of the invention is assessed by measuring the weighted kappa index. Advantageously, the weighted kappa index is of at least about 0.8, preferably of at least about 0.83, more preferably of at least about 0.86.

The method of the present invention thus presents the following advantages. First, the method of the invention involves the automatic measurement and assessment of the severity of lesions in an organ. Consequently, the method of the invention allows reducing or eliminating subjectivity from diagnosis. Second, the method of the invention leads to a score allowing a direct diagnosis or prognosis, without additional step of comparison with a reference database.

The present invention also relates to a method for treating a subject affected with a lesion in an organ or tissue, comprising:

implementing the method of the invention for assessing the presence and/or the severity of a lesion in an organ or tissue of the subject, and treating the subject according to the presence and/or severity of the lesion determined with the method of the invention.

EXAMPLES

Figure 1:
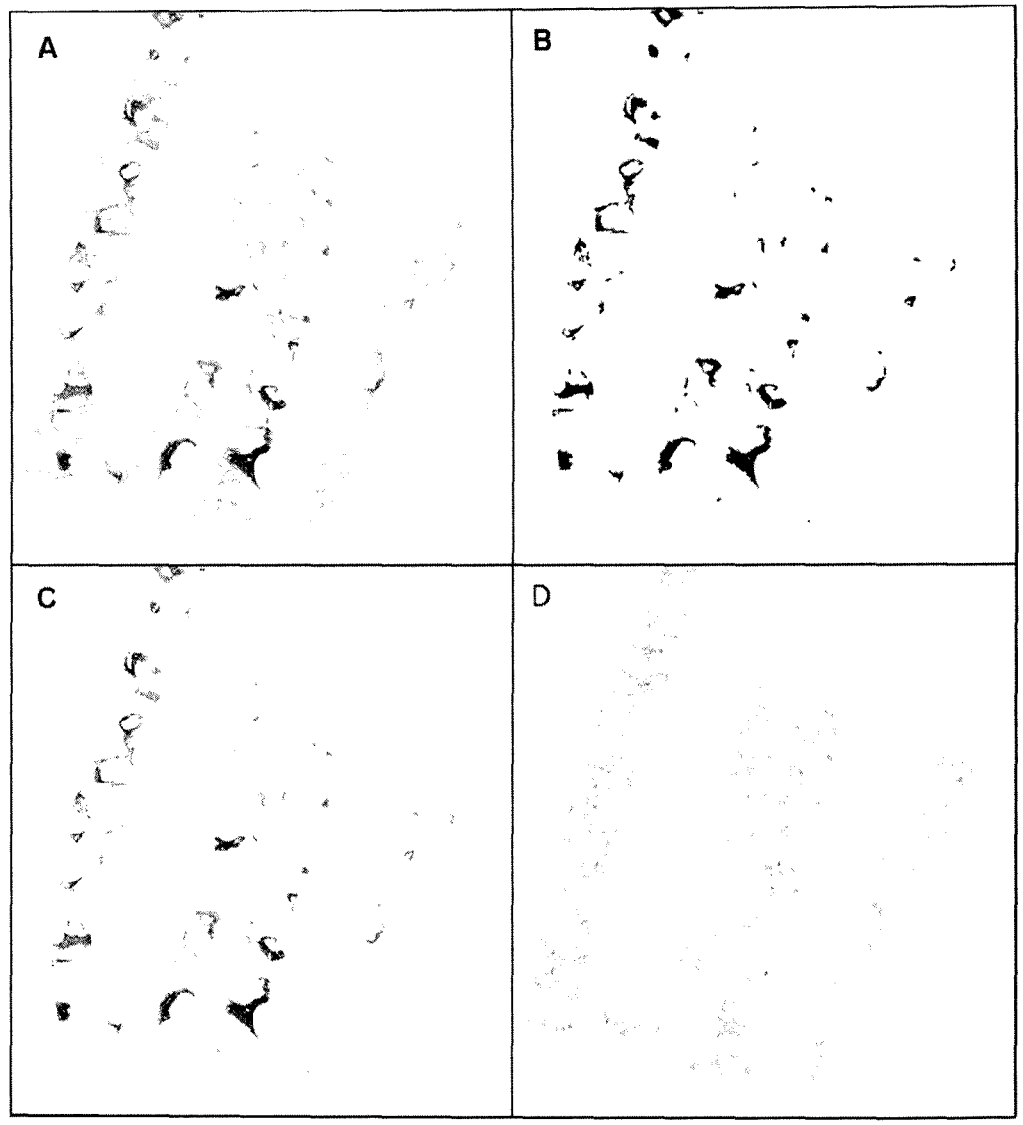
FIG. 1 is a combination of images showing examples of total fibrosis (A), mask of porto-septal fibrosis (B), porto-septal fibrosis (C) and peri-sinusoidal fibrosis (D) as measured by the method of the invention.

The present invention is further illustrated by the following examples.

Example 1: Automatic Measurement of Lesions in a Histological Image

Methods
Study Design

The morphometric diagnosis by automated morphometry was designed to diagnose clinically significant fibrosis (CSF), cirrhosis and Metavir F stages. The diagnostic models were developed in the derivation population. These results were validated by using two kinds of population:

Populations with reference Metavir staging by expert to validate the diagnostic accuracy of diagnostic models based on automated morphometry.

Population with Metavir staging performed by a first line pathologist to compare the diagnosis made by automated morphometry with that performed in real life conditions.

The conditions of liver biopsy specimens were the same in all populations. Especially, specimen lengths were the same and staining and morphometry performed by the same engineer were made centrally in the HIFIH laboratory.
Populations
Derivation Population 416 patients with chronic viral hepatitis C and a length of digitized biopsy≥20 mm for stages F0 to F3 and ≥12.1 mm for F4 were included (18 F0, 169 F1, 116 F2, 59 F3, 54 F4).
Validation Populations Fibrosys population included 54 patients with chronic viral hepatitis C. Liver biopsy was performed at week 0 and repeated at week 96. These two subsets were considered as different populations to avoid data redundancies. Liver interpretation was made by a single expert.

Vindiag 10 population included 83 patients with chronic viral hepatitis C having a baseline liver biopsy. Liver interpretation was made by a single expert.

Fibrostar population included 285 patients with chronic viral hepatitis C having a baseline liver biopsy. Liver interpretation was made by different pathologists with various expertise corresponding to the initial diagnosis as performed in clinical practice.
Liver Specimen All LB were taken by needle through transcostal route, formalin-fixed, included in paraffin blocks and stained with picro-sirius red. This staining highlights the fibrosis in red, healthy tissue in yellow/orange and steatosis appears in white (i.e. optically empty). We aimed at measuring both fibrosis and steatosis. The specimen slides were then fully scanned with an Aperio digital slide scanner (Scanscope CS System, Aperio Technologies, Vista Calif. 92081, USA) image processor that provided high quality 30,000×30,000 pixel images at a resolution of 0.5 µm/pixel (magnification× 20). In order to facilitate sharing and storage of these images, they were compressed using JPEG2000 software with a quality Q=70. Thus, a slide with 16,000×22,000 pixels was decreased from 1 GB (before compression) to 30 MB.

Each virtual slide was analyzed to obtain a variety of parameters describing lesions such as area of fibrosis, fractal dimension . . . . The combination of all these morphometric data allowed us to automatically diagnose CSF, F4 and METAVIR stage. Then, they were compared to those evaluated by the pathologist.
Classical Morphometry A mask of the biopsy is automatically created ($MASK_{LB}$) after detecting the white background of the image so that it is not taken into account in the analysis. An operator manually cleans the slide to remove the various artefacts present such as folds, dust, blood vessels, biliary tracts . . . . All these artefacts are removed from $MASK_{LB}$.
Area and Fractal Dimension of Fibrosis and Steatosis First, a fuzzy generalized classification (Ménard et al, Pttern recognition, 2002) process allows the merging of pixel intensities into three classes (fibrosis, healthy tissue, white areas) using the minimization of an original energy function. $S_{FIB}$ is the threshold of the fibrosis class and $S_W$ the threshold of the white class. Then, a specifically-developed expert system (Roullier et al, Conf Proc IEEE Eng Med Biol Soc, 2007:5575-5578) was applied on the previously obtained white-labelled areas to extract steatosis vacuoles and to eliminate blood vessels and biliary tracts (that had characteristics close to those of macro vesicles of steatosis).

The expert system rules are based on the size of the regions (very small areas, considered as noise, are eliminated), the neighborhood regions (vessels surrounded by fibrosis are eliminated), the circularity of the region ($4\pi*area/perimeter^2$) (non-round regions, e.g., biliary tracts, were eliminated), the Hough transform of the region (allowing the detection and retention of vesicle aggregates), and a statistical texture parameter (heterogeneous regions, e.g. blood vessels, were eliminated). The measure of the area of fibrosis (AOF) or steatosis (AOS) is equal to the ratio of pixels of fibrosis or steatosis divided by the number of pixels in the studied area:

$$AOF=Pix_{FIB}/Pix_{MASK\_LB}*100$$

$$AOS=Pix_{STEA}/Pix_{MASK\_LB}*100$$

where $\text{Pix}_{FIB}$ is the number of fibrosis pixels; $\text{Pix}_{STEA}$ is the number of steatosis pixels; and $\text{Pix}_{MASK\_LB}$ is the number of pixels of the study area.

The "box-counting" method (Moal et al, Hepatology, 2002, 36:840-849) has been extensively used for measuring the fractal dimension of many histologic objects as a complexity index. The box-counting method provides the fractal dimension of Kolmogorov (D). The technique has been reported in details for biological structures.

Briefly, a grid of square boxes (with ϵ pixels as the side length) resembling a chessboard was superimposed over the histologic image of threshold fibrosis. Boxes intersecting with collagen fibers were counted. Another chessboard grid was then used to cover the entire surface of the microscopic field. Thus, the total number (N) of boxes of sides (ϵ) required to completely cover the collagen fibers reflects the perimeter examined with the scale ratio ϵ. This step was repeated with ϵ varying until a size of 14 pixels, and data were plotted on a log-log graph (i.e., log [N] against log [ϵ]). The relationship between points was measured by linear regression analysis using the least square method; the slope D of the regression line corresponds to the fractal dimension D. We did the same measurement for the fractal dimension of steatosis by using the images showing steatosis. We called $D_F$ and $D_S$ the fractal dimension of fibrosis and steatosis, respectively.

Area and Fractal Dimension of Porto-Septal and Peri-Sinusoidal Fibrosis

Figure 2:
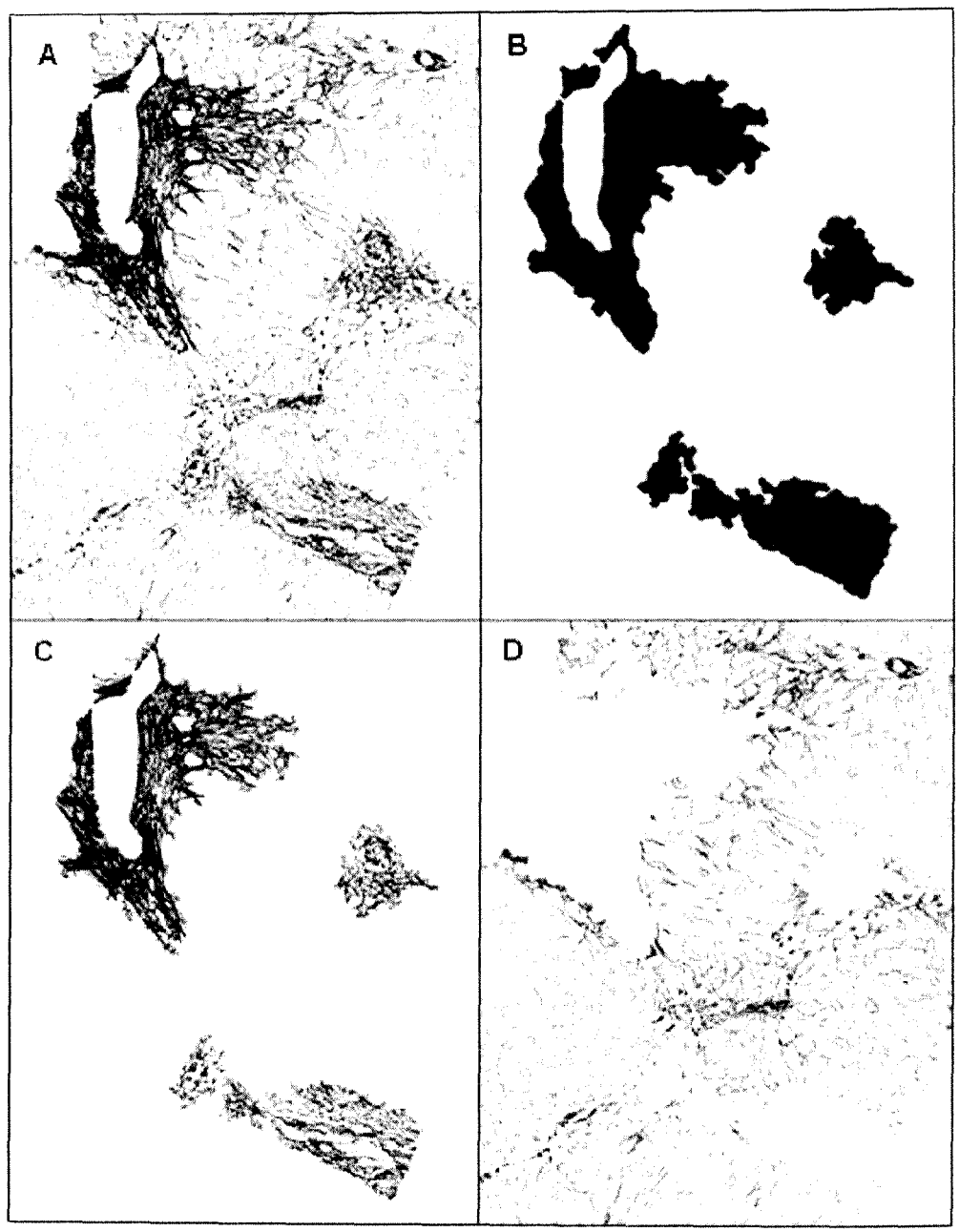
FIG. 2 is a combination of images showing focuses at ×20 magnification of total fibrosis (A), mask of porto-septal fibrosis (B), porto-septal fibrosis (C) and peri-sinusoidal fibrosis (D) as measured by the method of the invention.

The AOF measured throughout the LB specimen does not distinguish the two kinds of fibrosis which are observed on the slide (FIGS. 1 and 2). Fibrosis can start in the centro-lobular region (alcoholic liver disease) and/or in the periphery of the lobule or around the portal tracts (viral liver disease). This fibrosis grows gradually to form bands of fibrosis, or septa, called septal fibrosis. This septal fibrosis is extended between the portal tracts or between the portal tracts and the centro-lobular region. The cirrhosis stage occurs when these different septa entirely surround hepatocytes. When pathologists are assessing the Metavir stage, their judgment is based on the porto-septal fibrosis. The other form of fibrosis is located between the rows of hepatocytes and sinusoids, the equivalent of the capillary in the liver, i.e. in the intercellular space where there are many liver metabolic exchanges. This is called the pen-sinusoidal fibrosis. Although it is not taken into account in the fibrosis scores in clinical use, this fibrosis is important because it has a key role in the genesis of liver failure and portal hypertension.

Consequently, we developed a mask detection of porto-septal regions ($\text{MASK}_{PORT}$, FIGS. 1B and 2B) which allows us to distinguish these two types of fibrosis (porto-septal and pen-sinusoidal fibrosis). The creation of this mask requires a large number of morphometric treatments (regarding erosions, dilations, the size of fibrosis areas . . . ) which involves a long computing time and requires a lot of memory to process the data. This is the reason why we reduced the image dimensions. $\text{IM}_{COL}$ is the color image of the LB specimen resized with a scale factor $R_{SCALE}=4$. $\text{IM}_{GREEN}$ (the green component of $\text{IM}_{COL}$) is thresholded by $S_{FIB}$ in order to get a binary image of fibrosis ($\text{IM}_{FIB}$). Peri-sinusoidal fibrosis lies between the rows of hepatocytes; therefore, it is sufficient to eliminate it by detecting the hepatocytes which have the intensity of healthy tissue. Concerning veins and vessels, we determined that if their diameter was less than 200 μm and if the fibrosis around was small compared to their size, they are not considered in the $\text{MASK}_{PORT}$. Dilations and erosions are applied on $\text{IM}_{FIB}$ in order to obtain compacted regions to study. Porto-septal regions have a lot of fibrosis and therefore the elements of fibrosis with large areas are considered in the $\text{MASK}_{PORT}$. The fractal dimension of fibrosis into these regions is also a criterion to determine if it is in $\text{MASK}_{PORT}$. Thin regions (small ratio between the perimeter of the area and its surface) with nodes (interconnection points in fibrosis filaments) are a sign of branched forms as observed in pen-sinusoidal fibrosis and are thus not considered as porto-septal fibrosis.

Finally, we obtained $\text{MASK}_{PORT}$ that separate pen-sinusoidal fibrosis from porto-septal fibrosis. The lobular region is the region of the LB without porto-septal fibrosis. We measure the area and the fractal dimension of porto-septal fibrosis (AO_FPORT and DF_FPORT), the area and fractal dimension of peri-sinusoidal fibrosis (AO_FPS and DF_FPS), the area of lobular peri-sinusoidal fibrosis (AO_FPS_LOB) and the ratio of peri-sinusoidal fibrosis among the whole fibrosis (RATIO_FPS) as follows:

$$\text{AO\_FPORT} = \text{Pix}_{PORT}/\text{PixMASK\_LB} * 100$$

$$\text{AO\_FPS} = \text{Pix}_{FPS}/\text{PixMASK\_LB} * 100$$

$$\text{AO\_FPS\_LOB} = \text{Pix}_{FPS}/(\text{PixMASK\_LB} - \text{Pix\_Mask\_Port}) * 100$$

$$\text{RATIO\_FPS} = \text{Pix}_{FPS}/\text{Pix}_{FIB\_TOT} * 100$$

where $\text{Pix}_{PORT}$ is the number of pixels of porto-septal fibrosis; $\text{Pix}_{FPS}$ is the number of pixels of peri-sinusoidal fibrosis; PixMASK_LB is the number of pixels of the total area of the LB specimen; Pix_Mask_Port is the number of pixels of the porto-septal area; and $\text{Pix}_{FIB\_TOT}$ is the number of pixels representing all the fibrosis (porto-septal and peri-sinusoidal fibrosis).

Table 1 resumes all these classical morphometric measurements.

TABLE 1

Classical lesions measured by personal automated morphometry (n = 10).

| Lesions | Lesion measurements | Descriptors (abbreviation) |
| --- | --- | --- |
| Fibrosis | Area of fibrosis and fractal dimension of whole fibrosis | AOF/$D_F$ |
|  | Area of fibrosis and fractal dimension of portal fibrosis | AO_FPORT/DF_FPORT |
|  | Area of fibrosis and fractal dimension of sinusoidal fibrosis | AO_FPS/DF_FPS |
|  | Area of lobular sinusoidal fibrosis | AO_FPS_LOB |
|  | Ratio of portal and sinusoidal fibrosis | RATIO_FPS |
| Steatosis | Area of steatosis and fractal dimension of steatosis | AOS/$D_S$ |

New Morphometry

Measure of Edge Linearity (DF_EDGE, PCT_RECT)

Figure 3:
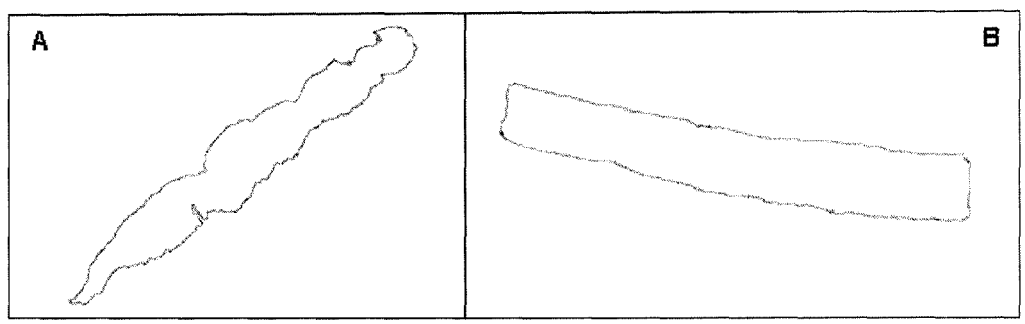
FIG. 3 is a combination of images showing examples of the edge of a non straight liver specimen (A) and a straight liver specimen (B) as measured by the method of the invention.

The analysis of the edges of the LB specimen (FIG. 3) is an important descriptors to consider for Metavir staging. Indeed, the shape of the LB specimen changes according to the Metavir stages, the edges are very straight in low stages (F0, F1, F2) whereas they tend to become more and more curved and irregular in the high stages (F3, F4). That is why we measured automatically the fractal dimension (DF_EDGE) and the linearity percentage (PCT_RECT) of the edges on the LB specimen. At first, we detect the edges of the fragments on the LB specimen and, thanks to this mask ($\text{MASK}_{EDGE}$), we combine two methods to optimize the detection of straight edges. Method 1 consists to apply the Hough transform to detect straight lines on $\text{MASK}_{EDGE}$.

The measurement of the Hough transform is well known in the domain of image processing to detect shapes (Duda et al, Comm ACM, 1972, 15:11-15). This gives a mask called $MASK_{HOUGH}$ containing only the edges of the mask detected as straight by the Hough transform. Method 2 consists to create a straight mask $MASK_{RECT}$ from the edge mask ($MASK_{EDGE}$). For this, we first detect the corners with a Harris detector (Harris et al, Proceedings of the 4$^{th}$ Alvey Vision Conference, 1988:147-151) and then we keep the edge points separated by a sampling step=2.4 mm. The lines between all these points are drawn and we finally obtained a theoretical straight mask. $MASK_{RECT}$ represents the edges of $MASK_{EDGE}$ that are in common with this theoretical straight mask.

Thanks to a combination of the 2 masks, we obtained a $MASK_{RECTCOMB}$ ($MASK_{RECTCOMB}=MASK_{HOUGH}+MASK_{RECT}$). $MASK_{RECTCOMB}$ thus contains all the straightest edges of the LB specimen. They determine the following formula:

$$PCT\_RECT=Pix_{MaskRectComb}/Pix_{MaskEdge}*100.$$

where $Pix_{MaskRectComb}$ is the number of pixels of $MASK_{RECTCOMB}$; and Pix MaskEdge is the number of pixels of $MASK_{EDGE}$.

$$DF\_EDGE=\text{Fractal dimension of the edge of the LB on } MASK_{EDGE}.$$

Measure of the LB Specimen Length (LB_LENGTH)

Figure 4:
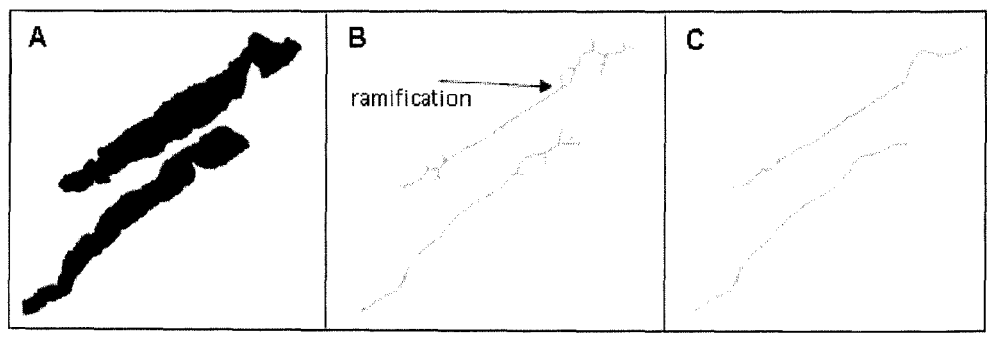
FIG. 4 is a combination of images showing examples of a liver biopsy (LB) mask (A), the skeleton with ramifications (B) and the main skeleton (C) representing its length as measured by the method of the invention.

The pathologists consider that the LB specimen length must be higher than 15 or 20 mm to be representative. Usually, it is manually measured directly on the slide but this is not very precise because the LB specimen is not always straight. So, we decided to measure it automatically (LB_LENGTH) on the virtual slide. We use the mask obtained after the elimination of the artefacts ($MASK_{LB}$) and we apply a morphometric operation (skeletonization) which gives us a skeleton of the LB. Then the small ramifications are removed in order to keep the main skeleton ($MASK_{SKELETON}$) that represents the LB's length (FIG. 4).

$$LB\_LENGTH=Pix_{LB\_SKELETON}*IM_{Resolution}*R_{SCALE}.$$

wherein $Pix_{LB\_SKELETON}$ is the number of pixels that represent the LB specimen length on $MASK_{LB}$, $IM_{Resolution}$ is the resolution of the scanned image (0.5 μm) and $R_{SCALE}=4$ is the scale factor used to resize the image.

Measure of LB_PERIMETER and LB_AREA

We measure automatically the perimeter and the area of the LB (LB_PERIMETER, LB_AREA). We detect the edges of the fragments on the LB specimen and, thanks to this mask ($MASK_{EDGE}$), the perimeter is calculated as follow:

$$LB\_PERIMETER=Pix_{MaskEdge}*IM_{Resolution}*R_{SCALE}.$$

$$LB\_AREA=Pix_{MASK\_LB}*IM_{Resolution}^2*R_{SCALE}^2.$$

wherein $Pix_{MaskEdge}$ is the number of pixels of $MASK_{EDGE}$; $Pix_{MASK\_LB}$ is the number of pixels of the total area of the LB specimen, $IM_{Resolution}$ is the resolution of the scanned image (0.5 μm) and $R_{SCALE}=4$ is the scale factor used to resize the image.

Measure of Stellar Fibrosis (AOF_STELLAR_TOT, AOF_STELLAR_EP, AOF_STELLAR_LOB, MEAN_STELLAR_PORT and MEAN_AO_PORT)

Figure 5:
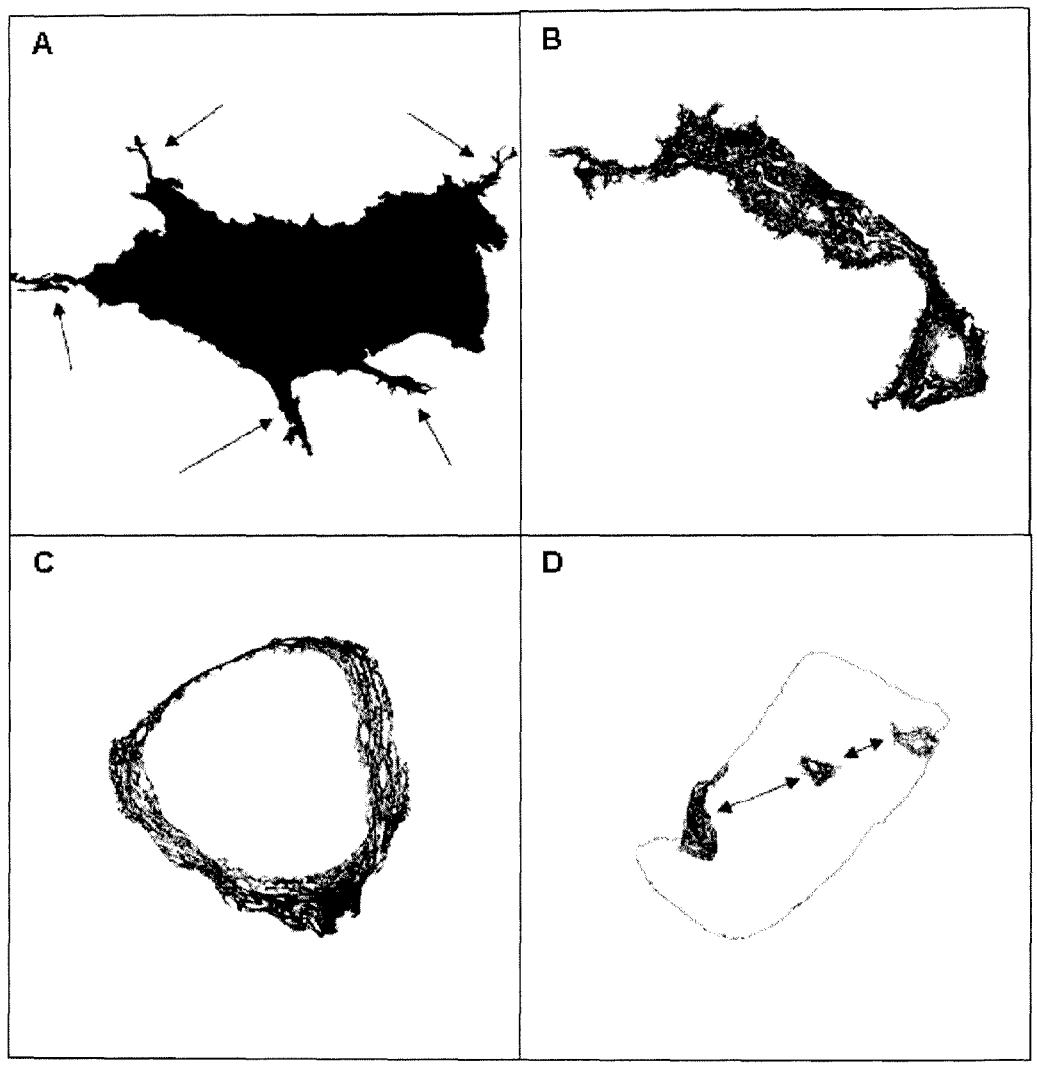
FIG. 5 is a combination of images showing examples of stellar fibrosis around a porto-septal region (A), bridges of fibrosis (B), nodule surrounded by fibrosis (C), the distance measured between the porto-septal regions (D) as measured by the method of the invention.

The main feature to differentiate stage of fibrosis F0 from stage F1 and higher stages is the presence of star-branched fibrosis around porto-septal regions (FIG. 5A). Indeed, fibrosis that we called stellar fibrosis starts to appear at the stage F1 around the portal tracts. These are small and fine fibrils around a more dense area. Therefore, it is interesting to automatically quantify this stellar fibrosis among the total surface of the LB specimen (AOF_STELLAR_TOT), among the surface of porto-septal regions (AOF_STELLAR_EP) and among the surface of lobular regions (AOF_STELLAR_LOB). We also used the number of porto-septal regions (NB_PORT) to measure the mean area of stellar fibrosis (MEAN_STELLAR_PORT) and the mean area of porto-septal regions (MEAN_AO_PORT).

To make this measurement, we detect fibrosis in a distance of 100 μm around the porto-septal regions of $MASK_{PORT}$. In order to differentiate stellar fibrosis from peri-sinusoidal fibrosis and concentrated fibrosis in the portal tracts, we combine several morphometric operations (successive erosions and dilations) which enable to only keep the thin fibrils of fibrosis connected to the porto-septal regions. Stellar fibrosis is measured with the following formulas:

$$AOF\_STELLAR\_TOT=Pix\_Fib\_Stellar/Pix-MASK\_LB*100$$

$$AOF\_STELLAR\_EP=Pix\_Fib\_Stellar/Pix\_Mask\_Port*100$$

$$AOF\_STELLAR\_LOB=Pix\_Fib\_Stellar/(Pix-MASK\_LB-Pix\_Mask\_Port)*100$$

$$MEAN\_STELLAR\_PORT=Pix\_Fib\_Stellar/NB\_PORT$$

$$MEAN\_AO\_PORT=Pix\_Mask\_Port/NB\_PORT$$

where Pix_Fib_Stellar is the number of pixels detected as stellar fibrosis; PixMASK_LB is the number of pixels of the total area on the LB specimen; Pix_Mask_Port is the number of pixels of the porto-septal area in $MASK_{PORT}$; and NB_PORT is the number of porto-septal regions in $MASK_{PORT}$.

Measure of Bridging Fibrosis (NB_BRIDGE, RATIO_BRIDGE, AOF_BRIDGE, MEAN_SURF_BRIDGE, MEAN_PERIM_BRIDGE, MEAN_THICK_BRIDGE)

Bridging fibrosis fibers occur at the Metavir stage F2. We use the term bridges when two portal tracts are interconnected (FIG. 5B). A bridge is defined as a structure lying between two thick elements. In general, pathologists consider that if there is a ratio of more than 50% of bridges, the Metavir stage will be higher than F2. It is therefore important to measure the number of bridges (NB_BRIDGE), their ratio among the porto-septal areas (RATIO_BRIDGE), the area of fibrosis in the bridges (AOF_BRIDGE) and the bridges thickness (MEAN_THICK_BRIDGE) which is obtained thanks to their perimeter (MEAN_PERIM_BRIDGE) and their surface (MEAN_SURF_BRIDGE). For each porto-septal region in $MASK_{PORT}$, we apply morphometric operations such as high erosion followed by a small dilation. The aim is to observe a separation of the structures which determines the presence of bridges. At the end of the morphometric operations, a studied area with at least two elements is considered as a bridge and added in the $MASK_{BRIDGE}$. We obtain the following parameters:

NB_BRIDGE is the number of bridges in $MASK_{BRIDGE}$ $$RATIO\_BRIDGE=Pix\_Mask\_Bridge/Pix\_Mask\_Port*100$$

$$AOF\_BRIDGE=Pix\_Fib\_Bridge/PixMASK\_LB*100$$

where Pix_Mask_Port is the number of pixels in $MASK_{PORT}$; Pix_Mask_Bridge is the number of pixels in $MASK_{BRIDGE}$; Pix_Fib_Bridge is the number pixels of fibrosis in the bridges; and PixMASK_LB is the number of pixels of the total area on the LB specimen.

MEAN_THICK_BRIDGE=MEAN_SURF_BRIDGE/
MEAN_PERIM_BRIDGE*100 where MEAN_SURF_BRIDGE is the mean of pixels representing the surface of bridges and MEAN_PERIM_BRIDGE is the mean of pixels representing the perimeter of bridges.

Measure of Granularity (PCT_GRANULARITY)

Figure 6:
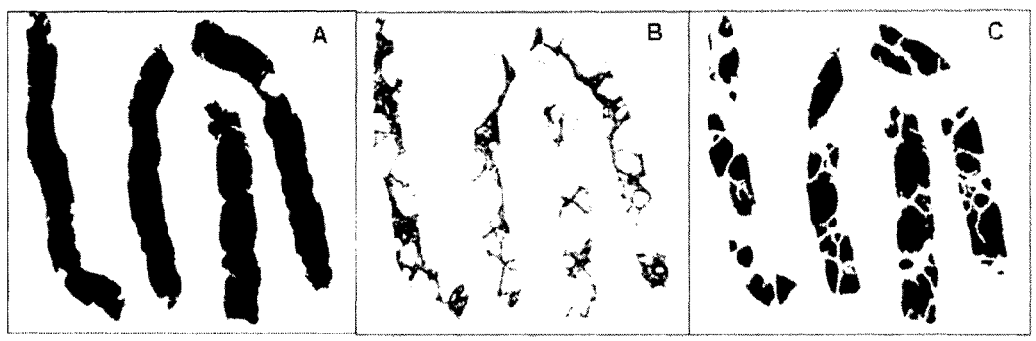
FIG. 6 is a combination of images illustrating the concept of granularity. Examples of fragments (n=4) of the liver biopsy specimen at the beginning of the study of granularity (A), porto-septal fibrosis on the fragments (B), granules formed by breaking the fragments with porto-septal fibrosis (C) as measured by the method of the invention.

The architecture of liver fibrosis is modified in high METAVIR stages. Indeed, the fibrous bridges can disorganize the LB specimen (FIG. 6). The measure of the granularity percentage (PCT_GRANULARITY) aims at quantifying this destructuration of the LB specimen by porto-septal tracts.

First, we count the number of fragments (NB_FRAG) in the mask obtained after the elimination of the artefacts ($MASK_{LB}$). Then, we use the porto-septal mask ($MASK_{PORT}$) in which we applied several dilatations in order to extend the porto-septal areas. We subtract $MASK_{PORT}$ from $MASK_{LB}$ in order to only observe the granules formed by breaking the fragments. Nb_Granules is the number of granules. PCT_GRANULARITY is the ratio between the number of fragments without destructuration and the number of granules obtained in these fragments after destructuration by porto-septal areas:

PCT_GRANULARITY=100−(NB_FRAG/Nb_Granules*100)

Measure of Fragmentation (INDEX_FRAGMENTATION)

A LB specimen is sometimes fragmented. It depends on the METAVIR stage, especially for the F4 stage where the LB specimen could contain several small fragments. So, the measure of the fragmentation index can be useful for the high fibrosis stages with a little PCT_GRANULARITY because of a numerous fragmentation.

Figure 7:
FIG. 7 is a combination of images showing examples of small fragments detected for measuring the INDEX_FRAGMENTATION. The total number of fragments is the same for the 2 panels A and B (NB_FRAG=8). As the area of small fragments is more important in figure A the INDEX_FRAGMENTATION is higher (INDEX_FRAGMENTATION=67) than in figure B (INDEX_FRAGMENTATION=35).

As for measuring PCT_GRANULARITY, we use $MASK_{LB}$. We detect on this mask the small fragments (FIG. 7) in order to obtain $MASK_{FRAG\_SMALL}$. We consider as small a fragment with a surface under 2 mm$^2$ or a bigger fragment with a surface under 3 mm$^2$ but with a circularity up to 0.7. The fragmentation index is the ratio between the surface of small fragments detected and the total surface of the LB specimen:

INDEX_FRAGMENTATION=Pix_Mask_Frag_Small/Pix_Mask_Frag*100 where Pix_Mask_Frag is the number of pixels in $MASK_{LB}$ and Pix_Mask_Frag_Small is the number of pixel in $MASK_{FRAG\_SMALL}$.

Measure of Nodules (PCT_NOD and NB_NOD)

The stage F4, also known as cirrhosis, is mainly characterized by the formation of nodules (FIG. 5C). These nodules are the result of the disruption of fibrosis that circles regions of hepatocyte tissue (parenchyma). So, a nodule is a circular and non-fibrotic (without fibrous septa inside) area surrounded by fibrosis.

The process is the same as the measure of the PCT_GRANULARY applying $MASK_{PORT}$ on $MASK_{LB}$ to study the granules obtained. We only keep the granules if they are circular. The nodules are not always perfectly round, that is why we choose a circularity threshold of 0.45. Among these round granules, we keep those that have at least 30% of fibrosis around (30% of the external border). We finally obtained a mask with regions tending towards nodularity ($MASK_{NOD}$). Nodules were considered as definitive when PCT_GRANULARY was ≥80%. We use the following formulas:

PCT_NOD=mean of percentage of fibrosis around areas in $MASK_{NOD}$.

NB_NOD=number of nodules in $MASK_{NOD}$ with more than 80% of fibrosis around.

We also measured the number of nodules in $MASK_{NOD}$ with more than 30% of fibrosis around (NB_NOD_30). The process is the same as the measure of NB_NOD but this time we keep the nodules in $MASK_{NOD}$ with more than 30% of fibrosis around.

NB_NOD_30=number of nodules in $MASK_{NOD}$ with more than 30% of fibrosis around.

Measure of Portal Distance (DIST_EP_MEAN)

As mentioned above, the location of portal tracts tends to be heterogeneous in the higher fibrosis stages. So they are no longer distributed regularly and are closer to each other. It seems therefore interesting to measure the average distance between these porto-septal regions (FIG. 5D). NB_FRAG is the number of fragments in $MASK_{LB}$. $Nb\_EP_n$ is the number of porto-septal regions present on the fragment n (n lies between 1 and NB_FRAG). For each n fragment, we measure the minimum distance $Dmin_n$ between all porto-septal regions present on $MASK_{PORT}$. $Dmoy_n$ is the average distance between regions on the porto-septal fragment n.

$Dmoy_n = Dmin_n/(Nb\_EP_n-1)$.

The average distance between porto-septal regions for all fragments is called DIST_EP_MEAN:

$DIST\_EP\_MEAN=(Dmoy_{1+}Dmoy_{2+} \ldots Dmoy_{NB\_FRAG})/NB\_FRAG$.

Table 2 resumes all these new morphometric measurements.

TABLE 2

New lesions related to liver fibrosis measured by the method of the invention for the diagnosis of CSF, F4 and Metavir stages (n = 21).

| Lesions | Descriptor (abbreviation) |
|---|---|
| Directly related to fibrosis: | |
| Stellar fibrosis | AOF_STELLAR_TOT |
| | AOF_STELLAR_EP |
| | AOF_STELLAR_LOB |
| | MEAN_STELLAR_PORT |
| | MEAN_AO_PORT    NB_PORT |
| Bridges | NB_BRIDGE    RATIO_BRIDGE |
| | AOF_BRIDGE MEAN_THICK_BRIDGE |
| | MEAN_SURF_BRIDGE |
| | MEAN_PERIM_BRIDGE |
| Granularity | PCT_GRANULARITY |
| Nodules | PCT_NOD    NB_NOD |
| | NB_NOD_30 |
| Portal distance | DIST_EP_MEAN |
| Indirectly related to fibrosis: | |
| Fragmentation | INDEX_FRAGMENTATION |
| | NB_FRAG |
| Edge linearity | PCT_RECT    DF_EDGE |
| LB length | LB_LENGTH |
| LB perimeter | LB_PERIMETER |
| LB area | LB_AREA |

Quality of the Staining

The performance of our measures depends on the quality of the staining (coloration) of the LB. Indeed, with a pale color of fibrosis, the detection could miss some porto-septal regions, and consequently we could underestimate the classification (CSF, F4 and Metavir). Usually, the pathologist excluded the cases with a poor coloration. That is why we decided to automatically detect the LB to be excluded due to poor coloration. All the measures of intensity luminosity are applied on the three components of the image (RGB: Red, Green and Blue). The luminosity intensity of the LB is calculated by averaging all this pixel intensity and we obtain a mean intensity for each component: ILbR (the mean intensity of the LB on the red component), ILbG and ILbB. We do the same for the intensity of fibrosis (IfibR, IfibG, and IfibB) and for the parenchyma (IparenchymaR, IparenchymaG, and IparenchymaB).

The quality of the coloration is also bad if the fibrosis intensity is closed to the intensity of the parenchyma or the LB. Thus, there is a weak contrast between the fibrosis and the parenchyma or LB. We developed a measure of these contrast as follows:

$$\text{Contrast\_Fib\_Parenchyma} = \sqrt{(IparenchymaR - IfibR)^2 + (IparenchymaG - IfibG)^2 + (IparenchymaB - IfibB)^2}$$

$$\text{Contrast\_Fib\_Lb} = \sqrt{(ILbR - IfibR)^2 + (ILbG - IfibG)^2 + (ILbB - IfibB)^2}$$

Table 3 resumes all these measurements of luminosity intensity.

TABLE 3

New measurements of luminosity intensity describing the quality of the coloration of the LB specimen (n = 11).

| Luminosity characteristic | Descriptor (abbreviation) |
|---|---|
| Fibrosis luminosity | IfibR |
| | IfibG    IfibB |
| Parenchyma luminosity | IparenchymaR    IparenchymaG |
| | IparenchymaB |
| Overall luminosity (of specimen) | ILbR |
| | ILbG    ILbB |
| Luminosity contrast between fibrosis and parenchyma | Contrast_Fib_Parenchyma |
| Luminosity contrast between fibrosis and specimen (overall luminosity) | Contrast_Fib_Lb |

Statistical Models

We used a classical two-step modeling strategy: a building step on all the data and an external validation step using two other datasets.

After a first quick univariate study of all variables on the whole set of original data (416 slides) and a second analysis for each of the five METAVIR stages, we decided to perform bivariate analysis on quantitative variables using Spearman's rank correlation coefficient ($r_s$) because (i) the normality assumption was not often fulfilled and (ii) some subsample had a small number of slides. Since regression techniques work better when variables are not strongly correlated, we partitioned all the original variables into clusters that were composed of variables that were altogether highly correlated ($r_s > 0.8$) and we then chose the most relevant variables for each cluster, thus reducing the 31 original variables to a set of 25 variables that were not too correlated. For the two binary outcomes (CSF and cirrhosis) we looked for the best binary logistic regression (BLR) model whereas for the 5-valued ordinal outcome METAVIR staging we looked for the best discriminant model using linear, quadratic, flexible, mixture techniques and other methods of logit analysis for ordered categories. All analyses were realized using the R software (Team RDC, available from http://www.R-project.org).

After a thorough comparison of the outputs of the numerous programs for selecting the best variables (using both forward selection, backward elimination, and best subset selection procedures), we were able to end up for each of the three diagnostic targets with a statistical model that can be considered the best of all models, taking into account the performance of the model and the minimality of the number of variables. It has to be noted that for the ordinal variable METAVIR staging, the best model was found using a linear discriminant analysis method (LDA).

We then proceed with the description of the model and the study of the predicted values. For the BLR regressions, the thresholds were determined with respect to the prevalence of the target (using an a priori value for CSF and an a posteriori value for cirrhosis). After the study of the regression coefficients and their entropy/information criteria (BIC, Akaike . . . ), we computed the area under the receiver operator characteristic curve (AUROC) and its confidence interval, the confusion matrix and we performed the statistical analysis and plotting of the four groups (true/false positive/negative). Concordance indexes and classification rates were also computed and reported.

For the LDA model, we tested several imputations methods to deal with the probabilities of each ordinal value including maximum probability value imputation, class weighted imputation, two-stage values such as Fi±1, Fx/y or FX/y (the bigger value indicating an increased preference for the stage) . . . before computing also concordance and classification rates using here weighted distances between the stages. Finally, we decided to keep the standard method maximum probability value imputation since it gives good results without the introduction of arbitrary thresholds.

For each of the computed models, the misclassification error was introduced as a new binary value and two new LBR regressions were performed using this value as target (i) with all the original 25 retained variables, (ii) using only the selected descriptors of the model, in order to analyze the influence of the variables on the misclassification. Since we knew the original value of METAVIR stage for the slides, it was possible to analyze the severe misclassification errors (discordance of more than one stage).

The performance of a model is well known to be overestimated when evaluated on the data that led to the model (optimism bias). So we checked the three models against two other populations. The first one, called here FIBROSYS, used slides of 54 patients at two distinct periods, week 0 (W0) and week 96 (W96). The second file of data for the external validation, VINDIAG10, was composed of 83 patient slides selected from a cohort respecting the same conditions as the original data (METAVIR stage F4 or a length of digitized biopsy≥20 mm). Table 4 shows the distribution of the METAVIR stages for all the datasets.

TABLE 4

Distribution of the METAVIR stages for the four datasets (populations).

| Population | METAVIR stages | | | | | Total |
|---|---|---|---|---|---|---|
| | F0 | F1 | F2 | F3 | F4 | |
| MALAH 1 | 18 | 169 | 116 | 59 | 54 | 416 |
| FIBROSYS W0 | 0 | 5 | 21 | 20 | 8 | 54 |
| FIBROSYS W96 | 0 | 4 | 21 | 20 | 9 | 54 |
| VINDIAG 10 | 2 | 25 | 18 | 9 | 29 | 83 |

Results
Derivation Population
CSF Prediction

Figure 8:
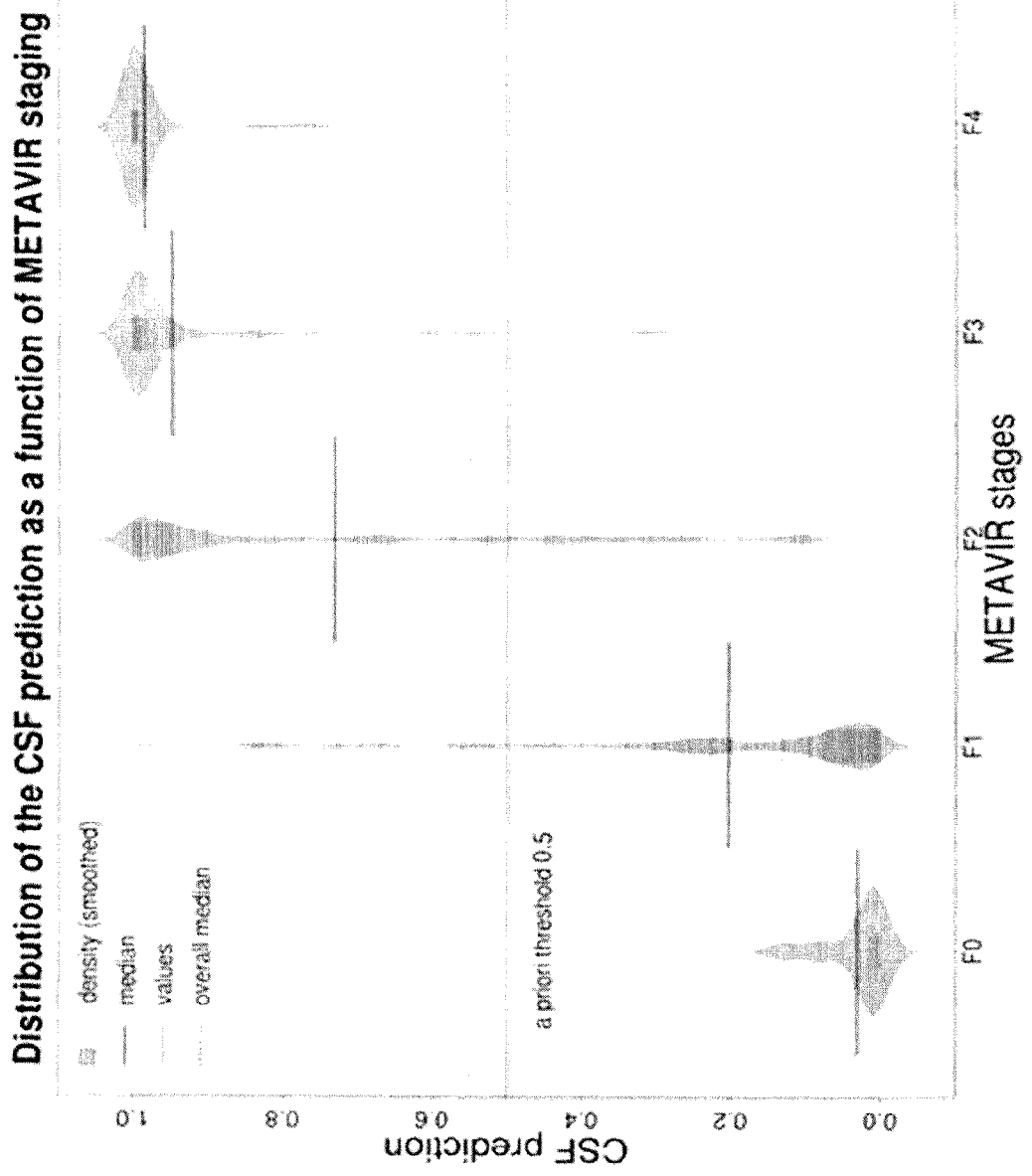
FIG. 8 is a bean plot of the distribution of the CSF prediction (on Y axis) as a function of METAVIR staging (X axis) in the 416 patients of the MALAH 1 population. The grey filled curve is a kernel density estimate. The small grey lines represent individual data values. The large horizontal grey line shows the chosen threshold and the dotted black line corresponds to the overall median.

The best BLR model includes 5 descriptors among those described previously: AOF_STELLAR_TOT, MEAN_THICK_BRIDGE, NB_BRIDGE, PCT_NOD, and PCT_RECT. The threshold value, "a priori" set to 0.5, was kept because of the prevalence of CSF (55%) and the good specificity and sensitivity of the associated model. With this threshold, we correctly classified almost 87.3% of the patients and we obtain an AUROC of 0.96. In the discordance matrix, we have the following results: 165 true-negative (TN), 198 true-positive (TP), 22 false-positive (FP) and 31 false-negative (FN). The results obtained (FIG. 8) confirm that this is a very good model to predict CSF. Table 5 gives the overall results of performance for the original dataset (MALAH 1) and Table 5b provides the model coefficients.

TABLE 5

Overall results for the CSF prediction model. Correct classification rate using an a priori 0.5 threshold value. LWR and UPR: lower and upper bounds of the 5% confidence interval of the AUROC value.

| Population | Patients (n) | AUROC | | | Correctly classified (%) | Discordance |
|---|---|---|---|---|---|---|
| | | Value | LWR | UPR | | |
| MALAH 1 | 416 | 0.957 | 0.940 | 0.973 | 87.3 | 0.127 |
| FIBROSYS W0 | 54 | 0.857 | 0.724 | 0.990 | 81.5 | 0.185 |
| FIBROSYS W96 | 54 | 0.895 | 0.787 | 1.003 | 81.5 | 0.185 |
| VINDIAG 10 | 83 | 0.880 | 0.804 | 0.955 | 80.7 | 0.193 |

TABLE 5b

Coefficients of the binary logistic regression for CSF prediction.

| # | Variable | Lower | Coefficient | Upper | Std. Error | z-value | Prob. |
|---|---|---|---|---|---|---|---|
| | constant | −1.0116 | 1.3268 | 3.7255 | 1.2028 | 1.1031 | 0.2700 |
| 1 | AOF_STELLAR_TOT | 15.1400 | 22.0255 | 29.7866 | 3.7235 | 5.9153 | 0.0000 |
| 2 | PCT_RECT | −0.1398 | −0.0996 | −0.0630 | 0.0195 | −5.1098 | 0.0000 |
| 3 | MEAN_THICK_BRIDGE | 0.0075 | 0.0189 | 0.0312 | 0.0060 | 3.1294 | 0.0018 |
| 4 | NB_BRIDGE | 0.1234 | 0.3480 | 0.5887 | 0.1182 | 2.9439 | 0.0032 |
| 5 | PCT_NOD | 0.0015 | 0.0159 | 0.0302 | 0.0073 | 2.1798 | 0.0293 |

Std. error: standard error: standard deviation.
Prob;: probability
Lower: lower limit of 95% confidence interval.
Upper: upper limit of 95% confidence interval.

Cirrhosis Prediction

Figure 9:
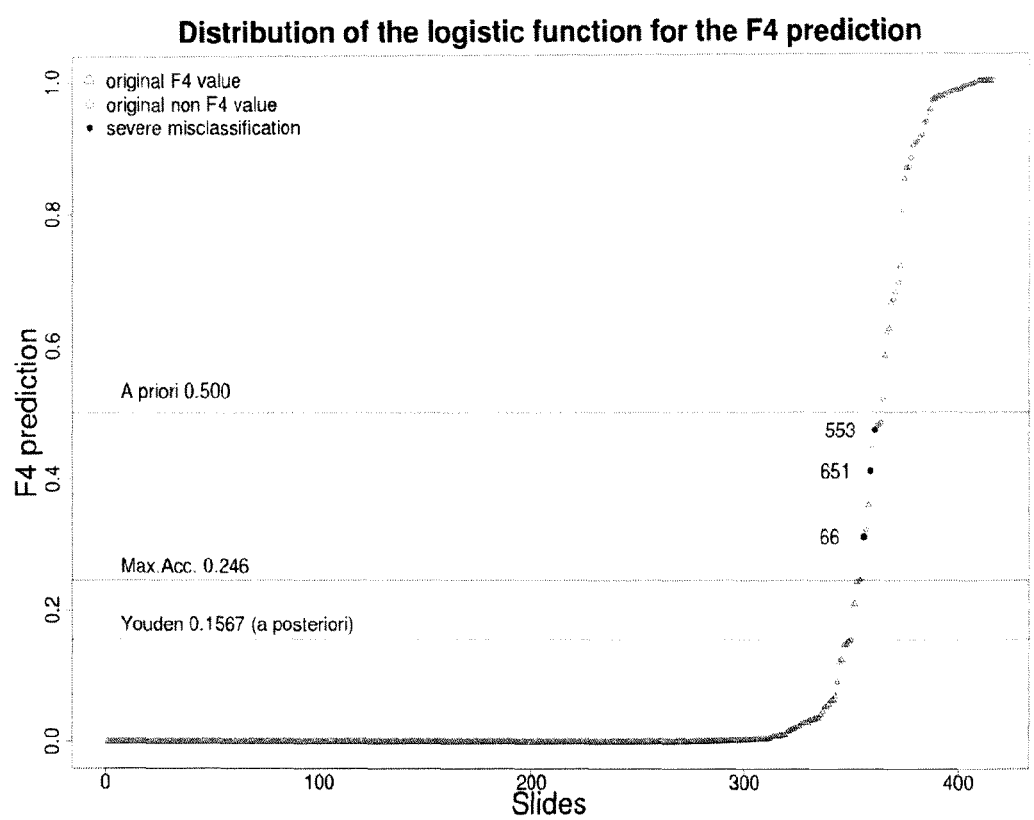
FIG. 9 is a graph showing the distribution of the logistic function for the F4 prediction (Y axis) as a function of patient values ranked in increasing value (X axis) in the 416 patients of the MALAH 1 population. The horizontal lines depict the different thresholds. Triangle dots correspond to the original METAVIR F4 stage values whereas the white circle dots correspond to the original METAVIR stages less than F4. The black points mark patient slides with significant discordance (a difference of two stages or more between original Metavir evaluation and its prediction).

The best BLR model includes 6 descriptors to predict cirrhosis (F4): PCT_RECT, PCT_NOD, AOF_STELLAR_EP, PCT_GRANULARITY, DIST_EP_MEAN, and INDEX_FRAGMENTATION. As the logistic function (FIG. 9) is not symmetric, there is no reason to use the a priori threshold of 0.5. Our rule was to maximize cirrhosis sensitivity since this an important clinical diagnosis. In this model, the predictive threshold is selected "a posteriori" at 0.1567 providing a specificity of 0.964 and a sensitivity of 1. With this threshold, we correctly classified 96.6% of the patients and we obtain an AUROC of 0.994, thus showing an excellent model. Table 6 gives the overall results of performance for the original dataset (MALAH 1) and Table 6b provides the model coefficients.

TABLE 6

Overall results for the cirrhosis prediction model. Correct classification rate using an a posteriori 0.1567 threshold value. LWR and UPR: lower and upper bounds of the 5% confidence interval of the AUROC value.

| Population | Patients (n) | AUROC | | | Correctly classified (%) | Discordance |
|---|---|---|---|---|---|---|
| | | Value | LWR | UPR | | |
| MALAH 1 | 416 | 0.994 | 0.989 | 0.999 | 96.9 | 0.034 |
| FIBROSYS W0 | 54 | 0.978 | 0.943 | 1.01 | 87.0 | 0.130 |
| FIBROSYS W96 | 54 | 0.946 | 0.885 | 1.006 | 85.2 | 0.148 |
| VINDIAG 10 | 83 | 0.968 | 0.928 | 1.01 | 91.6 | 0.084 |

TABLE 6b

Coefficients of the binary logistic regression for cirrhosis prediction.

| # | Variable | Lower | Coefficient | Upper | Std. Error | z-value | Prob. |
|---|---|---|---|---|---|---|---|
|   | constant | −0.1613 | 5.7840 | 12.2506 | 3.1138 | 1.8576 | 0.0632 |
| 1 | PCT_RECT | −0.2318 | −0.1304 | −0.0438 | 0.0472 | −2.7617 | 0.0058 |
| 2 | PCT_NOD | 0.0345 | 0.0808 | 0.1409 | 0.0271 | 2.9744 | 0.0029 |
| 3 | AOF_STELLAR_EP | −4.9658 | −3.2450 | −1.9505 | 0.7590 | −4.2751 | 0.0000 |
| 4 | DIST_EP_MEAN | −11.5238 | −6.0570 | −1.6248 | 2.4783 | −2.4440 | 0.0145 |
| 5 | PCT_GRANULARITY | 0.0461 | 0.0880 | 0.1432 | 0.0243 | 3.6275 | 0.0003 |
| 6 | INDEX_FRAGMENTATION | 0.0326 | 0.0732 | 0.1227 | 0.0226 | 3.2329 | 0.0012 |

Std. error: standard error: standard deviation.
Prob.: probability
Lower: lower limit of 95% confidence interval.
Upper: upper limit of 95% confidence interval.

METAVIR Stage Prediction

Figure 10:
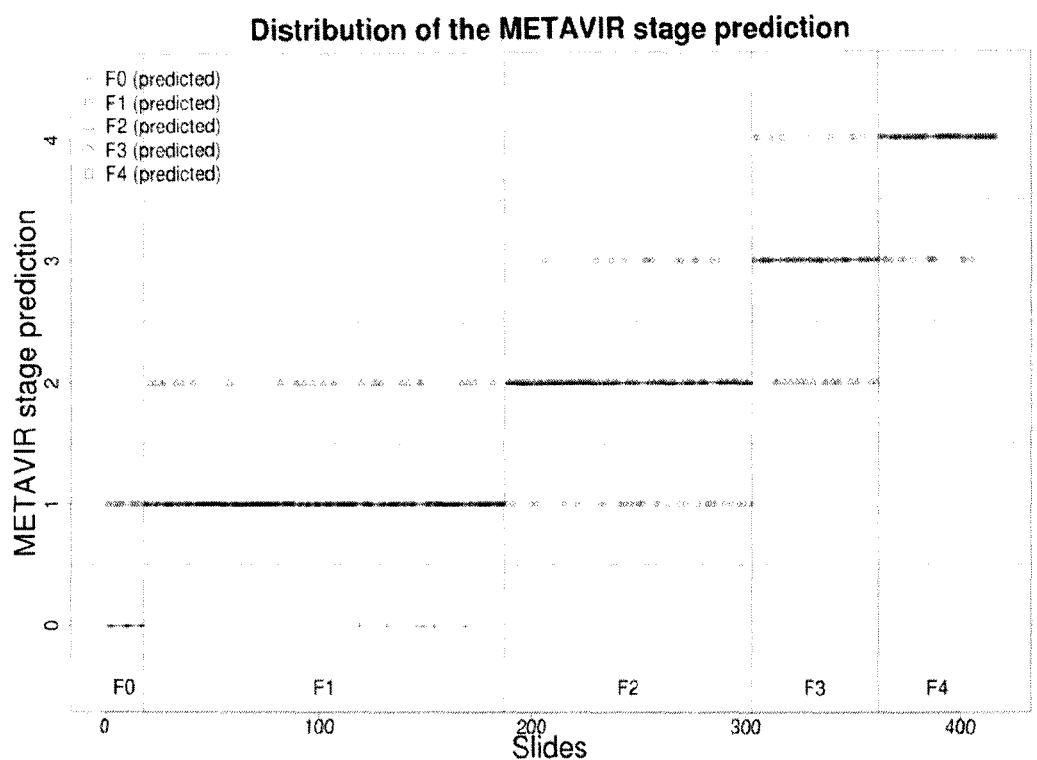
FIG. 10 is a graph showing the distribution of the METAVIR stage prediction by linear discriminant analysis (LDA; Y axis) as a function of the METAVIR stages (on X axis) in the 416 patients of the MALAH 1 population. The vertical lines are drawn according to the proportion of original METAVIR stage values. On the Y axis, points are drawn with respect to the predicted stage. Their order follows their position in the dataset.
Figure 11:
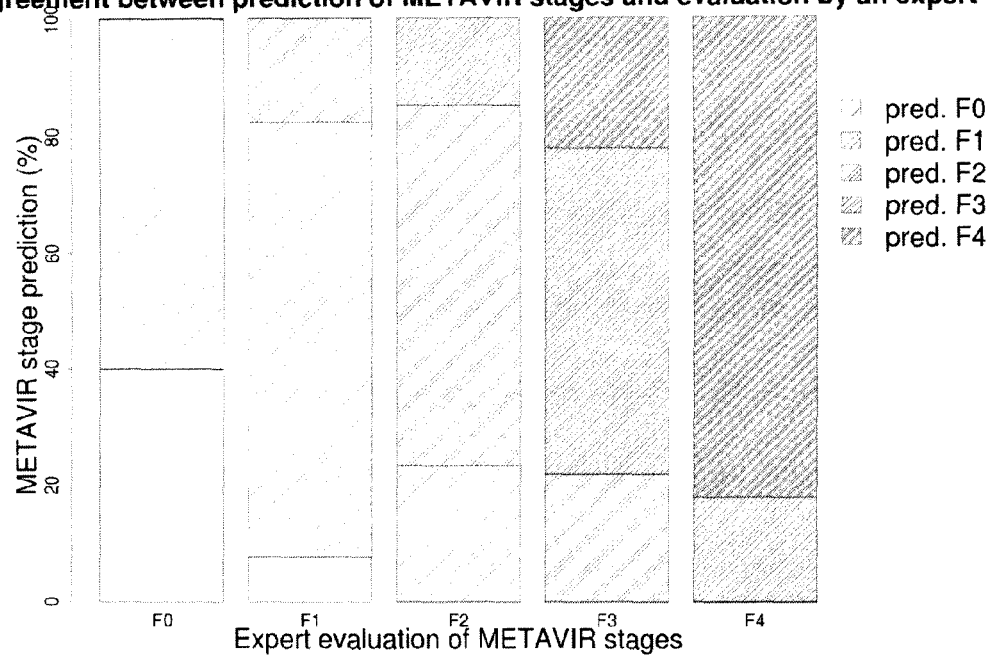
FIG. 11 is a histogram showing the agreement between the prediction of the Metavir (on Y axis) and the Metavir stages evaluated by an expert (on X axis) in the 416 patients of the MALAH 1 population. The heights of the boxes reflect the proportion of the prediction stages for the expert stage.

At the difference of the previously predictions (CSF and F4), we apply here a linear discriminant analysis (LDA) to predict the METAVIR stages. The final model includes 8 descriptors: PCT_GRANULARITY, PCT_RECT, PCT_NOD, RATIO_FPS, DF_FPS, DF_FPORT, RATIO_BRIDGE and INDEX_FRAGMENTATION. The LDA does not provide a unique METAVIR score but it indicates a belonging probability for each stage. We use the classical method to affect a class by selecting the highest probability since the other imputations either (i) use arbitrary probability values or (ii) show no statistically better performance. The average discordance is of 0.315 and there is no patient with significant discordance (with a difference of 2 stages or more between METAVIR stage and prediction according to the classical definition used with non-invasive tests of liver fibrosis). The results obtained (FIGS. 10 and 11) confirm that it is also a good model. Table 7 gives the overall results of performance for the original dataset (MALAH 1). Agreement between original Metavir stages and predicted stages was very good according to weighted kappa index=0.868 (Table 7b). Tables 7c and 7d provides the model characteristics. Table 7e shows no significant discordance (≥2 F) between original and predicted stages.

TABLE 7

Overall results for the METAVIR stage prediction model. Discordance value using equal or proportional distances between METAVIR stages. Correct classification rate for all METAVIR or F4 stage(s).

| Population | Patients (n) | Discordance Equal | Discordance Proportional | Correctly classified (%) All | Correctly classified (%) F4 |
|---|---|---|---|---|---|
| MALAH 1 | 416 | 0.315 | 0.315 | 68.5 | 75.9 |
| FIBROSYS W0 | 54 | 0.407 | 0.407 | 59.3 | 75.0 |
| FIBROSYS W96 | 54 | 0.463 | 0.500 | 53.7 | 66.7 |
| VINDIAG 10 | 83 | 0.289 | 0.337 | 71.1 | 82.8 |

TABLE 7b

Overall agreement between the METAVIR stage and its prediction model.

| Kappa coefficient | lower | estimate | upper |
|---|---|---|---|
| Unweighted | 0.493 | 0.555 | 0.618 |
| Weighted | 0.844 | 0.868 | 0.891 |

TABLE 7c

Prior probabilities used in the LDA model for the prediction of Metavir stages.

| F0 | F1 | F2 | F3 | F4 |
|---|---|---|---|---|
| 0.0433 | 0.4062 | 0.2788 | 0.1418 | 0.1298 |

TABLE 7d

Coefficients of the LDA model for the prediction of Metavir stages.

| # | Variable | LD1 | LD2 | LD3 | LD4 |
|---|---|---|---|---|---|
| 1 | PCT_GRANULARITY | −0.0147 | −0.0459 | −0.0217 | 0.0406 |
| 2 | PCT_RECT | 0.0424 | 0.0039 | 0.0264 | −0.0378 |
| 3 | PCT_NOD | −0.0115 | 0.0019 | −0.0063 | −0.0055 |
| 4 | RATIO_FPS | 0.0479 | −0.0340 | −0.0219 | 0.0150 |
| 5 | DF_FPS | −5.2464 | 8.9728 | 3.6717 | 1.7888 |
| 6 | DF_FPORT | 4.3518 | −6.5818 | −10.3962 | −6.7348 |
| 7 | RATIO_BRIDGE | −0.0181 | −0.0005 | 0.0047 | −0.0344 |
| 8 | INDEX_FRAGMENTATION | −0.0107 | −0.0244 | 0.0442 | −0.0105 |

LDi is the coefficient of the $i^{th}$ discriminant function.

TABLE 7e

Distribution of original METAVIR stage and predicted stages.

| Metavir | | Prediction | | | | |
|---|---|---|---|---|---|---|
| | | F0 | F1 | F2 | F3 | F4 |
| Original | F0 | 4 | 14 | 0 | 0 | 0 |
| | F1 | 6 | 136 | 27 | 0 | 0 |
| | F2 | 0 | 32 | 71 | 13 | 0 |
| | F3 | 0 | 0 | 17 | 32 | 9 |
| | F4 | 0 | 0 | 0 | 13 | 41 |

Validation Populations

Model Performance

Diagnostic accuracy of the diagnostic models based on automated morphometry was validated in Fibrosys and Vindiag 10 populations. Table 5 gives the overall results for CSF diagnosis in the three external validation datasets. Table 6 gives the overall results for cirrhosis diagnosis in the three external validation datasets. Table 7 gives the overall results for the Metavir stages in the three external validation datasets. Globally, there was an expected decrease in accuracy due to the lack of optimism bias. Nevertheless, the accuracies were still very good.

Application to Clinical Practice

In the Fibrostar population, the reference was Metavir staging performed by the central expert pathologist of Angers. The agreement between reference Metavir staging and second measurement was better with diagnosis by automated morphometry than initial diagnosis by local first line pathologist (Table 8).

TABLE 8

Agreement between reference diagnosis by central expert and diagnosis by automated morphometry method of the invention or local pathologist in the 285 patients of the Fibrostar population. For Metavir F stages we used three kinds of agreement index. As Fibrosis staging is an ordinal variable, weighted kappa or intra-class correlation coefficient should be preferred. Best values are in bold characters.

| F stages: | Agreement of reference diagnosis with: | |
|---|---|---|
| | Morphometry | Local pathologist |
| kappa | 0.515 | 0.611 |
| weighted kappa | 0.881 | 0.865 |
| intra-class correlation coefficient | 0.934 | 0.929 |
| CSF (kappa) | 0.733 | 0.733 |
| F4 (kappa) | 0.900 | 0.827 |

Example 2: Reliability

The accuracy of prediction is imperfect. These inaccurate results are not due to chance and can be predicted by statistical analysis providing significant independent predictors of accuracy. This defines the reliability analysis. Thus, one can calculate reliability classes where the accuracy varies and predictors can be different.

For example, a perfect result has 100% accuracy. A reliability analysis can determine reliability classes from 0 to 10, 20, 30, 40, 50, 60, 70, 80, 90% accuracy with specific predictors for each reliability class.

Predictors are issued from the list of descriptors of the invention.

For example, we provide here different predictive models obtained in different populations by binary logistic regression.

Tables of the Coefficients of the Binary Logistic Regression for Prediction of Accuracy for Clinically Significant Fibrosis

| Model # 1, AUROC = 0.656 | | | | | | |
|---|---|---|---|---|---|---|
| Variable | Lower | Coefficient | Upper | Std. error | z-value | Prob |
| (Intercept) | 1.9388 | 4.2135 | 6.6344 | 1.1949 | 3.5263 | 0.0004 |
| MEAN_THICK_BRIDGE | −0.0181 | −0.0097 | −0.0014 | 0.0042 | −2.3029 | 0.0213 |
| PCT_RECT | −0.0687 | −0.0358 | −0.0044 | 0.0164 | −2.1903 | 0.0285 |

Std. error: standard error: standard deviation.
Prob.: probability
Lower: lower limit of 95% confidence interval.
Upper: upper limit of 95% confidence interval.

| Model # 2, AUROC = 0.893 | | | | | | |
|---|---|---|---|---|---|---|
| Variable | Lower | Coefficient | Upper | Std. error | z-value | Prob |
| MEAN_AO_PORT | 12.9522 | 47.5080 | 86.5260 | 18.6618 | 2.5457 | 0.0109 |
| MEAN_PERIM_BRIDGE | −0.0012 | −0.0006 | −0.0001 | 0.0003 | −2.4062 | 0.0161 |
| RATIO_BRIDGE | −0.1333 | −0.0714 | −0.0106 | 0.0310 | −2.3080 | 0.0210 |
| PCT_NOD | −0.0558 | −0.0296 | −0.0051 | 0.0128 | −2.3041 | 0.0212 |
| AOF_BRIDGE | 1.1042 | 4.8274 | 9.3013 | 2.0965 | 2.3026 | 0.0213 |
| DF_FPS | −65.6751 | −33.6352 | −5.0076 | 15.2713 | −2.2025 | 0.0276 |

| Model # 3, AUROC = 0.820 | | | | | | |
|---|---|---|---|---|---|---|
| Variable | Lower | Coefficient | Upper | Std. error | z-value | Prob |
| LB_PERIMETER | 0.0210 | 0.0775 | 0.1366 | 0.0293 | 2.6474 | 0.0081 |
| AOF_BRIDGE | 0.5897 | 1.9735 | 3.5409 | 0.7519 | 2.6246 | 0.0087 |
| DF_FPORT | 1.3641 | 7.0186 | 12.7720 | 2.8979 | 2.4219 | 0.0154 |
| RATIO_FPS | 0.0200 | 0.1092 | 0.2009 | 0.0460 | 2.3749 | 0.0176 |
| LENGTH | −0.1538 | −0.0813 | −0.0093 | 0.0368 | −2.2093 | 0.0272 |
| DF_FPS | −32.0752 | −16.2661 | −1.1053 | 7.8551 | −2.0708 | 0.0384 |
| Anfractuosity | −2.3940 | −1.1928 | 0.0008 | 0.5997 | −1.9888 | 0.0467 |

Anfractuosity = ratio between the native perimeter and the smoothed perimeter of the liver Tables of the Coefficients of the Binary Logistic Regression for Prediction of Accuracy for Cirrhosis Model # 1, AUROC = 0.916

| Variable | Lower | Coefficient | Upper | Std. error | z-value | Prob |
|---|---|---|---|---|---|---|
| PCT_NOD | −0.0719 | −0.0369 | −0.0061 | 0.0165 | −2.2366 | 0.0253 |

Model # 2, AUROC = 0.959

| Variable | Lower | Coefficient | Upper | Std. error | z-value | Prob |
|---|---|---|---|---|---|---|
| PCT_NOD | −0.0924 | −0.0550 | −0.0232 | 0.0174 | −3.1520 | 0.0016 |
| PCT_RECT | 0.0522 | 0.1474 | 0.2587 | 0.0518 | 2.8445 | 0.0044 |
| N_LENGTH | −0.2933 | −0.1619 | −0.0454 | 0.0618 | −2.6220 | 0.0087 |
| LB_LENGTH | 0.2795 | 0.8925 | 1.6303 | 0.3404 | 2.6217 | 0.0087 |
| DF_FPORT | 4.2902 | 17.9175 | 33.1817 | 7.2281 | 2.4789 | 0.0132 |
| AOF_STELLAR_EP | 0.7316 | 2.1216 | 4.1031 | 0.8765 | 2.4206 | 0.0155 |
| NB_BRIDGE | −1.2683 | −0.6658 | −0.1301 | 0.2851 | −2.3352 | 0.0195 |
| DF_FPS | −74.6557 | −37.7834 | −7.1016 | 16.8191 | −2.2465 | 0.0247 |
| LB_PERIMETER | −0.3474 | −0.1687 | −0.0105 | 0.0844 | −1.9988 | 0.0456 |

N_LENGTH: length of numeric specimen;
LB_LENGTH: initial length of fixed specimen Model # 3, AUROC = 0.984

| Variable | Lower | Coefficient | Upper | Std. error | z-value | Prob |
|---|---|---|---|---|---|---|
| PCT_NOD | −0.6229 | −0.2149 | −0.0796 | 0.1087 | −1.9776 | 0.0480 |

Example 3: Diagnosis of NASH

Non-alcoholic fatty liver disease (NAFLD) is a frequent pathology. It encompasses the liver lesions linked to metabolic syndrome. It evolves from pure steatosis to non-alcoholic steato-hepatitis (NASH) and liver fibrosis. NASH includes several lesions: steatosis, hepatocyte ballooning, and lobular inflammation (Sanyal Hepatology 2011). An international expert team has described a NAFLD activity score (NAS) (Kleiner Hepatology 2005).

We have measured several lesions in a cohort of 235 patients with NAFLD. Optical microscopy included classical lesions (steatosis degree, NAS, NASH and fibrosis). Morphometry with image analysis included automatic measurement of area of steatosis (AOS) and fractal dimension of steatosis (DS) as well as area of fibrosis (AOF) and fractal dimension of fibrosis ($D_F$). We also defined the relative Area of Steatosis (rAOS) as the area of steatosis in the non-fibrotic area.

Whatever the fibrosis stage, NAS was globally well correlated (p<0.001) with area of steatosis (AOS) ($r_s$=0.746), relative Area of Steatosis (rAOS) ($r_s$=0.761), and fractal dimension of steatosis (DS) ($r_s$=0.794).

Mean fractal dimension of steatosis (DS) was much higher when NASH was present: 1.652±0.100 vs 1.395±0.126 in the absence of NASH (p=0.001).

Consequently, NASH was well predicted by relative Area of Steatosis (rAOS) with AUROC=0.919 with diagnostic accuracy at 85.6% or by fractal dimension of steatosis (DS): AUROC=0.936, diagnostic accuracy: 87.6%.

The best cut-off to diagnose NASH was relative Area of Steatosis (rAOS)=8.2% or fractal dimension of steatosis (DS)=1.595.

By stepwise binary logistic regression, NASH was diagnosed by the combination—called the NASH score—of fractal dimension of steatosis (DS), area of fibrosis (AOF) and relative Area of Steatosis (rAOS) with AUROC=0.953 and diagnostic accuracy=87.6%. The proportion of patients with 95% predictive values for NASH was: rAOS: 44.6%, DS: 63.7%, NASH score: 75.5% (p<0.001 between each proportion by McNemar test).

Figure 12:
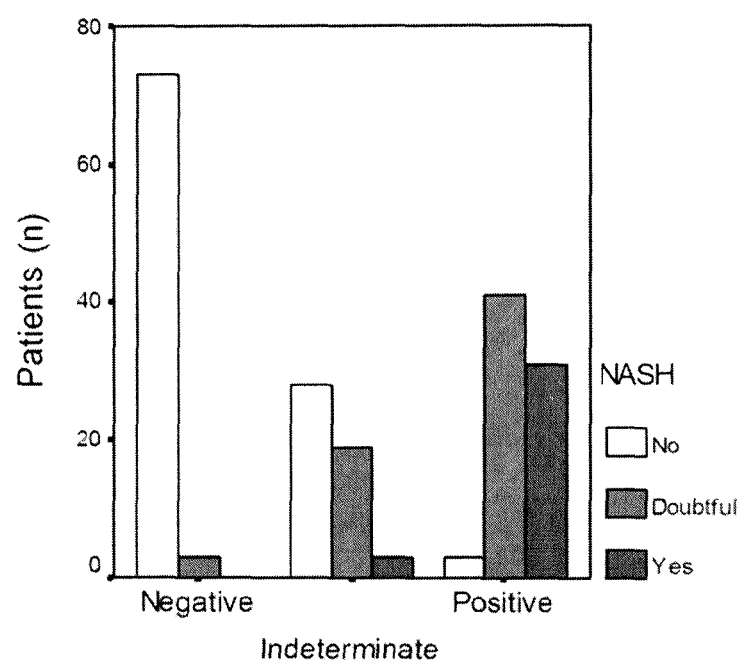
FIG. 12 is a histogram showing the distribution of NASH diagnosis as a function of intervals 95% predictive values by NASH score.

FIG. 12 shows the distribution of NASH diagnosis as a function of intervals of 95% predictive values by NASH score. The mean NASH scores of the patients were the following:

| NASH | Determination of the presence of NASH with the NASH score | Mean NASH score |
|---|---|---|
| Negative | No | 0.04 |
|  | Doubtful | 0.11 |
|  | Yes | N/A |
| Intedeterminate | No | 0.43 |
|  | Doubtful | 0.47 |
|  | Yes | 0.55 |
| Positive | No | 0.88 |
|  | Doubtful | 0.93 |
|  | Yes | 0.97 |

Figure 13:
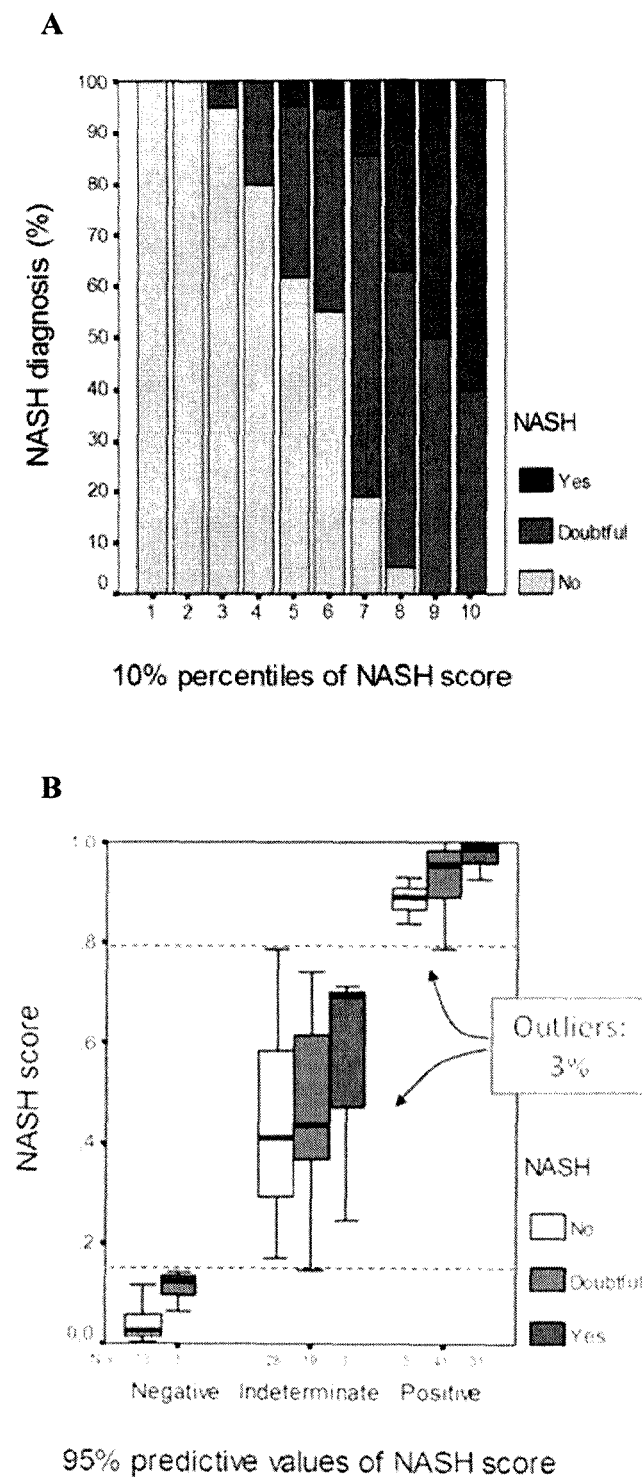
FIG. 13 is a combination of graphs related to the NASH score. (A) deciles of NASH score (X axis) plotted against the proportion of NASH diagnosis (Y axis). (B) box plots of NASH score as a function of 95% predictive values and NASH diagnosis.

FIG. 13A shows the deciles of NASH score (X axis) plotted against the proportion of NASH diagnosis (Y axis). FIG. 13B shows the box plots of NASH score as a function of 95% predictive values and NASH diagnosis. As shown in FIGS. 13A and B, with the 95% negative predictive value cut-off, there is no missed definitive NASH whereas with the 95% positive predictive value cut-off, there are only 3% of patients without NASH.

Moreover, we tested our descriptors in a new population of 137 patients with NAFLD. The histological definition of NASH was the most recent as described in a consensus paper (Sanyal Hepatology 2011). The NASH is defined as borderline or definitive diagnosis.

Results were the followings according to the two possible NASH definitions:

| NASH diagnostic target | Patient number (biopsy lentgh) | AUROC | Correctly classified (%) |
|---|---|---|---|
| Borderline + definitive | 107 (≥20 mm) | 0.921 | 84.1 |
|  | 137 (all) | 0.891 | 80.3 |
| Definitive | 107 (≥20 mm) | 0.868 | 78.5 |
|  | 137 (all) | 0.845 | 75.2 |

Model for Definitive NASH

| Variable | Coefficient | Standard deviation | Z value | Probability |
|---|---|---|---|---|
| Constant | −13.32199153 | 3.463405925 | −3.846500 | 1.198170e−04 |
| Contrast_Fib_Parenchyma | −0.05635018 | 0.022324528 | −2.524137 | 1.159826e−02 |
| Fractal dimension of steatosis | 8.23338304 | 2.039900986 | 4.036168 | 5.433132e−05 |
| Biopsy length | 0.01743691 | 0.008354337 | 2.087169 | 3.687290e−02 |
| AOF_STELLAR_TOT | 14.95754878 | 3.578657393 | 4.179654 | 2.919533e−05 |

Model for Borderline+Definitive NASH

| Variable | Coefficient | Standard deviation | Z value | Probability |
|---|---|---|---|---|
| Constant | −17.43729686 | 4.05374381 | −4.301529 | 1.696235e−05 |
| Contrast_Fib_Parenchyma | −0.09204421 | 0.03120528 | −2.949636 | 3.181486e−03 |
| Fractal dimension of steatosis | 14.51277356 | 3.09510099 | 4.688950 | 2.746106e−06 |
| AOF_STELLAR_EP | −0.40530236 | 0.20406950 | −1.986100 | 4.702226e−02 |
| AOF_STELLAR_TOT | 15.77945921 | 4.22038919 | 3.738864 | 1.848540e−04 |

Example 4: Automatic Measurement of Lesions in a Radiological Image

Figure 14:
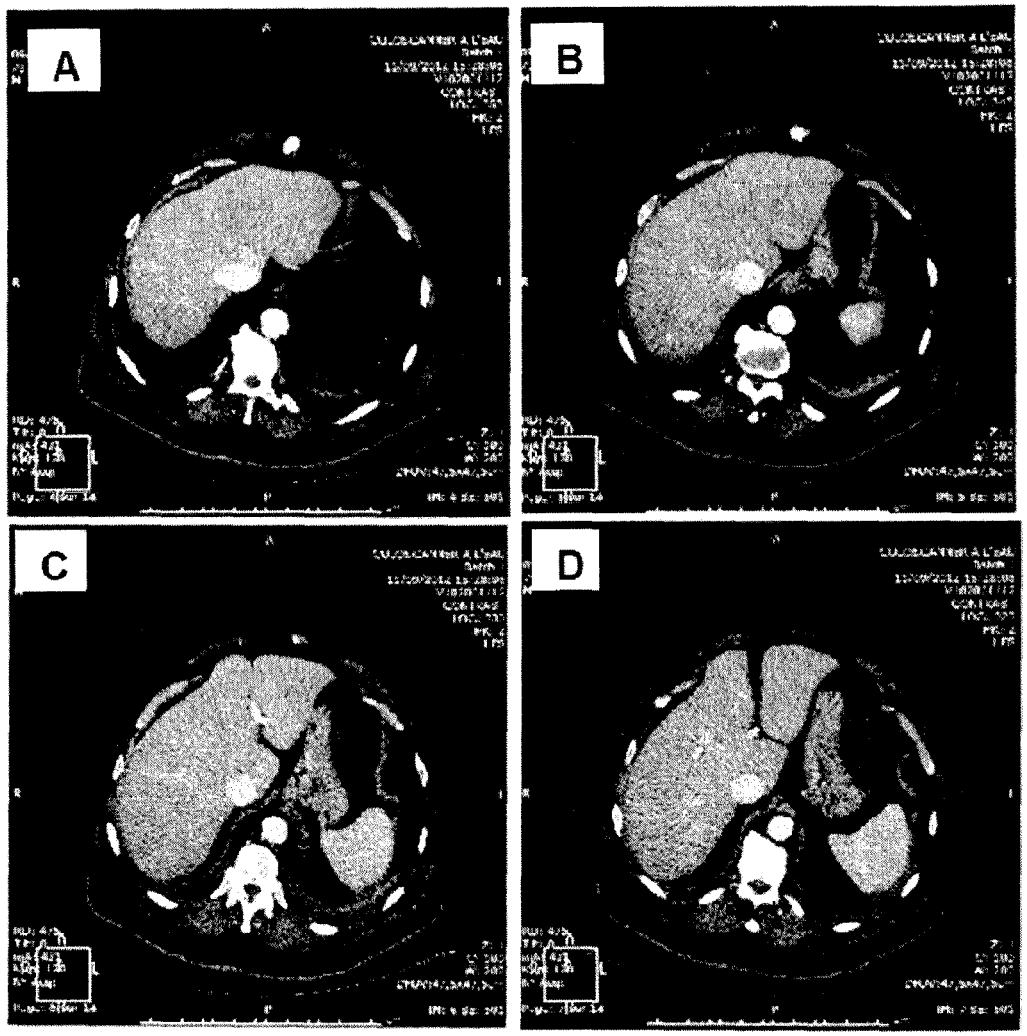
FIG. 14 is a combination of 4 TDM images of the liver, corresponding to 4 consecutive slices (A, B, C and D) spaced 10 mm.

We developed image analysis from tomodensitometry (TDM) to allow an automated diagnosis of cirrhosis and other fibrosis stages. The advantage of the TDM images is that, contrary to a liver biopsy, we can evaluate the entire liver. Consequently, we dispose of more representative information. The way to proceed is the same as the liver biopsy method, except that we are not analysing one slice but several slices at intervals of 10 mm. Thus, for one patient we obtain approximately 15-20 images of 512×512 pixels with grey levels (FIG. 14).

Semiology

We can separate the measurements of descriptors in different categories (see Table 9):

TABLE 9

| Category | Measurements |
|---|---|
| External morphology | |
| Liver | Anfractuosity: Native perimeter of the liver (mean and total perimeter) Smoothed perimeter Ratio between the 2 perimeters Largest perimeter among all the slices Indentation Liver height Nodularity of the edges Angularity Fat ratio in the box including the liver Abdominal liver fat ratio |
| Spleen | Ratio between the spleen area and the liver area Total spleen perimeter Spleen height Nodularity of the edges |
| Internal morphology | |
| | Hypertrophy of liver segment I (2 antero-posterior lengths D1, D3 and 2 transversal lengths D2, D4: see figure). Hypertrophy/surface/volume of liver segment I can be also expressed as any product of 2 to 4 lengths D1 to D4 The volume can be calculated with surface and the height of liver segment I |

TABLE 9-continued

| Category | Measurements |
|---|---|
| | Lengths of the liver segment IV: minimal and maximal anterior-posterior or transversal length Surface of liver segment IV can be also expressed as any product of 2 lengths The volume can be calculated with surface and the height of liver segment IV Lengths surface/volume of other liver segment: as described for liver segment IV Whole liver or liver segment volume obtained by reconstruction Whole liver or liver segment surface can be also obtained by contouring liver or liver segment limits either manually or by an automated process or both methods (semi automated process) Ratio between segment I and segment IV dimensions Furrow thickness (D_F1) and surface (Surf_F1) (e.g. Arantius ligament) Diameter of the portal vein Internal nodularity in the liver |
| Structure | |
| | Heterogeneity of the density intensity in the image between several regions of interest (ROI) in the liver Fractal organization of the hepatic parenchyma |

External Morphology

Figure 15:
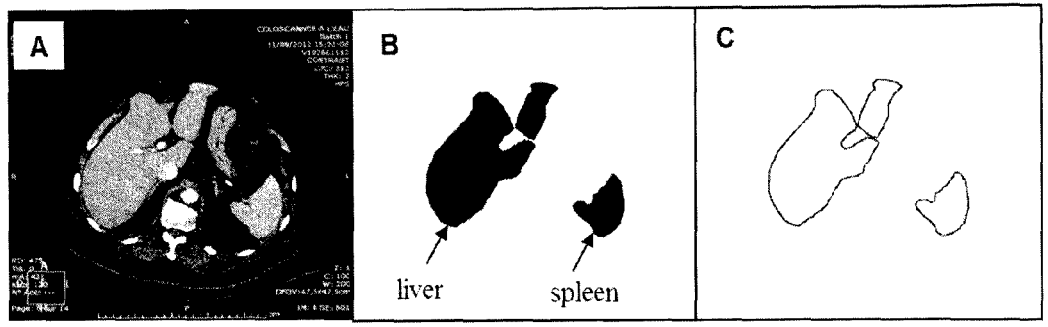
FIG. 15 is a combination of illustrations showing a slice of TDM image (A), the mask of the liver and spleen (B), and the edges of the liver and spleen (C).
Figure 16:
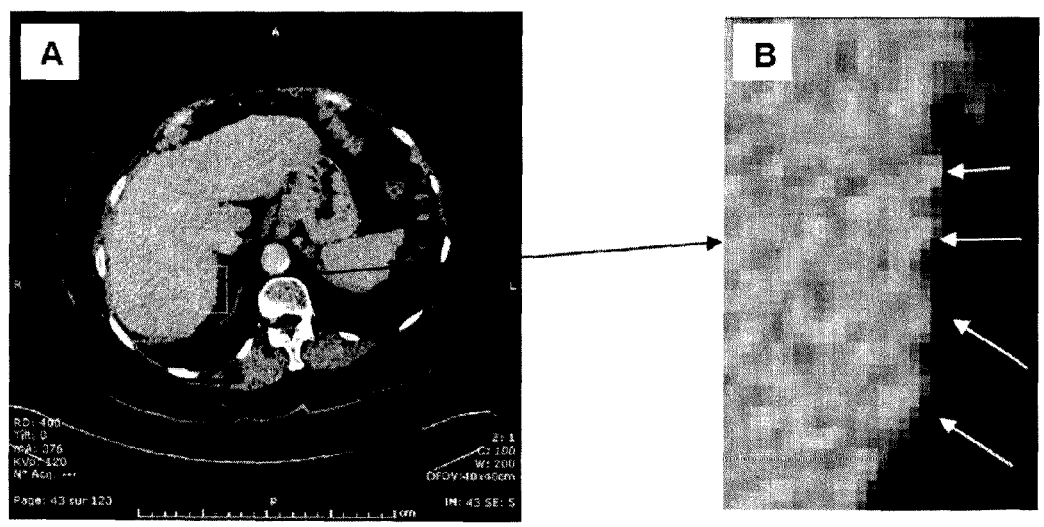
FIG. 16 is a combination of illustrations showing a slice of TDM image (A) and a zoom on the irregular edges with nodules (B) (see arrows).
Figure 17:
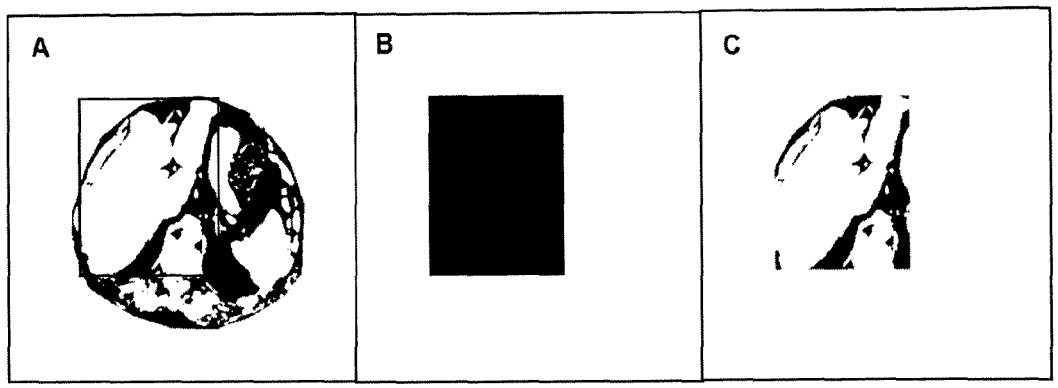
FIG. 17 is a combination of illustrations showing a thresholded slice of TDM image with a box surrounding the liver (A), the mask of the box (B) and the black pixels corresponding to the fat in the box (C).
Figure 18:
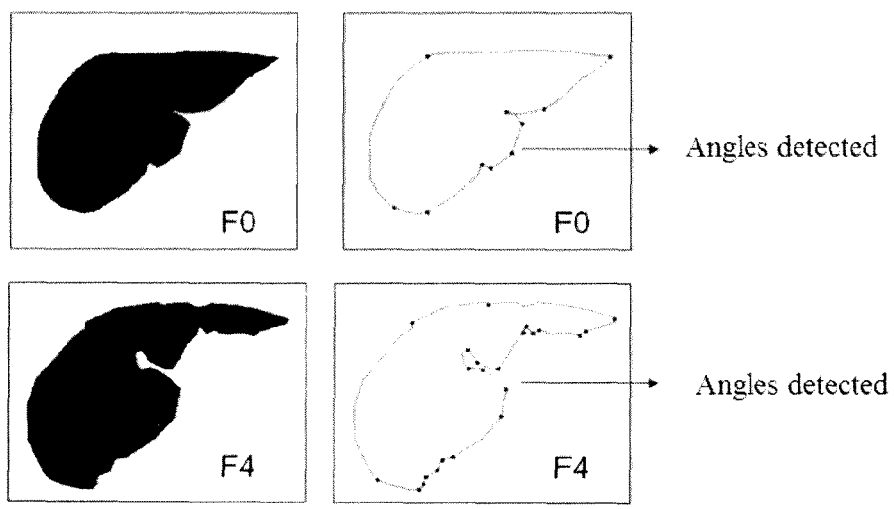
FIG. 18 is a combination of illustrations showing examples of angles detected for the measure of the edges angularity in the liver of a healthy patient (F0) or in a cirrhotic liver (F4).

As for the LB specimen, the analysis of the edges of the liver in TDM is an important descriptors to consider for the cirrhosis diagnosis. The edges tend to become more and more curved and irregular in the high fibrosis stages (Metavir F3, F4). The edges of spleen and liver may be assessed on a mask of the spleen and liver (FIG. 15). Therefore, we measured the characteristic of anfractuosity with the native perimeter of the liver (mean and total perimeter), the smoothed perimeter of the liver (FIG. 20) and the ratio between the native and smoothed perimeters. We also measured the largest perimeter among all the slices. The indentation of the liver can be interesting to evaluate the variation of the edges around smoothed edges. We completed the description of the liver external morphology with its height, the fractal dimension of its edges (FIG. 18), the nodularity of its curved and irregular edges (FIG. 16), and the angularity representing the angles present on the edges. We thus obtained a large number of variables describing the liver. Finally, we designed a box containing the liver wherein we measured the liver fat ratio (black pixels vs other pixels, FIG. 17). We also calculated in the same manner the abdominal fat ratio (black pixels vs other pixels contained in the abdomen). We did the same evaluation for the spleen and we evaluated the spleen height, the total spleen perimeter, the ratio between the spleen area and the liver area and the nodularity of the spleen edges.

Figure 20:
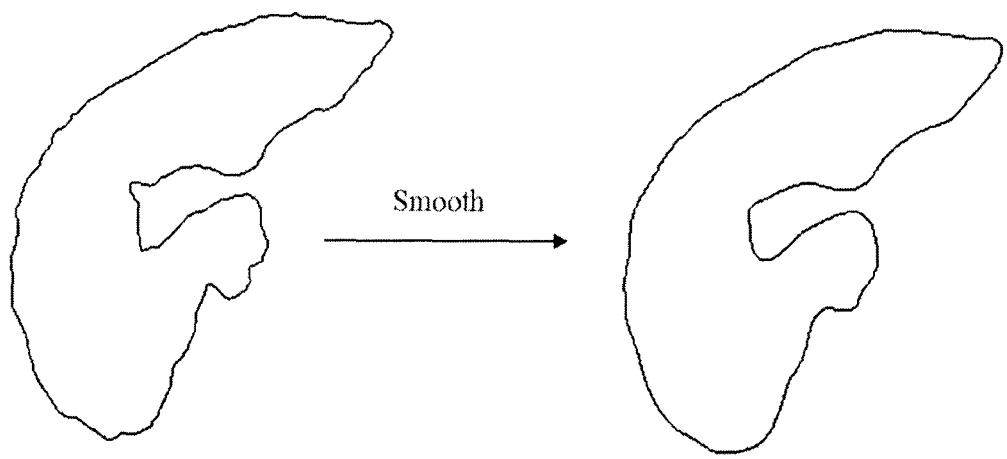
FIG. 20 is an illustration showing the edge smoothing liver used for measuring the ratio between the 2 perimeters and for evaluating the indentation of the liver.

Internal Morphology (FIG. 20)

Figure 19C:
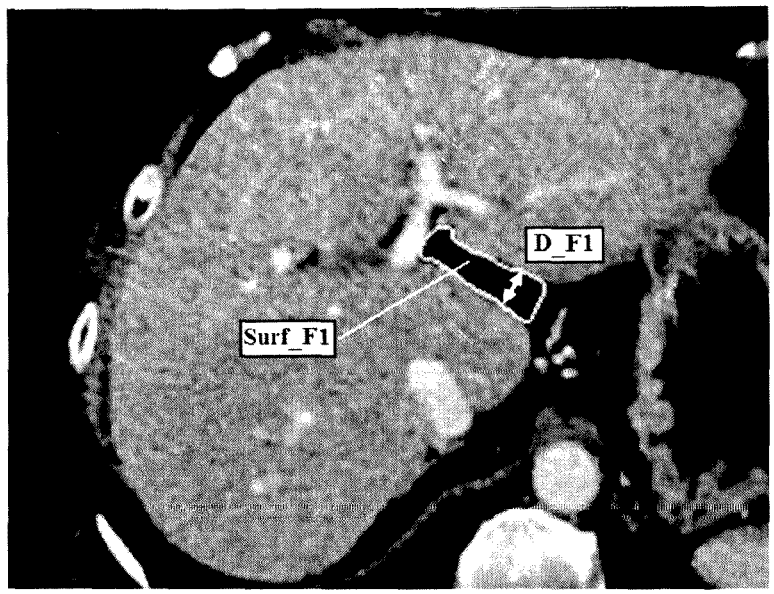
FIG. 19 is a combination of pictures illustrating the measurement of internal morphology descriptors. (A): Example of different lengths measured in an enlarged liver segment I in cirrhosis. D1 is the anterior-posterior length between the most anterior limit/edge of segment I and the most posterior limit/edge of segment I tangential to the left edge inferior vena cava. D2 is the transversal length between D1 (perpendicular to D1) and the most distant left limit/edge of segment I. D3 is the anterior-posterior length between the most anterior limit of segment I and the most anterior limit of inferior vena cava. D4 is the transversal length between D3 (perpendicular to D3) and the most distant left limit/edge of segment I. (B): Example of the surface measured in an enlarged liver segment I in cirrhosis. (C) Example of the furrow thickness (D_F1) and surface (Surf_F1) measured in cirrhosis. Furrow surface can be obtained by contouring limits either manually or by an automated process or both methods (semi-automated process). Furrow thickness can be the maximum thickness or the mean thickness.

Other interesting parameters are the hypertrophy of liver segment I (one) which is observed in the high Metavir fibrosis stages, the width of the liver segment IV, and the ratio between segment I and segment IV dimensions. The hypertrophy is measured with different lengths (see FIG. 19) and their mathematical combination (ratio and products). We used the inferior cave vein as a landmark for these measures: we obtained 2 antero-posterior lengths (D1 and D3, FIG. 19A), 2 transversal lengths (D2 and D4, FIG. 19A) and the surface of the segment I (Surf_S1, FIG. 19B). The furrow thickness (D_FI) and surface (Surf_F1), especially the Arantius ligament or furrow which tends to increase in cirrhosis, were also evaluated (FIG. 19C), as the the internal nodularity in the liver. The diameter of the portal vein was also measured.

Structure

We measured the heterogeneity of the density intensity in the image between several regions of interest (ROI) in the liver. Fractal organization of the hepatic parenchyma was also studied.

Calculation

The diagnostic value of radiological descriptors is calculated as follows.

The dependent variable is the diagnostic target among those of pathological liver lesions:

Fibrosis as binary target like significant fibrosis or cirrhosis or staging like Metavir staging.

Steatosis.

The independent variables are selected among the list of available radiological descriptors among those known in the literature plus the new signs described in the present application.

The dependent variable is predicted by the independent variables thanks to appropriate statistical multivariate analysis like binary logistic regression or discriminant analysis. The multivariate analysis provides a score including one to several independent variables.

Example

Population: 30 patients with chronic hepatitis C, liver biopsy (Metavir staging) and TDM.

The independent variable was furrow surface:

| Diagnostic target | Significant fibrosis | Cirrhosis |
|---|---|---|
| AUROC | 0.882 | 0.893 |
| Correctly classified (%) | 79.3 | 75.9 |
| Score coefficients: | | |
| Constant | −1.148 | −2.645 |
| Furrow surface | 2.793 | 2.026 |
| P value for furrow surface | 0.031 | 0.005 |

Example 5: Automatic Measurement of Lesions in a Radiological Image

List of Radiological Descriptors

The 48 following liver descriptors (Table 10) were measured by semi-automated digitized morphometry on images provided by tomodensitometry:

TABLE 10

| Site | Descriptor |
|---|---|
| External morphology | |
| Liver | 1. Mean native liver perimeter (MNLP) |
| | 2. Total native liver perimeter |
| | 3. Total smoothed liver perimeter |
| | 4. Ratio native/smoothed total liver perimeters (RN-STLP) |
| | 5. Largest liver perimeter (LLP) |
| | 6. Mean liver surface |
| | 7. Total liver surface |
| | 8. Ratio liver perimeter/liver surface (RLPS) |
| | 9. Liver indentation |
| | 10. Liver height |
| | 11. Fractal dimension of liver edges |
| | 12. Liver nodularity |
| | 13. Liver angularity |
| | 14. Liver fat ratio |
| Abdomen | 15. Abdominal fat ratio |
| Spleen | 16. Spleen height (SH) |
| | 17. Total spleen perimeter (TSP) |
| | 18. Mean total spleen perimeter (MTSP) |
| | 19. Total spleen surface |
| | 20. Mean total spleen surface |
| | 21. Ratio spleen/liver surfaces (RSLS) |
| | 22. Ratio spleen/liver perimeters |
| | 23. Nodularity of the spleen edges |
| | 24. Mean fractal dimension of spleen edges |
| Internal morphology | |
| | 25. Width of liver segment IV |
| | 26. Ratio between segment I and segment IV dimensions |
| | 27. Ratio segment I/liver surfaces (RS1LS) |
| | 28. First antero-posterior segment I length (D1) |
| | 29. First transversal segment I length (D2) |
| | 30. Second antero-posterior segment I length (D3) |
| | 31. Second transversal segment I length (D4) |
| | 32. Segment I surface |
| | 33. Arantius furrow thickness (AFT) |
| | 34. Arantius furrow surface |
| | 35. Internal nodularity |
| | 36. Portal vein diameter |
| Liver structure | |
| | 37. Mean total density |
| | 38. Standard deviation of total density (SDTD) |
| | 39. Coefficient of variation of total density |
| | 40. Median total density |
| | 41. Interquartile range of total density (IQRTD) |
| | 42. Ratio interquartile range/median of total density |
| | 43. Mean ROI density |
| | 44. Standard deviation of ROI density (SDROID) |
| | 45. Coefficient of variation of ROI density |
| | 46. Median ROI density |
| | 47. Interquartile range of ROI density |
| | 48. Ratio interquartile range/median of ROI density |

* Descriptors in bold are independent descriptors in the following diagnostic scores.

Descriptors in the Table above may be combined by division or multiplication, e.g. liver segment I hypertrophy can be described by D1×D2×D3×D4. Some descriptors can be applied to other structures, e.g. dimensions of all furrows, spleen density . . . .

Diagnostic Scores

Development and evaluation of diagnostic scores was performed in a population of 107 patients with chronic liver disease of miscellaneous causes. All patients had liver tomodensitometry. The diagnostic reference was either liver biopsy in 91 patients or non-invasive fibrosis diagnosis by Elasto-FibroMeter V2G (E-FibroMeter$^{2G}$) combining Fibroscan and FibroMeter V2G in 107 patients. Both references are based on fibrosis Metavir staging (F0 to F4). Scores were obtained by binary logistic regression with Metavir staging outcomes (targets) as diagnostic reference. Diagnostic targets were significant fibrosis (Metavir F≥2), severe fibrosis (Metavir F≥3) and cirrhosis (Metavir F=4).

Liver Biopsy as Reference

Scores were obtained by binary logistic regression with Metavir staging as diagnostic reference.

The following Table 11 describes test composition and accuracy.

TABLE 11

| Diagnostic targets Score for: | Variables List * | Type TDM | FS | BT | N | AUROC |
|---|---|---|---|---|---|---|
| Cirrhosis | | | | | | |
| Pre 1 | SDTD, D3, AFT, RSLS | x | | | 4 | 0.872 |
| Pre 4 | Pre 1 + TSP | x | | | 5 | 0.883 |
| Fibroscan | | | x | | 1 | 0.853 |
| CirrhoMeter | | | | x | 8 | 0.797 |
| FibroMeter | | | | x | 8 | 0.726 |
| E-FibroMeter | | | x | x | 8 | 0.866 |
| Pre 5 | Pre 4 + FS | x | x | | 6 | 0.922 |
| Pre 6 | Pre 4 + FS, GGT | x | x | x | 7 | 0.940 |
| Pre 8 | Pre 4 + FS, GGT, age, HA | x | x | x | 9 | 0.953 |
| Significant fibrosis | | | | | | |
| Pre 2 | IQRTD, AFT, MNLP, MTSP, RSLS | x | | | 5 | 0.910 |
| Fibroscan | | | x | | 1 | 0.920 |
| CirrhoMeter | | | | x | 8 | 0.840 |
| FibroMeter | | | | x | 8 | 0.803 |
| E-FibroMeter | | | x | x | 8 | 0.937 |
| Pre 9 | Pre 2 + FS, PI, A2M | x | x | x | 7 | 0.982 |
| Pre 10 | Pre 2 + FS, A2M, AST, PI | x | x | x | 8 | 0.985 |
| Severe fibrosis | | | | | | |
| Pre 3 | RS1LS, D4, RNSTLP | x | | | 3 | 0.821 |
| Pre 1 | | x | | | 4 | 0.822 |
| Pre 4 | | x | | | 5 | 0.823 |
| Fibroscan | | | x | | 1 | 0.898 |
| CirrhoMeter | | | | x | 8 | 0.795 |
| FibroMeter | | | | x | | 0.705 |
| E-FibroMeter | | | x | x | | 0.894 |
| Pre 11 | Pre 3 + FS | x | x | | 4 | 0.905 |
| Pre 12 | Pre 2 + FS, AST | x | x | x | 6 | 0.929 |

HA: hyaluronic acid,
PI: prothrombin index,
A2M: alpha2-macroglobulin,
FS: Fibroscan,
BT: blood tests,
TDM: tomodensitometry,
Pre: predictive score.
*Scores and descriptors in bold characters include only descriptors provided by tomodensitometry.

As shown Table 11, for cirrhosis diagnosis, tomodensitometry outperforms all other non-invasive tests. Moreover, for significant fibrosis diagnosis, tomodensitometry improves the best non-invasive test (E-FibroMeter).

E-FibroMeter as Reference

Scores were obtained by multiple linear regression with E-FibroMeter V2G as diagnostic reference.

E-FibroMeter score was divided into binary diagnostic targets: significant fibrosis and cirrhosis according to respective maximum Youden cut-off.

TABLE 12

| Composition (Table 12) | | | | | |
|---|---|---|---|---|---|
| | Descriptors | | | Type | |
| Scores | List (abbreviation) * | N Descriptor | TDM | FS | BT |
| APV 1 | AFT, MNLP, RSLS, SDTD, SH | 5 | x | | |
| APV 2 | Pre 9, Pre 2, Pre 5, SDROID, RLPS, LLP | 6+ | x | x | x |
| APV 3 | Pre 9, Pre 5, SDROID, Pre 1 | 4+ | x | x | x |

APV: adjusted predictive value
* Scores and descriptors in bold characters include only descriptors provided by tomodensitometry.

TABLE 13

| Correlations (Rs, Table 13) | | |
|---|---|---|
| | E-FibroMeter | Metavir F |
| N patients | 99 | 82 |
| APV 1 | 0.552 | 0.498 |
| APV 2 | 0.883 | 0.723 |
| APV 3 | 0.918 | 0.779 |
| E-FibroMeter | — | 0.755 |
| Fibroscan | 0.926 | 0.718 |

TABLE 14

| Accuracy (AUROC, Table 14) | | | | |
|---|---|---|---|---|
| | AUROC Reference | | | |
| | Metavir | | E-FibroMeter | |
| | Diagnostic target | | | |
| Score * | Significant fibrosis | Cirrhosis | Significant fibrosis | Cirrhosis |
| N patients | 82 | 82 | 99 | 99 |
| APV 1 | 0.794 | 0.777 | 0.714 | 0.788 |
| APV 2 | 0.958 | 0.832 | 0.975 | 0.967 |
| APV 3 | 0.973 | 0.877 | 0.947 | 0.977 |
| E-FibroMeter | 0.937 | 0.866 | — | — |
| Fibroscan | 0.920 | 0.853 | 0.918 | 0.973 |
| Pre 2 | 0.910 | 0.805 | 0.746 | 0.795 |
| Pre 4 | 0.796 | 0.883 | 0.740 | 0.810 |
| Pre 10 | 0.985 | 0.900 | 0.957 | 0.991 |

* Scores in bold characters include only descriptors provided by tomodensitometry.

Figure 21:
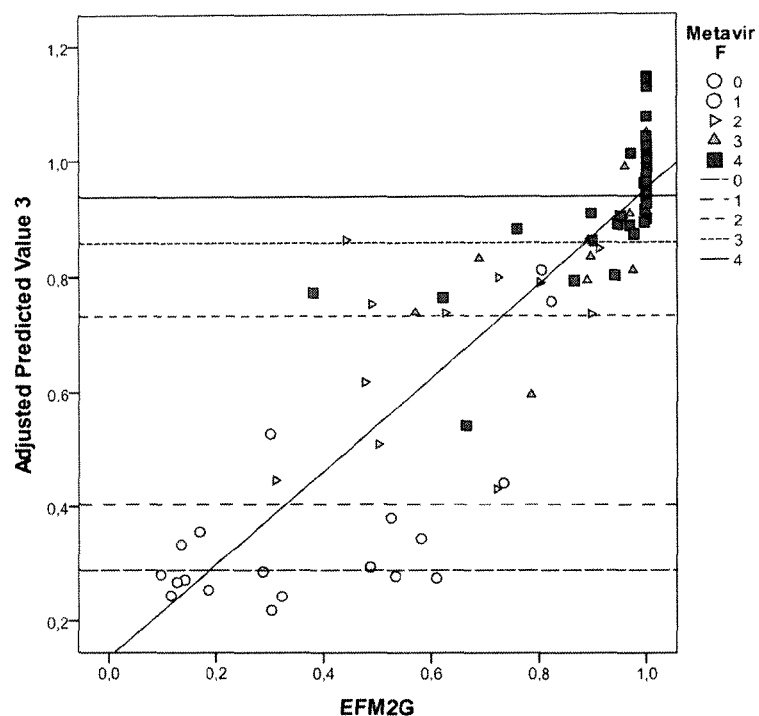
FIG. 21 is a combination of two graphs related to the APV3 score. (A) Correlation of APV3 score with E-FibroMeter2G score (EFM2G) as a function of Metavir F stages. (B) box plots (median quartiles, extremes) of APV3 score are better distributed as a function of Metavir F stages than those of the E-FibroMeter2G score (EFM2G).
Figure 21:
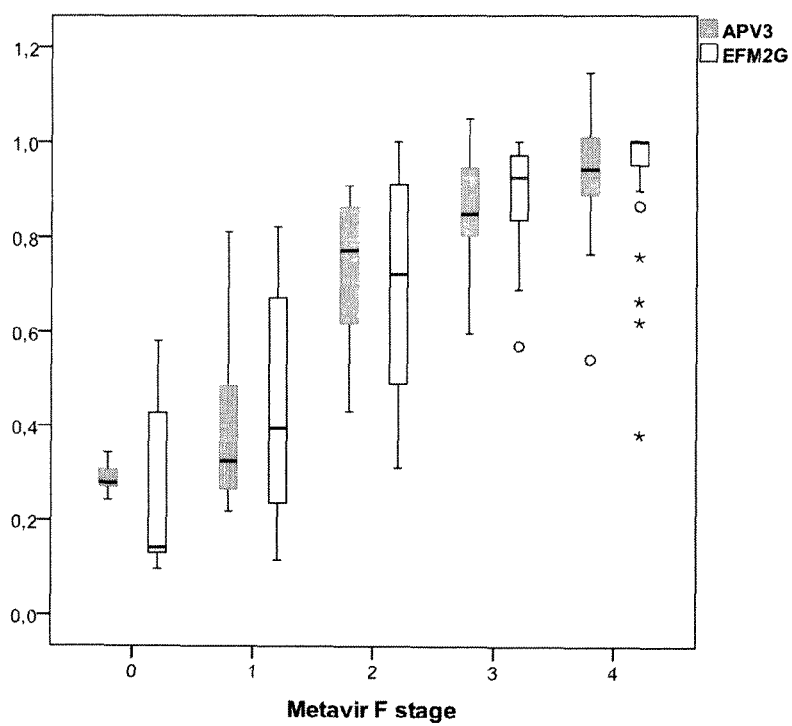

As shown in Table 14 and in FIG. 21, for significant fibrosis diagnosis, tomodensitometry (APV 3 score) improves the accuracy of other non-invasive tests. Moreover, APV 3 score defined with E-FibroMeter outperforms Pre 2 score defined with Metavir staging.

For cirrhosis diagnosis, tomodensitometry (APV 3 score) improves the accuracy of other non-invasive tests.

In conclusion, several multivariate scores including some independent radiological descriptors, measured by semi-automated digitized morphometry, either alone (tomodensitometry) or combined with elastometry and/or blood markers have a high diagnostic accuracy for significant liver fibrosis and cirrhosis.

Example 6: Prognostic Score

Methods

The Vindiag 10 population included 204 patients with CHC (chronic Hepatitis C) and a baseline LB (Liver Biopsy). In this population, follow-up was 10.2±3.7 years for mortality and 8.5±4.5 years for liver complications. During follow-up, sustained virological response (SVR) to antiviral treatment was observed in 40.2% of patients, overall mortality was 15.2%, liver-related mortality was 5.4% and liver complications occurred in 16.7% of patients.

Mortality was recorded according to a national registry. Survival was analyzed with the Cox model.

Results

Histological Data

In this analysis, independent predictors included all classical optical analysis (Metavir F stage), classical descriptors (such as, for example, area of fibrosis) and new descriptors (such as, for example, mean bridge area) including new morphometric scores (measured by mathematical combination according to the method of the invention, such as, for example, cirrhosis score shown in above Table 6b). Most of the independent prognostic information was provided by new descriptors of the invention whatever the prognostic outcome (Table 15). Classical Metavir staging ($F_M$) had either no significant role or borderline role.

TABLE 15

Independent predictors among histological data by Cox model of clinical events in the Vindiag 10 population. First predictor figures indicate the step in forward stepwise analysis.

| Patients | Overall mortality Variables [a] | $\chi^2$ | Liver related mortality Variables [a] | $\chi^2$ | Liver complications Variables [a] | $\chi^2$ |
|---|---|---|---|---|---|---|
| All | Mean area of porto-septal fibrosis<br>Metavir $F_M$ | 24.3 | Mean area of porto-septal fibrosis<br>Lobular area of stellar fibrosis<br>Number of nodules<br>Number of bridges | 148.6 | Mean bridge area<br>Fractal dimension of steatosis<br>Cirrhosis score | 70.8 |

[a] The figure indicates the step in forward stepwise binary logistic regression
$\chi^2$: overall significance of the model.
Morphometric descriptors of the invention are indicated in italics Combined Data Cox model survival analysis in the Vindiag 10 cohort included demographic data, SVR, 6 blood fibrosis tests, Metavir staging ($F_M$) and the 44 morphometric variables. Detailed results are presented in Table 16.

TABLE 16

Independent predictors by Cox model of clinical events in the Vindiag 10 population. First predictor figures indicate the step in forward stepwise analysis.

| Patients | Overall mortality Variables [a] | $\chi^2$ | Liver-related mortality Variables [a] | $\chi^2$ | Liver complications Variables [a] | $\chi^2$ |
|---|---|---|---|---|---|---|
| All | CirrhoMeter$^{2G}$<br>p = 0.015<br>SVR<br>p = 0.033<br>Fibrotest<br>p = 0.010<br>Portal distance<br>p = 0.013<br>Edge fractal dimension<br>p = 0.047 | 46.5 | CirrhoMeter$^{2G}$<br>p < 0.001<br>Area of steatosis<br>p = 0.003 | 30.9 | CirrhoMeter$^{2G}$<br>p < 0.001<br>Area of steatosis<br>p < 0.001<br>SVR<br>p = 0.028<br>Fibrotest<br>p = 0.001<br>Hepascore<br>p = 0.039<br>Nodule number<br>p = 0.039 | 76.6 |
| Liver specimen ≥20 mm or $F_M 4$ | CirrhoMeter$^{2G}$<br>p < 0.001<br>$F_M 4$ score<br>p = 0.003 | 24.7 | CirrhoMeter$^{2G}$<br>p = 0.007<br>Area of steatosis<br>p = 0.017<br>$F_M 4$ score<br>p = 0.010<br>Intensity of | 32.3 | CirrhoMeter$^{2G}$<br>p < 0.001<br>Area of steatosis<br>p = 0.001<br>Intensity specimen blue<br>p = 0.005 | 59.7 |

TABLE 16-continued

Independent predictors by Cox model of clinical events in the Vindiag 10 population.
First predictor figures indicate the step in forward stepwise analysis.

| Patients | Overall mortality | | Liver-related mortality | | Liver complications | |
|---|---|---|---|---|---|---|
| | Variables [a] | $\chi^2$ | Variables [a] | $\chi^2$ | Variables [a] | $\chi^2$ |
| | | | *specimen-blue p = 0.028* | | *Edge fractal dimension p = 0.016 Fragments number p = 0.008 Intensity of parenchyma green p = 0.052* | |

[a] The figure indicates the step in forward stepwise binary logistic regression
$\chi^2$: overall significance of the model.
SVR: sustained virological response.
Morphometric descriptors of the invention are indicated in italics Briefly, whatever the prognostic outcome (overall mortality, liver mortality, liver complications) or population (all 204 patients or 110 patients with liver specimen length≥20 mm or $F_MA$), CirrhoMeter$^{2G}$ was always the first independent predictor. There was always at least one new morphometric descriptor of the invention among other predictors. Particularly, area of steatosis was the second predictor for liver events (mortality or complications). Interestingly, morphometric $F_MA$ score was an independent predictor for both overall and liver-related mortality in patients with adequate specimen (length≥20 mm or $F_MA$). It should be noted that Metavir $F_M$ had no independent role.

The invention claimed is:

1. A non-invasive method for assessing the presence of a clinically significant fibrosis in a liver organ or liver tissue of a subject through automated analysis of at least one image of said liver organ or liver tissue, the method utilizing a microprocessor comprising a computer algorithm configured to calculate a score combining descriptors of said image, said method comprising the steps of:
   a. measuring on said at least one image at least two descriptors of said at least one image, the descriptors selected from the group consisting of: linearity percentage of the edges, mean of percentage of fibrosis around areas, area of stellar fibrosis among the total surface of the liver biopsy specimen, number of bridges, bridges thickness, mean area of porto-septal regions, bridges perimeter, ratio of bridges among the porto-septal areas, area of fibrosis in the bridges, fractal dimension of peri-sinusoidal fibrosis, perimeter of the liver organ, liver tissue or fragment thereof, fractal dimension of porto-septal fibrosis, ratio of peri-sinusoidal fibrosis among the whole fibrosis, length of the liver organ, liver tissue or fragment thereof, anfractuosity descriptors selected from native perimeter, smoothed perimeter and ratio between both perimeters, fractal dimension of fibrosis, interquartile range of total density, Arantius furrow thickness, mean native liver perimeter, mean total spleen perimeter, ratio spleen surface to liver surface, and mathematic combination thereof;
   b. mathematically combining said at least two measured descriptors from step (a) in to a score, wherein said mathematical combination is a binary logistic regression; and
   c. assessing the presence of a clinically significant fibrosis, based on the value of the score calculated at step (b).

2. The method according to claim 1, wherein the at least one image is a histological section image, or an image of the entire liver organ or liver tissue.

3. The method according to claim 1, wherein the at least one image is obtained by an optical technique selected from the group consisting of: microscopic physical imaging, second harmonic generation (SHG), multiphoton imaging, coherent anti-Stokes Raman scattering (CARS), two-photon excitation fluorescence (TPEF), diffuse optical imaging and event-related optical signal;
   or by a non-optical technique selected from the group consisting of: radiography, nuclear medicine, photoacoustic methods, and thermal methods.

4. The method according to claim 1, further comprising measuring at least one non-invasive test marker, measuring liver stiffness, or measuring both, in the subject and combining the resulting measure(s) with the measures of the two descriptors obtained at step (a).

5. The method according to claim 4, wherein the at least one non-invasive test marker is selected from the group consisting of a biomarker, a clinical data, a physical data, and a score selected from Enhanced Liver Fibrosis test (ELF™) FibroSpect™, AST to Platelet Ratio Index (APRI), Fibrosis-4 (FIB-4), Hepascore, Fibrotest™, FibroMeter™, CirrhoMeter™, CombiMeter™, and InflaMeter™.

6. The method according to claim 1, wherein the clinically significant fibrosis is proto-septal fibrosis.

7. A non-invasive method for assessing the presence of cirrhosis in a subject through automated analysis of at least one image of liver organ or liver tissue from the subject, the method utilizing a microprocessor comprising a computer algorithm configured to calculate a score combining descriptors of said image, said method comprising the steps of:
   a. measuring on said at least one image at least two descriptors of said at least one image, the descriptors selected from the group consisting of: linearity percentage of the edges, granularity percentage, fragmentation, mean of percentage of fibrosis around areas, area of stellar fibrosis among the surface of porto-septal regions, portal distance, length of the liver biopsy, fractal dimension of porto-septal fibrosis, number of bridges, fractal dimension of peri-sinusoidal fibrosis, perimeter of the liver organ, liver tissue or fragment thereof, standard deviation of total density, second antero-posterior segment I length (D3), Arantius furrow thickness, ratio between spleen surface and liver surface, total spleen perimeter, portal furrow thickness and mathematic combination thereof;

b. mathematically combining said at least two measured descriptors from step (a) in to a score, wherein said mathematical combination is a binary logistic regression; and c. assessing the presence of a cirrhosis, based on the value of the score calculated at step (b).

8. The method according to claim 7, wherein the at least one image is a histological section image, or an image of the entire liver organ or liver tissue.

9. The method according to claim 7, wherein the at least one image is obtained by an optical technique selected from the group consisting of: microscopic physical imaging, second harmonic generation (SHG), multiphoton imaging, coherent anti-Stokes Raman scattering (CARS), two-photon excitation fluorescence (TPEF), diffuse optical imaging and event-related optical signal;

or by a non-optical technique selected from the group consisting of: radiography, nuclear medicine, photoacoustic methods, and thermal methods.

10. The method according to claim 7, further comprising measuring at least one non-invasive test marker selected from the group consisting of a biomarker, a clinical data, a physical data and a score selected from Enhanced Liver Fibrosis test (ELF™), FibroSpect™, AST to Platelet Ratio Index (APRI), Fibrosis-4 (FIB-4), Hepascore, Fibrotest™, FibroMeter™, CirrhoMeter™, CombiMeter™, InflaMeter™, and liver stiffness, and combining the resulting measure(s) with the measures of the two descriptors obtained at step (a).

11. A non-invasive method for determining an increased risk of liver complications, an increased risk of mortality, or both, through automated analysis of at least one image of liver organ or liver tissue, the method utilizing a microprocessor comprising a computer algorithm configured to calculate a score combining descriptors of said image, wherein said method comprises the steps of:

a. measuring on said at least one image at least two descriptors of said at least one image, the descriptors selected from the group consisting of: linearity percentage of the edges, granularity percentage, fragmentation, mean of percentage of fibrosis around areas, area of stellar fibrosis among the surface of porto-septal regions, area of stellar fibrosis among the surface of lobular regions, area of porto-septal fibrosis, portal distance, fractal dimension of the edges of the organ, tissue or fragment thereof, area of steatosis, mean intensity of the image on the blue component, number of nodules, number of bridges, mean bridge area, fractal dimension of steatosis, luminosity of the parenchyma staining in the green component, number or fragments, and mathematical combination thereof;

b. mathematically combining said at least two measured descriptors from step (a) in to a score, wherein said mathematical combination is a binary logistic regression, a multiple linear regression or any multivariate statistical analysis; and c. determining an increased risk of liver complications, an increased risk of mortality, or both, based on the value of the score calculated at step (b).

12. The method according to claim 11, wherein the at least one image is a histological section image, or an image of the entire liver organ or liver tissue.

13. The method according to claim 11, wherein the at least one image is obtained by an optical technique selected from the group consisting of: microscopic physical imaging, second harmonic generation (SHG), multiphoton imaging, coherent anti-Stokes Raman scattering (CARS), two-photon excitation fluorescence (TPEF), diffuse optical imaging and event-related optical signal;

or by a non-optical technique selected from the group consisting of: radiography, nuclear medicine, photoacoustic methods, and thermal methods.

14. The method according to claim 11, further comprising measuring at least one non-invasive test marker and combining the resulting at least one measure with the measures of the two descriptors obtained at step (a), wherein the at least one non-invasive test marker is selected from the group consisting of a biomarker, a clinical data, a physical data, and/or a score selected from Enhanced Liver Fibrosis test (ELF™) FibroSpect™, AST to Platelet Ratio Index (APRI), Fibrosis-4 (FIB-4), Hepascore, Fibrotest™, FibroMeter™, CirrhoMeter™, CombiMeter™, and InflaMeter™.

15. The method according to claim 11, further comprising measuring a binary non-invasive diagnostic test marker and combining the resulting measure with the measures of the two descriptors obtained at step (a).

16. The method according to claim 11, further comprising measuring a Metavir F score (FM score), an Ishak stage, or both, and combining the resulting measure with the measures of the two descriptors obtained at step (a).

* * * * *